US006744447B2

(12) United States Patent
Estrada et al.

(10) Patent No.: US 6,744,447 B2
(45) Date of Patent: Jun. 1, 2004

(54) METHOD AND SYSTEM FOR COMPILING AND USING PLACEBOT AGENTS FOR AUTOMATICALLY ACCESSING, PROCESSING, AND MANAGING THE DATA IN A PLACE

(75) Inventors: Julio Estrada, Carlisle, MA (US); Miguel Estrada, Hollis, NH (US); Cun Yong Tan, Tewksbury, MA (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 09/752,115

(22) Filed: Dec. 29, 2000

(65) Prior Publication Data

US 2004/0039848 A1 Feb. 26, 2004

(51) Int. Cl.[7] .................................................. G06F 3/00
(52) U.S. Cl. ........................ 345/751; 345/753; 345/758
(58) Field of Search .............................. 345/733, 751, 345/752, 753, 758; 709/201, 223, 224; 707/101

(56) References Cited

U.S. PATENT DOCUMENTS

| | | | |
|---|---|---|---|
| 5,894,554 A | 4/1999 | Lowery et al. | 395/200.33 |
| 6,052,730 A | 4/2000 | Felciano et al. | 709/225 |
| 6,070,185 A | 5/2000 | Anupam et al. | 709/204 |
| 6,081,788 A | 6/2000 | Appleman et al. | 705/14 |
| 6,233,600 B1 * | 5/2001 | Salas et al. | 709/201 |
| 6,278,449 B1 | 8/2001 | Sugiarto et al. | 345/334 |
| 6,314,555 B1 * | 11/2001 | Ndumu et al. | 707/101 |
| 6,317,777 B1 | 11/2001 | Skarbo et al. | 709/204 |
| 6,356,285 B1 * | 3/2002 | Burkwald et al. | 345/853 |

* cited by examiner

Primary Examiner—John Cabeca
Assistant Examiner—Kieu D. Vu
(74) Attorney, Agent, or Firm—Stephen T. Keohane; Shelley M. Beckstrand

(57) ABSTRACT

Collaboration space object model provides for a place consisting of rooms created by users interacting with a client browser. A skin (i.e., theme) may be used as template for creating places. PlaceBots (i.e., agents) provide for accessing, processing and managing data in a place. HTML may be dragged and dropped into a place, where it is parsed and corresponding place fields created. MS Excel or Word documents may be dragged and dropped into a place, which creates a corresponding form, and users may create new documents using that form. A place type comprising a template of an entire place, or collaboration space, may be used to create new places. Changes made to a place may be reported, subject to security controls, by selecting what's new. Task fields are provided allowing web browser creation of forms for work flow. Place enabled objects are provided for synchronous communications. A quick browse feature provides a simplified format for browser windows based on selection of HTML links. MS Office documents may launched within a place for in place editing and importing the resulting document into the place.

23 Claims, 25 Drawing Sheets

QUICKPLACE

| FILE | EDIT | VIEW | FAVORITES | TOOLS | HELP |

| * * * | HOME | SEARCH | * * * | MAIL | PRINT | EDIT | DISCUSS |

LINKS ☐ HAIKUTEAM  ☐ QUICKPLACE-1  ☐ QUICKPLACE-QUICKPLACE . .

HOME:       NEW:

WHAT DO YOU LIKE TO CREATE?
- ⦿ PAGE. CHOOSE THIS TO CREATE A NEW PAGE THAT CAN INCLUDE RICH FORMATTED, TEXT IMAGES, AND FILE ATTACHMENTS.
- ○ IMPORTED PAGE. CHOOSE THIS TO CREATE A NEW PAGE USING THE CONTENTS OF AN EXISTING FILE THAT IS ON YOUR COMPUTER.
- ○ CALENDAR PAGE. CHOOSE THIS TO CREATE A NEW CALENDAR ENTRY.
- 416 —○ MICROSOFT WORD 2000 PAGE. CHOOSE THIS TO CREATE A PAGE USING WORD 2000.
- ○ MICROSOFT POWERPOINT 2000 PAGE. CHOOSE THIS TO CREATE A PAGE USING POVERPOINT 2000.
- ○ ALL DAY EVENT
- 414 —○ STATUS REPORT. PLEASE USE THIS FOR WEEKLY STATUS REPORTS.
- ○ ACTION ITEM

412

CLICK THE NEXT BUTTON BELOW WHEN YOU ARE FINISHED FILLING OUT THIS FORM.

418 —[ NEXT ]    [ BACK ]

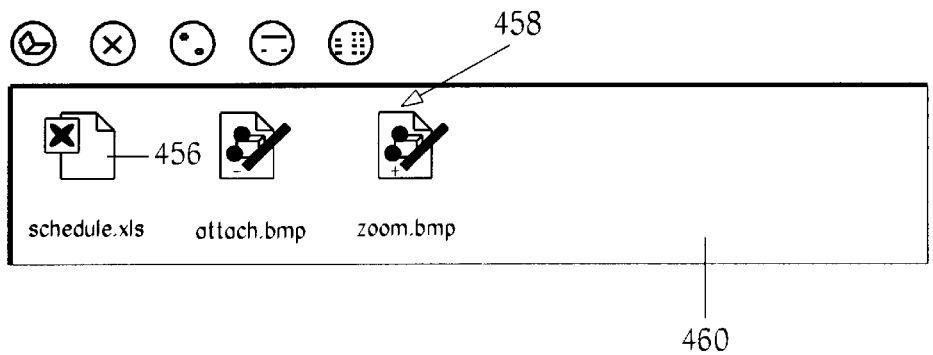
FIG. 17
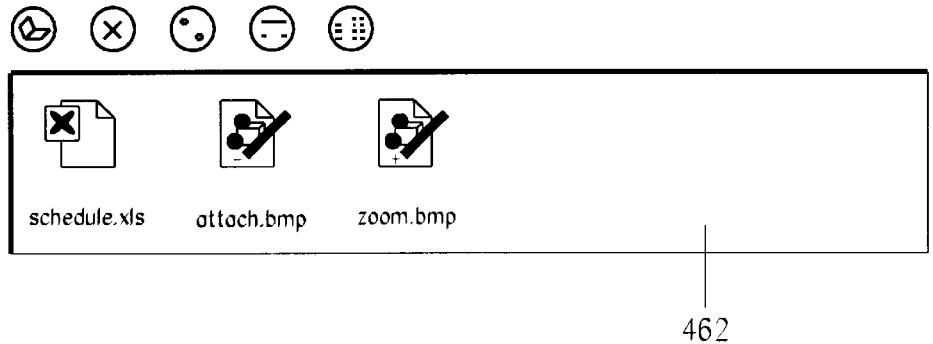
FIG. 18
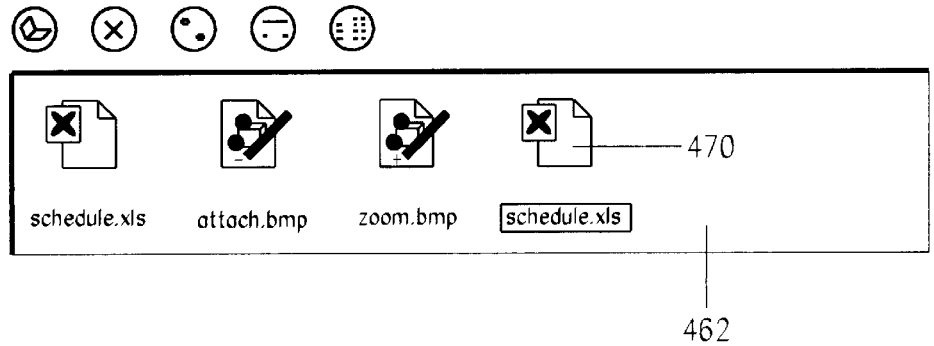
FIG. 19
FIG. 20

TASK FIELD GROUP - READ SCENE STATE
CHARLIE  10/18/00  9 :42 A.M.

THIS IS THE READ SCENE STATE FOR TASKS THAT
ARE NOT MILESTONES :

TASK INFORMATION :

ASSIGNED TO :              CATHY
    STATUS :                   IN COMPLETE
    DUE DATE :               12/23/00
    START DATE :            12/22/00
    CATEGORY :              PROJECT X

WHO CAN EDIT THIS TASK :   CATHY, JULIO

FIG. 24

| MILLENNIA | MERGERS_ ACQUISITIONS |
|---|---|
| * WELCOME<br>* FOYER DISCUSSION<br>* MILLENA'S ROOM<br>* CAP MAN ROOM<br>* THE ROCK'S ROOM<br>* ACGUISITION CAL<br>* LIBRARY<br>* [CUSTOMIZE]<br>* MEMBERS | BACK   NEXT      HELP<br><br>FORM WORKFLOW<br><br>   WORKFLOW: BY SETTING THE WORKFLOW FOR<br>   A FORM, YOU CAN ROUTE PAGES TO SPECIFIC<br>   MEMBERS AND....AS THE PAGE IS BEING<br>   PUBLISHED |

WHAT TYPE OF WORKFOLOW SHOULD
THIS PAGE HAVE?

514 ——— ● NO SPECIAL WORKFLOW
515 ——— ○ SIMPLE SUBMIT....
516 ——— ○ EDITOR-IN-CHIEF....
517 ——— ○ APPROVAL CYCLE....
518 ——— ○ MULTIPLE EDITORS....

CLICK THE NEXT BUTTON BELOW WHEN
YOU ARE FINISHED FILLING OUT THIS
FORM.

[NEXT]

MILLENNIA

*
*
*

* [CUSTOMIZE]

MERGERS_ACQUISITIONS

[CANCEL] [DONE] [HELP]

NEW FORM                                                    528
1  WHAT IS THE TITLE OF THIS FORM?

[                                                            ]

2  TEMPLATE DOCUMENT. SELECT THE MICROSOFT
   WORD, EXCEL, OR POWERPOINT DOCUMENT TO
   USE AS A PAGE TEMPLATE BY CLICKING THE
   FOLDER ICON BELOW, AND SELECTING THE
   DESIRED FILE. YOU CAN ALSO DRAG A FILE
   FROM YOUR DESKTOP.

524 — [BROWSE]
                        DOCUMENT STATUS:

240 — [document icon]   DRAG A DOCUMENT INTO THIS
                        AREA. CLICK BROWSE TO
                        SELECT ONE.

3  WORKFLOW : DO YOU WANT PAGES CREATED WITH
   THIS FORM TO BE REVIEWED BEFORE PUBLISHED?

526 — [MODIFY...]   STANDARD WORKFLOW

4  DO YOU WANT PAGES CREATED WITH THIS FORM
   TO ALWAYS BE PLACED IN A SPECIFIC FOLDER?

444 — [- NO SPECIFIC FOLDER-            ▼]

5  YOU CAN OPTIONALLY PROVIDE A FULLER
   DESCRIPTION OF THE FORM.

446 — [                                                      ]

6  CLICK DONE BUTTON WHEN YOU ARE FINISHED.

FIG. 27

METHOD AND SYSTEM FOR COMPILING AND USING PLACEBOT AGENTS FOR AUTOMATICALLY ACCESSING, PROCESSING, AND MANAGING THE DATA IN A PLACE

CROSS REFERENCES TO RELATED APPLICATIONS

The following U.S. patent applications, filed concurrently herewith, are assigned to the same assignee hereof and contain subject matter related to the subject matter of the present application.

U.S. patent application Ser. No. 09/752,120 filed Dec. 29, 2000, entitled "Method and System for Creating a Theme of a Place to be Used as a Template for Other Places";

U.S. patent application Ser. No. 09/752,121 filed Dec. 29, 2000, entitled "Method and System for Importing HTML Forms";

U.S. patent application Ser. No. 09/752,172 filed Dec. 29, 2000, entitled "Method and System for Importing MS Office Forms";

U.S. patent application Ser. No. 09/752,942 filed Dec. 29, 2000, entitled "Method and System for Creating a Place Type to Be Used as a Template for Other Places";

U.S. patent application Ser. No. 09/752,934 filed Dec. 29, 2000, entitled "Method and System for Identifying and Displaying Information That Is New or Has Been Updated In a Place";

U.S. patent application Ser. No. 09/752,961 filed Dec. 29, 2000, entitled "Method and System for Providing Task Information in a Place";

U.S. patent application Ser. No. 09/752,745 filed Dec. 29, 2000, entitled "Method and System for Providing Synchronous Communication and Person Awareness In a Place";

U.S. patent application Ser. No. 09/752,962 filed Dec. 29, 2000, entitled "Method and System for Providing a Separate Browser Window With Information From the Main Window In a Simpler Format"; and U.S. patent application Ser. No. 09/752,935 filed Dec. 29, 2000, entitled "Method and System for Allowing In Place Editing of Office Documents In a Place".

The present application is also an improvement upon the following copending, previously filed applications, assigned to the same assignee:

Ser. No. 09/473,745 filed Dec. 28, 1999, entitled "System and Method for Interconnecting Secure Rooms", Ser. No. 09/473,630 filed Dec. 28, 1999, entitled "System and Method for Dynamic Management of Web Site", Ser. No. 09/473,640 filed Dec. 28, 1999, entitled "System and Method for Presentation of Room Navigation", Ser. No. 09/473,098 filed Dec. 28, 1999, entitled "System and Method for Independent Room Security Management", Ser. No. 09/477,477 filed Jan. 4, 2000, entitled "System and Method for Dynamically Generating Viewable Graphics", Ser. No. 09/477,471 filed Jan. 4, 2000, entitled "System and Method for Dynamic Browser Management of Web Site", Ser. No. 09/477,474 filed Jan. 4, 2000, entitled "System and Method for Room Decoration and Inheritance", Ser. No. 09/477,469 filed Jan. 4, 2000, entitled "System and Method for Online/Offline Uninterrupted Updating of Rooms in Collaboration Space", Ser. No. 09/477,473 filed Jan. 4, 2000, entitled "System and Method for Client Replication of Collaboration Space", Ser. No. 09/477,476 filed Jan. 4, 2000, entitled "System and Method for Browser Creation and Maintenance of Forms"; and Ser. No. 09/478,238 filed Jan. 4, 2000, entitled "System and Method for Browser Definition of Workflow Documents".

BACKGROUND OF THE INVENTION

1. Technical Field of the Invention

This invention relates to web technology. More particularly, it relates to the creation and use of collaboration sites on the Internet or on an Intranet client/server system and to the graphical user interface used in Internet communications.

2. Background Art

The Internet and the World Wide Web (WWW) provide intra-enterprise connectivity, inter-enterprise connectivity and application hosting on a larger scale than ever before. By exploiting the broadly available and deployed standards of the Internet and the WWW, system users and designers can leverage a single architecture to build client/server applications for internal use that can reach outside to customers, business partners and suppliers.

Collaboration requires simultaneous communication between individuals on a project team. Typically, this has required that the team members work in the same location. Phone and video conferencing has enabled some remote work on the part of team members. Also, because of the growth of the Internet, collaboration using web technologies has been attempted, primarily using electronic mail (E-mail), Internet chat rooms, electronic whiteboards, and conferencing software. The most useful has been E-mail, but this approach results in a large trail or thread of notes as collaboration on a project advances, and these notes have no home or place to reside which is accessible by all team members substantially instantaneously and simultaneously. People often enter such a thread at different points, and such threads are not efficient in coordinating the work of many different people on a team which may include in-house developers and others, such as remote contractors, outside of an enterprise's firewall.

In order for such disperse teams to have the same, or substantially the same, collaboration environment as individuals working in the same physical office, a system is required which facilitates instant messaging, voice conferencing, electronic white boarding, and text and non-text file exchange. Such a system needs to provide a collaborative electronic room, or space, which is easily configured for use by team members without substantial administrative or application development support, and preferably include both groupware and project oriented applications such as shared folders, file exchange, workflow, group calendars, threaded conversations, version control, file locking, file merging, and security.

There is a need in the art for such a system which is easy to set up and which enables diverse and remote teams to become immediately productive in a secure environment. It would be, further, most desirable to allow such a collaborative environment to be set up without administrative support, that is by members of the team itself, using a familiar and easy to use browser user interface. Members of the team, acting with manager or author authority, and using such a browser interface without involving administrative or application development support, need to be able to set up a folder or room for each project element, such as a source code component, with version control, workflow elements, and group calendaring for tracking the project or project element with respect to approvals and deadlines. Such a room needs to receive from team members reports and have them routed to appropriate team members for review, resolution, and approval.

The WWW is a collection of servers on an IP (Internet Protocol) network, such as the Internet, an Intranet or an Extranet, that utilize the Hypertext Transfer Protocol (HTTP). Hereinafter, "Internet" 100 will be used to refer to any IP network.

HTTP is a known application protocol that provides users with access to files, which can be in different formats, such as text, graphics, images, sound, and video, using a standard page description language known as Hypertext Markup Language (HTML). Among a number of basic document formatting functions, HTML allows software developers to specify graphical pointers on displayed web pages, commonly referred to as "hyperlinks," that point to other web pages resident on remote servers. Hyperlinks commonly are displayed as highlighted text or other graphical image on the web page. Selection of a hyperlink with a pointing device, such as a computer mouse, causes the local computer to download the HTML associated with the web page from a remote server. The browser then renders the HTML into the displayed web page.

Web pages accessed over the Internet, whether by a hyperlink, opening directly via an "open" button in the browser, or some other means, are commonly downloaded into the volatile cache of a local computer system. In a computer system, for example, the volatile cache is a high-speed buffer that temporarily stores web pages from accessed remote web sites. The volatile cache thus enables a user to quickly review web pages that were already downloaded, thereby eliminating the need to repeat the relatively slow process of traversing the Internet to access previously viewed web pages. This is called local caching.

It is an object of the invention to provide a collaboration space application model for creating web applications that are aesthetically pleasing and present the user with a simple interface.

It is a further object of the invention to provide for creating web applications that are instantly created, instantly archived, team and project oriented, easy to use, created, accessed and administered via the Web, reusable, and extensible.

It is a further object of the invention to provide a method and system for building collaboration applications, by providing a repository for custom logic.

It is a further object of the invention to provide a method and system whereby an agent may be coded in any legacy editor and the resulting file uploaded into collaboration space to compiled into a placebot for automating tasks with respect to collaboration space objects.

SUMMARY OF THE INVENTION

In accordance with the invention, a method and system is provided for managing objects in collaboration space by receiving placebot code at a client browser; uploading the placebot code to a collaboration space server; and at the collaboration space server, compiling the placebot code into a placebot agent.

In accordance with an aspect of the invention, there is provided a computer program product or computer program element for managing objects in collaboration space by receiving placebot code at a client browser; uploading the placebot code to a collaboration space server; and at the collaboration space server, compiling the placebot code into a placebot agent.

Other features and advantages of this invention will become apparent from the following detailed description of the presently preferred embodiment of the invention, taken in conjunction with the accompanying drawings.

BRIEF DESCRIPTION OF THE DRAWINGS

FIG. 10 is a schematic representation of a screen capture illustrating creation of a new page in accordance with a preferred embodiment of the invention.

FIG. 14 is a schematic representation of a screen capture illustrating the user interface for in Place editing of Microsoft documents.

Figure 15:
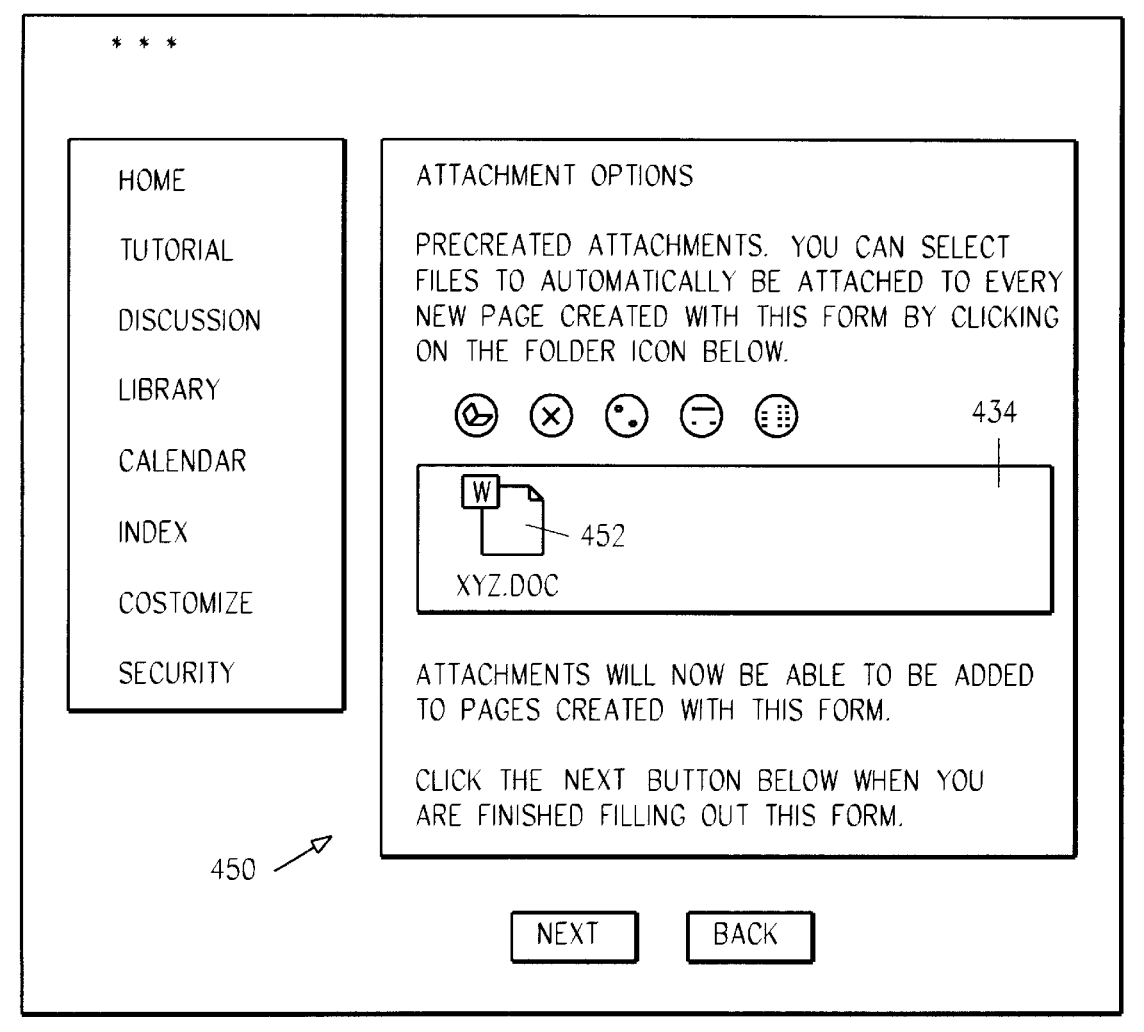

FIG. 15 is a schematic representation of a screen capture illustrating the user interface for attaching forms.

FIGS. 17–20 are schematic representations illustrating the user interface for editing a collaboration space file attachment and saving the changes back to collaboration space.

FIG. 24 is a schematic representation of a read scene state display for tasks.

FIG. 25 is a schematic representation of a user interface for integrating a form into workflow.

FIG. 27 is a schematic representation of a user interface including upload control.

BEST MODE FOR CARRYING OUT THE INVENTION

Architecture Overview

Figure 1:
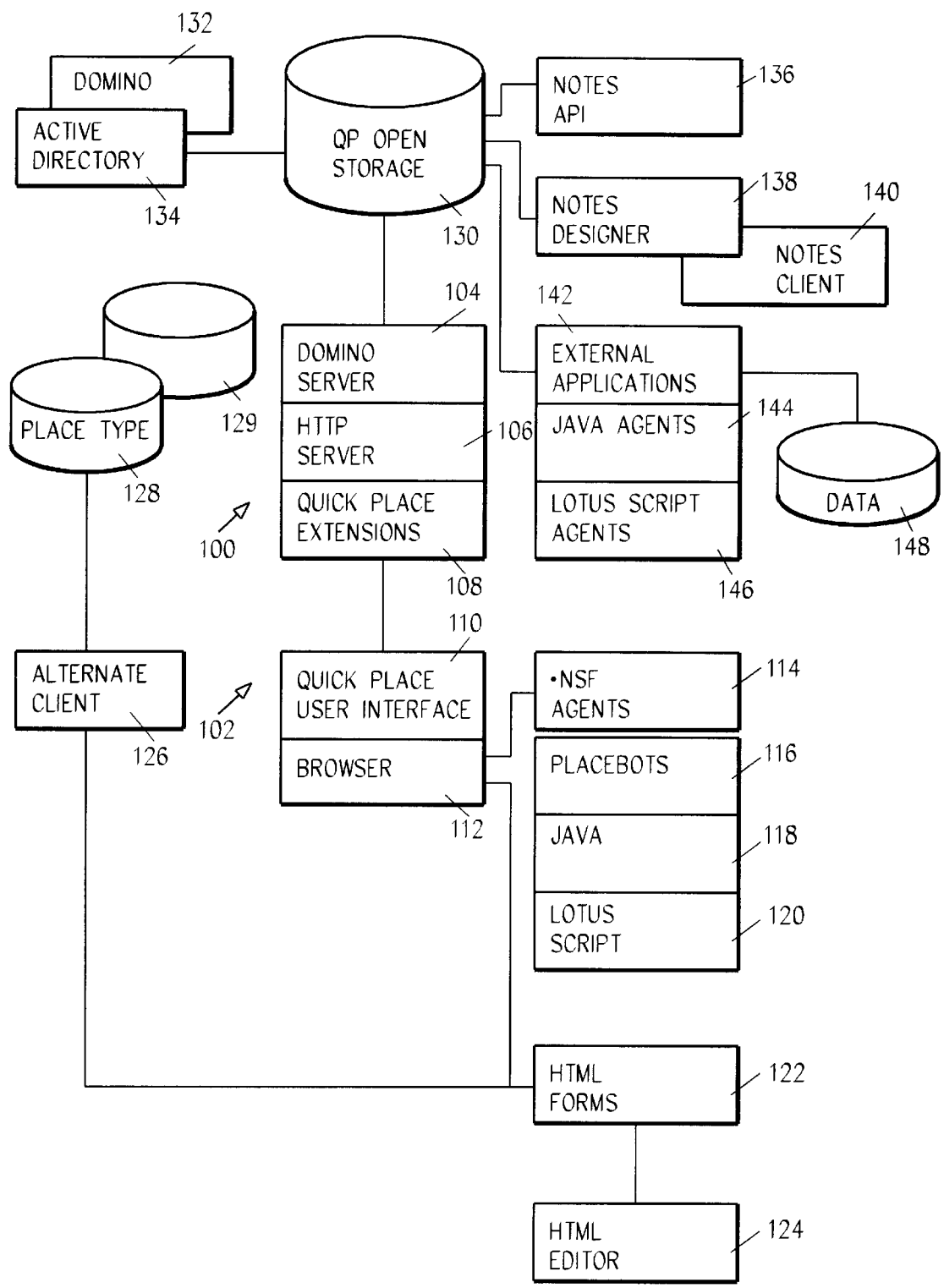
FIG. 1 is a schematic representation of a typical server/client system implementing the collaboration space of the preferred embodiments of the invention.

Referring to FIG. 1, a broad overview of a system implementing the collaboration space technology of an exemplary embodiment of the system of the invention is presented.

Server 100 includes a Domino server 104, HTTP server 106, QuickPlace extensions 108, and open storage 130. Client 102 includes a QuickPlace user interface 110 and browser 112.

QuickPlace open storage 130 includes all the databases and templates that implement the collaboration space. Domino 132 and active directory 134 define the collaboration process. The user interfaces with the system through browser 112. NSF agents 114, 116, Java 118 and LotusScript 120 represent components and templates downloaded from server 100 in support of collaboration space at client 102. All the extensions 108 are keyed off the URL, as will be further explained hereafter.

Notes API 136, Notes designer 138 and client 140, external applications 142, including Java agents 144 and LotusScript 146, are located off of open storage 130. Open storage 130 is storage where a document can be communicated, such that external applications 142 may manipulate it. QuickPlaces, pages, folders, can be created and changed, and data 148 can be imported and exported, using agents in Java 144 or LotusScript 146.

QuickPlace is primarily concerned with representing the collaboration space. Consequently, designers and consultants are able to integrate into that space custom features and data from other applications. HTML forms 122, written using an HTML editor 124, skins 248 (HTML 244 and QP tags), external files written using Java 118, and MS office documents 250 from MS office 228, may be imported to server 100 by dragging and dropping 111 from local storage 502 into an upload control panel 240 in browser 112.

An alternate client 126 and encapsulated place types 128 may be provided from which other spaces 129 can be created that take advantage of the QuickPlace storage model, providing functionality which can be manipulated using browser 112, including the integration of external technology providing opportunity for deep customization.

Server/Client Components

Figure 2:
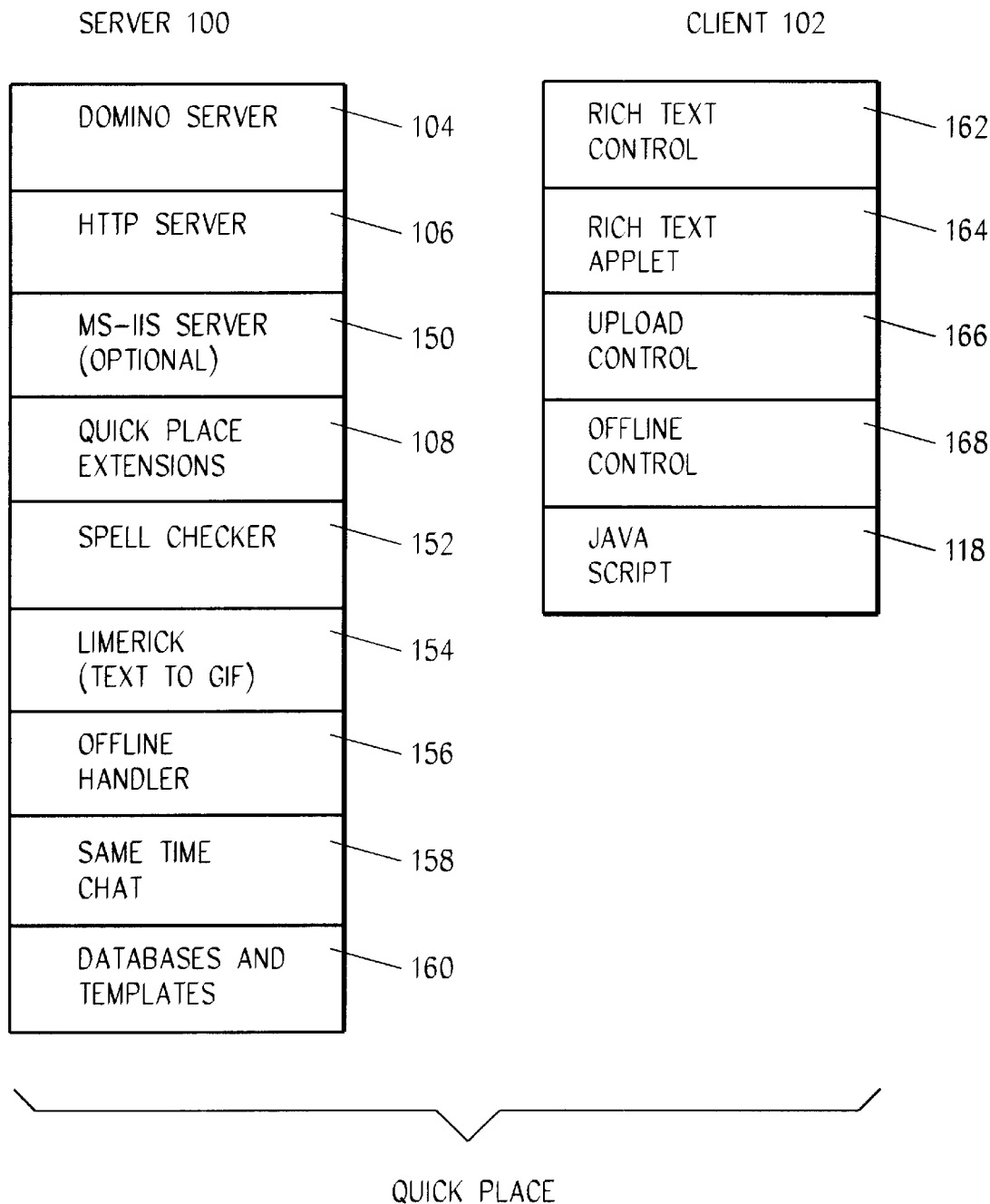
FIG. 2 is a schematic representation of various server and client components implementing the collaboration space of the preferred embodiments of the invention.

Referring to FIG. 2, in accordance with an exemplary embodiment of the invention, several components comprise QuickPlace server 100 and client 102.

QuickPlace is built on top of the Domino server 104. In the case of a stand alone installation, a subset of the Domino server is installed. Server 100 also includes HTTP server 106, or the optional MS IIS server 150. QuickPlace extension 108 is where we built most of the collaboration space implementing code exists the server 100. Server 100 also includes a spell checker 152 and a text to GIF converter (Limerick).

Client 102 includes rich text edit control 162, and applet 164 with which to apply various attributes and is a key component of the QuickPlace experience. Upload control 166 is used to attach and upload files, such as bringing in an agent and uploading it to a place. This is also used to bring in an imported HTML form or a different skin. Upload control is implemented to allow ease of use via drag and drop. Java script 118 includes code downloaded to the client to complete the generation of HTML pages.

Collaboration Space Object Model

Figure 3:
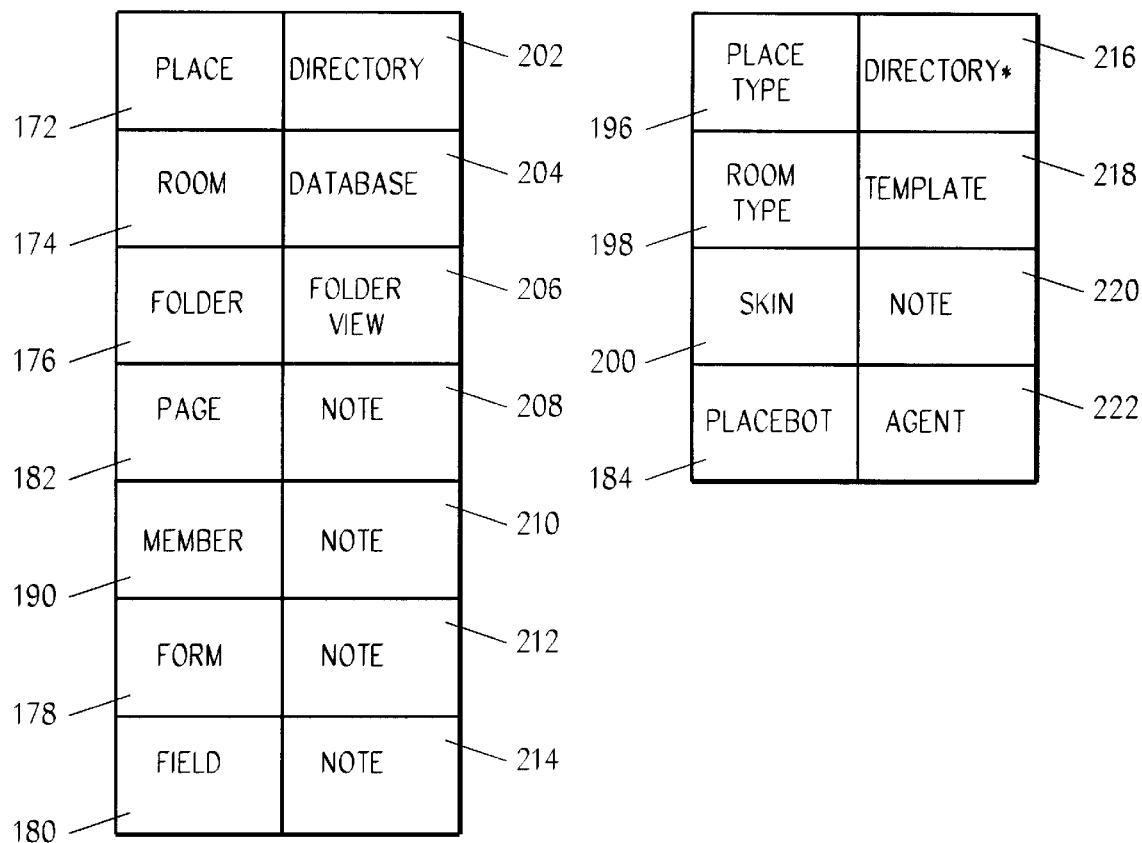
FIG. 3 is a schematic map illustrating Domino objects relating to the object model of the collaboration space of the preferred embodiments of the invention.

Referring to FIG. 3, the collaboration space of the preferred embodiment of the invention, referred to as QuickPlace, is implemented with an object model which comprises very few objects, very few concepts in order to make it easy to build and manage. And the fewer concepts, the better.

Referring to FIG. 3, the object model is independent of its implementation. There exists a place 172 that has rooms 174, and there are pages 182 in those rooms. And then there are members 190 of the place. Those four objects 172, 174, 182 and 190 are the primary objects.

Folders 176 add more complexity to the model, but bring a lot of benefit as well. Pages 182 are organized within folders. Two further objects are primarily visible to the designer of the place. And these are forms 178 and fields 180.

Place type 196 is a more advanced object, and is an object from which a place 172 is created. Place type 196 represents the foundation for building true collaborative applications. Everything created in building collaboration space is done in a place 172. Once such a place is created, it can be made a template 266 (FIG. 6) and copied as a place type 196. Once it becomes a place type 196, it is available for use by others for building additional places 172 that include the format, look and feel, and other characteristics of the original place.

Figure 11:
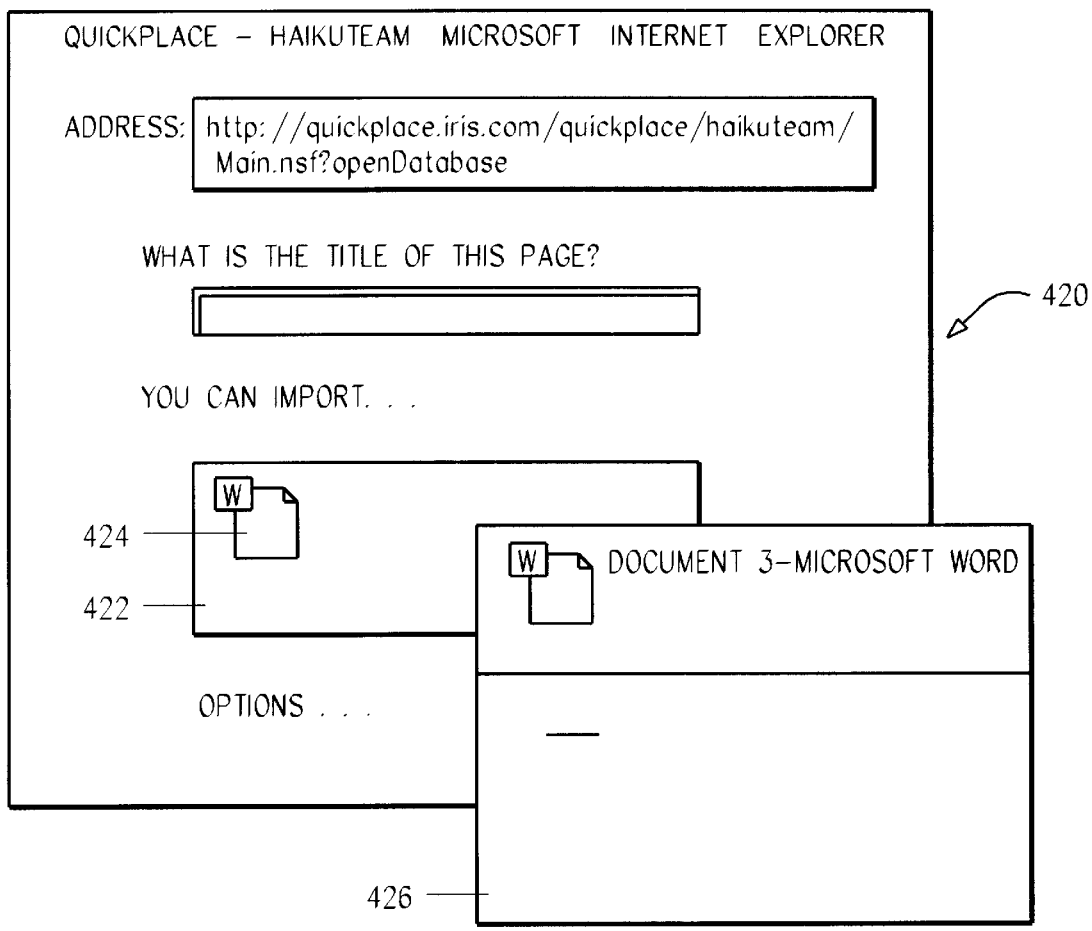
FIG. 11 is a schematic representation of a screen capture illustrating the user interface for creating a new page in collaboration space.

This is illustrated in FIG. 11, where a first place 360 is converted by QP extensions 108 into a place type, or template 364 from which additional places 366 may be created.

Room type 198 is an object provided for creating rooms 174 which are of a given type.

The last two objects illustrated in FIG. 3 are skins 200 and PlaceBots 184. Skins 200 control everything about the user interface, including layout and style. Layout defines the positioning of components on the screen. Style defines the form and colors of those components. A PlaceBot 184 is an enhanced agent, enhanced in the sense that it enables the use of Java or Lotus Notes or equivalent text editors. Once written using such an editor, and uploaded to a place 172, the server compiles the PlaceBot into an agent, reporting any errors. The agent resulting from a compiled PlaceBot can be scheduled to run at certain times, or upon opening a form. That is, the PlaceBot may be associated with a form, such as a sales order which, when opened, will cause the agent to execute. Thus, PlaceBots 184 are an essential part of building collaboration applications, for they are the primary repository for custom logic.

Referring further to FIG. 3, a preferred implementation of the object model heretofore described uses Lotus Notes/Domino concepts and objects. Thus, Notes/Domino file system directory 202 represents place 172; database 204 represents room 174; folder view 206 represents folder 176; pages 182, members 190, forms 178, fields 180 and skins 200 are represented by notes 208, 210, 212, 214, 220, respectively.

Place 172 is represented as a file system directory. So whenever a place called Acme is created, a file system directory 202 called Acme will be instantiated. Within that directory 202, there are a number of objects. Each room 174 is a Notes database 204. Folders 176 are implemented as Notes folders or views 206 depending on what's more convenient for the particular folder.

Pages 182 are a combination of data notes, forms and sub-forms 208. A member 190 is a data note 190 in a context room 174. Forms 178 and fields 180 are data notes. Place type 196 is a directory* 216 that contains all the rooms 174 that make up that place type. A room type 198 is a template 218. Skins 200 are a note 220 and PlaceBot 184 is an agent 222.

Notes/Domino Implementation of the Object Model

Developers familiar with the Domino Object Model (Domino OM) will be able to leverage their existing skills when developing on the QuickPlace platform. "PlaceBots" for example are implemented as Domino Agents, and it is possible to create and test them on Domino Databases. Within the QuickPlace object model (OM), however, there are some divergences from the Domino OM. For example, QuickPlace forms 178 are not the same as Domino Forms. QuickPlace forms more closely resemble Domino Documents, because they are created using a Domino form, and contain a Domino text field with a value of "h_Form". The value of "h_form" tells QuickPlace that this Domino document should be rendered in a browser as a QuickPlace form 178.

This structure provides flexibility for Web applications with less complexity than if Domino Forms were used. For example, in a default QuickPlace, a user can create a new QuickPlace form 178. The user chooses which fields to include in form 178, in what order they should appear and what text and or graphics should appear near them. To create this sort of instant structure on the Web using Domino Forms would be very complex indeed. QuickPlace has extended this concept of being able to use HTML to define forms 178 by enabling the creation of custom QuickPlace forms using imported HTML 122. These Forms not only make use of Web authoring technologies such as JavaScript, but also have the back end support of Domino. This back end logic is implemented via tools such as PlaceBots (Domino Agents) 184. This means that forms 178 have the ability to not only to define the look and feel of visible parts of an application, they also have the potential to initiate workflow and many other powerful automated features.

QuickPlace forms 178 have been optimized by stripping away many of the Notes features not required when used on the Web. A another advantage of this structure is that it enables the use of Web authoring tools to extend the objects. For example, with respect to QuickPlace forms, it is possible to modify forms using XML, JavaScript and HTML and any other Web tools. Knowledge of JavaScript and HTML are more common than Domino Designer skills, thus making the QuickPlace a very open platform. Some parts of the QuickPlace OM implement Domino/Notes functionality in different ways to a standard Domino application. For example, QuickPlace uses Domino's security and authentication model as a basis for its management of access to QuickPlaces. However, instead of primarily utilizing the Domino Directory, QuickPlace also uses a Contactsl.nsf database for each QuickPlace.

Containment and Association of Objects

Figure 4:
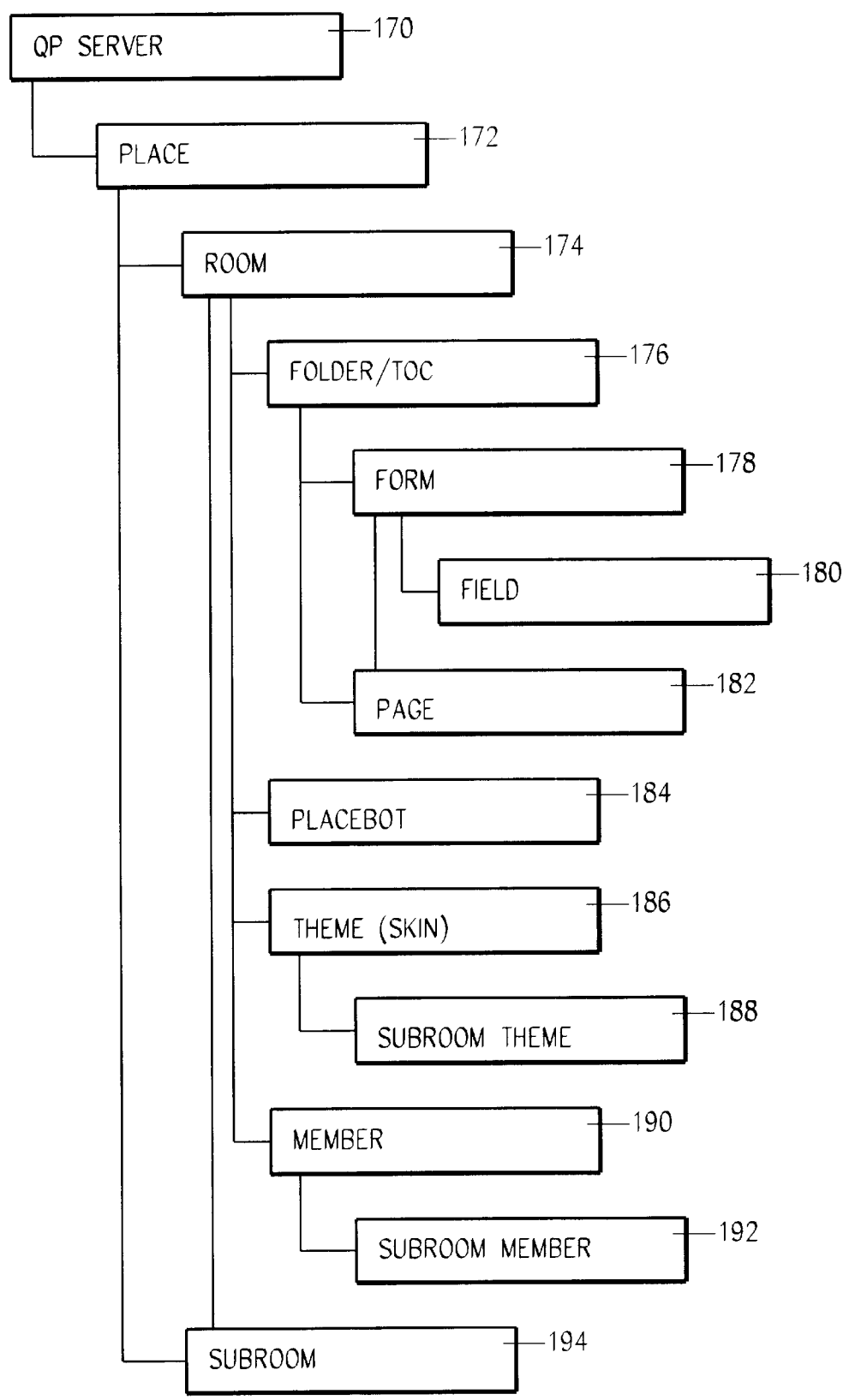
FIG. 4 is a schematic map of the object model implementing the collaboration space of the preferred embodiments of the invention.
Figure 5:
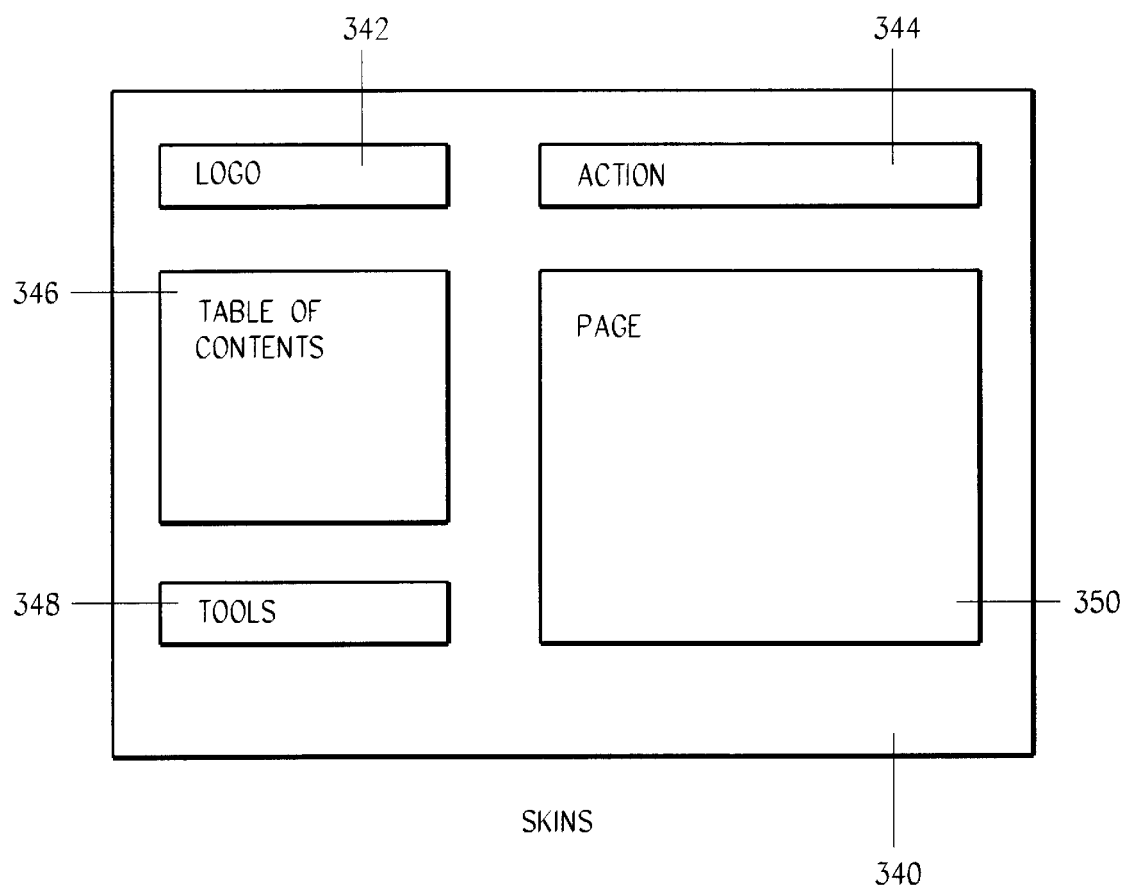
FIG. 5 illustrates the components of a collaboration space user interface.

Referring to FIG. 4, this object model is further described. FIG. 4 illustrates selected QuickPlace objects, the directory structure and how Objects relate to each other within the hierarchy. This model provides a visual representation of the containment and association between objects.

QuickPlace Server

The highest level of the model is the QuickPlace Server 170. Within server 170 are all of the QuickPlaces 172 as well as the resources they access to finally render Web applications.

This FIG. 4 displays the Model focusing on QuickPlaces. The following explanation, written from a programmers perspective, describes each of the objects of the model and they can be accessed in an application.

QuickPlace uses notes for many of its objects 182, 190, 178, 180 and 200, so that objects in the Place can be organized more easily. Table 1 sets forth the QP objects and their Notes/Domino equivalents. As an example of how design Notes are implemented consider the Table Of Contents (TOC). The Table Of Contents is a list of pages, folders and tools such as the Customize Area. Domino Folders may be listed using a link document, or Note.

TABLE 1

QUICKPLACE OBJECTS AND DOMINO EQUIVALENT

| QuickPlace Object | Domino Equivalent |
| --- | --- |
| QuickPlace Server | File Directory |
| Place | File Directory |
| Page | Data Note, Form & Subform |
| PlaceBot | Domino Agent |
| Theme | Data Note |
| Member | Data Note in Contacts1.nsf |
| Subroom * | NSF Database |
| SubroomTheme | Data Note |
| SubroomMember | Data Note in Contacts1.nsf |
| Room | NSF Database |
| Folder / TOC | Folder or View |
| Form | Data Note |
| Field | Data Note |

* Subrooms contain their own set of Folder, Page, Form, Field, PlaceBot & Subroom Objects QuickPlace Server 170 is a file directory containing all Places and Resources. The Domino equivalent is a file directory 202 named "quickplace". This identifies the main folder 176 for a QuickPlace server 170. If the QPServer 170 is running as a stand alone, this folder will be in the QuickPlace data folder. For example D:\QuickPlace\Data\quickplace.

If the QPServer 170 is running on top of a Domino server the folder will be the Domino Data folder. For example D:\Lotus\Domino\Data\quickplace.

To locate QuickPlace Server 170 in PlaceBots and get access to all of its databases, a LotusScript method GetDbServer is executed together with a test that the Path to databases starts with "QuickPlace".

Place Object

Place object 172 is a directory in the "QuickPlace" directory grouping resources for a Place. The Domino equivalent is a file directory bearing the name of the QuickPlace. Place object 172 is a directory that brings together a Place for organizational purposes. It also identifies the NSFs 114 as belonging to the place 172 by bearing the name of the QuickPlace. As distinguished from a place object 172, the main room 174 in a QuickPlace is a database called Main.nsf. Place object 172 groups and identifies the Main.nsf resources for the Place and any subrooms 194 in the Place. Place object 172 contains several files. There is a Main.nsf, Contactsl.nsf and a Search.nsf file. If the QuickPlace has a Subroom 194 there will also be an NSF file with its name starting with "PageLibrary". Each of these page library files is a Room 174.

The place object in PlaceBots 184: place object (directory) 172, contains the databases which form a place. When writing PlaceBots, one can search for this directory by using the name of the QuickPlace. In this directory will be found all the databases will belong to that place 172. This file directory's name is the name of the QuickPlace. For example, if the QuickPlace is called "Millennia", this directory has the following path within the QuickPlace server 170:

\millennia

To find the place object 172 for the Millennia Place in LotusScript the script procedure of Table 2 may be used:

TABLE 2

SCRIPT PROCEDURE FOR FINDING A PLACE

Dim ndbPlace As NotesDatabase
Set dirPlace = New NotesDbDirectory( g_sServerName )
Set ndbPlace = dirPlace.GetFirstDatabase( DATABASE )
sNdbPlaceFilepath = ndbPlace.FilePath
If Instr(1, Lcase( sNdbPlaceFilepath ),
|quickplace\millennia| ) Then
'//the Place is found Room object 174 is the main container for a Place, containing a collection of pages and tools. The Domino Equivalent an NSF Database. The room 174 is the main container for a QuickPlace's content. For example, when using the Millennia Place, most of what is seen is contained in the Room object. The Room object is always called Main.nsf, and holds folders 176 and pages 182 for the QuickPlace, as well as managing links to any subrooms 194 in the place object 172. Room object 174 uses elements held in other databases. For example many of the standard images QuickPlace displays are in a resources object (not shown). Each room 174 has its own security and authentication, and the information required to do this is contained in databases such as Contacts1.nsf. A room 174 breaks down a place 172 into smaller areas to help define structure. Each room 174 has its own security and authentication. This allows separate user groups. It also means that subrooms 194 can be created for separate projects, forming a separate shared space. The room object 174 then forms a common entry point where shared resources can be stored.

The room object in PlaceBots: to locate a room 174, one looks in the main QuickPlace Server 170 directory, then looks into the room object (a directory bearing the name of the QuickPlace), then looks for a database called "Main.nsf".

Returning to previous LotusScript example of locating a Place 172 (Table 2), the match string can be extended from "quickplace\millennia" to "quickplace\millennia\main.nsf"

to find the room object 174, as set forth in Table 3.

TABLE 3

SCRIPT PROCEDURE TO FIND A ROOM OBJECT

Set dirPlace = New NotesDbDirectory( g_sServerName )
Set ndbPlace = dirPlace.GetFirstDatabase( DATABASE )
sNdbPlaceFilepath = ndbPlace.FilePath TABLE 3-continued

SCRIPT PROCEDURE TO FIND A ROOM OBJECT

If Instr(1, Lcase( sNdbPlaceFilepath ),
|quickplace\millennia\main.nsf| ) Then
'//the Room id found.

To access elements contained in a room 174, the views and folders 176 in the room are accessed. For example to find the elements visible in the Table Of Contents (TOC), the "h_TOC" view is used.

The Room object 174 in HTML is visible in URLs as the "main.nsf". To access room object 174 most easily, a relative path is used from the current object if it is in the same Place 172. For example, when creating a URL link from a subroom 194 to a room 174, the URL begins as follows:

<a href="../../Main.nsf/ where the "dot dot slash dot dot slash" syntax is a part of the URL, not an abbreviation for this example. Using this relative URL makes the URL more robust. In other words, this URL can be used to find the (Main.nsf) room 174 for any place 172.

Room fields 180 used to define rooms 174 are set forth in Table 4.

TABLE 4

FIELDS DEFINING ROOMS

| Field Name | Description |
| --- | --- |
| h_HaikuName | The name of this Place |
| h_AreaType | The name of the template used to create this room. |
| h_AreaParent | The name of the parent database |
| h_ShowSecurity | If h_SetSecurity = 1, the QuickPlace server sets h_ShowSecurity to 1. |
| h_SetCalendar | Determines if the Calendar will be visible in a Room. If the field has the value of "1" a link to the Calendar will be displayed in the sidebar |
| h_SetSecurity | This field works in conjunction with the h_ShowSecurity field. It is only valid for Readers and Authors, because Managers must always be able to edit security of a Room. If the field is set to "1" a link to the Security page will be displayed in the sidebar for Readers and Authors (if they select Security in this case they will see only their own information) |
| h_MailDb | The name of the database that receives email addressed to this Place. |

Folder Object

A folder object 176 is an object for indexing content, grouping related pages 182, and dividing a room 174 into sections without imposing new security. The Domino equivalent is Notes folder or view 206, and Notes folders 206 have three functions. For the user, they provide a logical grouping of related documents. This makes it easier for the user to find documents, and allows people with a shared interest to work an area of a QuickPlace. The other way of using folders is in the user interface, or "User" folders. Within user folders there are seven different types:

1. Standard List
2. Headline
3. Slide Show
4. Response List

5. Ordered List
6. Table Of Contents
7. Index

Folder types 1 to 5 are all available as styles for new, custom folders. From the a site manager's perspective, a Folder allows a QuickPlace to be divided into areas for separate groups of people, without having to be concerned about access control which would be necessary if a Subroom 194 were used.

Fields Include the Following:

"h_LastAttachmentDirectory": used when getting attachments. This field enables users to quickly upload attachments. For example, each time a Layout file is uploaded, QuickPlace knows where to go looking for the file. This path information is sourced from this field.

"h_DirtyAesthetics Number": indicates which items should be checked (once a part of the aesthetics has been tweaked, a check mark indicates that the part has been changed).

h_AreaHasAesthetics: indicates if a Room has its own aesthetic settings enabled. If the field value is "1" the Room has had the aesthetics tweaked.

The third way that folders 176 are used is to allow developers to locate elements in a QuickPlace. To a developer, folders are indexes that allow look ups, therefore giving programmatic access to elements.

When any page renders in a Browser, the time it takes to render is directly dependant on the amount of information to be downloaded. The amount of information required to render a Folder is less than for a Page. When Pages appear in Edit mode, there is yet more information required to render it. Therefore, the quickest load time for a QuickPlace by first using a folder 176 as the first page the user sees when upon selecting a place. Once users have visited a folder 176, a subset of the resources used to render a page 182 will already have been downloaded. The folders used by developers are slightly different than the folders users would use. The h_Index lists the published pages in the Place and appears as the standard index of a Place, and the h_TOC is the table of contents list.

Some of the folders in look ups by developers are set forth in Table 5.

TABLE 5

VIEWS USED TO REFERENCE OBJECTS

| View Name | Description |
| --- | --- |
| h_Index | Provides a list of all published Pages in a Room, listed by h_UNID, the unique identifier for a Page. Lists all published items in a Room, this not only includes Pages but all of the Objects in a Place. For example, Pages, PlaceBots, Fields, Skins and Forms. |
| h_QDK | Every Design Note in a Place. The h_QDK view contains a form formula to open different documents using different forms. For example: If the field "h_Type" is "0" then use the form named "h_Page". The result of this form formula is that the QDK view allows developers to inspect the properties of some Design Notes. The supported types are: "h_Page", "h_Folder", "h_Room", "h_SubRoom", "h_Error" and "h_RoomType". |
| h_TOC | List of all items displayed in the Table Of Contents. Items must have the "h_IsInTOC" field with a value of "1" and be published with no replication-save conflict. |

TABLE 5-continued

VIEWS USED TO REFERENCE OBJECTS

| View Name | Description |
| --- | --- |
| (All) | Every item in the Room. Sorted by the h_Name field: the readable name of the item. For example "Welcome", representing the default Welcome page. |

The Place Object in PlaceBots: Internally, default QuickPlace Folders have readable titles. For example the response folder discussion" has the internal name of "h_Discussion" in the "h_SysName" field. A new response list style folder is called "SchwatzRaum" (which means "chat room" in German). The internal name of the SchwatzRaum Folder is: "h_F49791727035ACD1C12569510063087C" (which means "h_F49791727035ACD1C12569510063087C" in German). This unique identifier can be used in PlaceBots to locate the Folder. A lookup can be done in the "h_Folders" view of a QuickPlace to find the readable name of the folder. Another solution is to retrieve the name of the field by accessing the value in the h_SysName field. The Table of contents and the Index are special user Folders 176. Only one TOC and one h_Index exists per Room 174 or Subroom 194. They exist from the moment the Place or Room is instantiated.

Folder Fields

The following Fields are used to define data notes that render as Folders. Folders exist in a visible form within a QuickPlace. In other words they can be viewed by opening the NSF file in the Notes Client or Domino Designer. In conjunction with this view, a data note exists, providing information about that Domino View or Folder. Table 6 lists the fields are contained in the data note and provide information about the Domino View or Folder.

TABLE 6

FIELDS USED TO DEFINE FOLDERS

| Field Name | Description |
| --- | --- |
| h_FolderStyle | When creating a new folder, one is given the choice to create a new folder based on a number of templates. This field denotes which type of folder has been created. "1" = Standard List "3" = Headline "4" = Slide Show "5" = Response List "7" = Ordered List |
| h_FolderStorage | The "internal" name of the folder, in other words, the name by which it is known to the system. The value of this field is used in documents to tell QuickPlace in which folder it should be used. |
| h_CanAddPages | When creating a new folder, the manger is presented with the options, to the question "Who can add pages to this folder?". If only managers is chosen the value of "0" is written to this field. The default is " " which means all authors can add pages to this folder. |

Form Object

A form object 178 is a document used to create new QuickPlace content. The Domino equivalent is a data note of type "h_Form". Form object 178 is a resource used to create, manage and display content, therefore defining the schema of the application. Forms contain fields to hold data, therefore creating and displaying content. Forms can also contain scripts within them to provide logic within the Page. For example, a form can contain form validation to make sure that a field contains only numbers. Forms can also initiate processes outside the page. This is done by creating a PlaceBot 184 and associating the PlaceBot with a Form 178. PlaceBots 184 are not contained by the Form but there is a association between them.

Forms are created with the Domino Form "h_PageUI" with the field h_Type set to "h_Form". New forms 178 with custom structure and logic can be created by room managers.

Form Fields

Table 7 sets forth the fields 180 used to define the structure of a form 178.

TABLE 7

FIELDS USED TO DEFINE FORMS

| Field Name | Description |
| --- | --- |
| h_FormDescription | The content of this field appears as the description of the form appearing in the "New" page. |
| h_WorkflowType | Allows 1-4 approvers and some other options. This is normally set to "h_Standard". |
| h_ApprovalCycle | |
| h_EditorInChief | Allows 1 approver and fewer options. |
| h_MultipleEditors | By setting this field, all members of QP to edit pages created with this form. |
| h_Standard | None of the above. |
| h_SetPageComponent | sView Should = h_FieldDefinitions |

Field Object

Field object 180 is used to construct (HTML formatted) input fields in forms 178. The Domino equivalent is a Data note of type "h_Field". Fields are constructed from the Domino Form "h_PageUI" with a the field h_Type set to "h_Field".

QuickPlace field object 180 defines the structure of the container, not the content. The values contained in a page 182 are contained by the page, not the fields 180. The h_FieldType attribute to a field 180 determines what sort of field it is. This determines what the field will do when it is rendered in a browser. For example, a field 180 of type h_DateControl will provide the user with a date picker widget.

Domino fields are used to define the attributes of QuickPlace fields 180 are set forth in Table 8. QuickPlace fields 180 are drawn to the screen as HTML, they are not created by a Domino Field in a Domino Form.

TABLE 8

FIELDS USED TO DEFINE FIELDS

| Field Name | Description |
| --- | --- |
| h_IsUser | Defined h_True means this is a custom form |
| h_PublishInFolder | UNID of the folder +"|" + |

TABLE 8-continued

FIELDS USED TO DEFINE FIELDS

| Field Name | Description |
| --- | --- |
| h_FolderStorage | name of the folder |
| h_Name | "Import" and is related to the h_SystemName field which often has a similar value such as "h_Import". |
| h_FieldLabel | Instructional information that might be useful for someone editing this field. Similar to the Static h_FieldType. Containing information to help the user, but only displayed in edit mode." For example: <script> (h_CurrentSkinType == 'h_Edit')?"": C(self, 'Note: Clicking on the title of this page in its folder or in the sidebar will open the page that it points to. To edit the page again later, click its title in the Index.') ;</script>" |
| h_ContainerUNID | The UNID of the Form which contains this field. QuickPlace uses a Design Note to create forms, each of these having an internal name. The h_ContainerUNID contains the internal name of one of these QuickPlace Forms. |
| h_FieldType | There are many different types of Fields. The following types are listed as examples to help understand how Fields work in general. |
| "h_Attachments"= | Enables the attaching of files. |
| "h_CalendarControl"= | Includes date and time controls and a duration field |
| "h_DateControl"= | Date field with date picker widget |
| "h_DateTime"= | Contains Date and Time information. |
| "h_DocAuthor"= | Contains a Domino Heirachical name of the original Author of the Document. |
| "h_DocCreated"= | Creation date of the page. |
| "h_DocModified"= | Modified date of the page. |
| "h_DocSize"= | Size of the page. |
| "h_NamePopup"= | Select listing members of the QuickPlace |
| "h_RichText"= | Rich text field. Allowing editing via the rich text editor applet. |
| "h_Serial"= | A unique number to identify the document. |
| "h_Static"= | Static text, used to provide information about the accompanying field. May also include link to an image. |
| "h_Subject"= | The Documents subject. |
| "h_TaskControl"= | Used in the Task form to insert the task control tool. |
| "h_TextInput"= | Simple text equating to the "<input>" field in HTML. |
| "h_TextPopup"= | Text select list, equating to the "<select><option>" in HTML. |
| "h_TimeControl"= | Select lists for hours, minutes, AM/PM. |
| "h_CalendarControl"= | Field containing control tool used in the calendar field. |
| "h_CreateMSExcel"= | Field enabling the upload of Excel documents. |
| "h_CreateMSPowerPoint"= | Field enabling the upload of PowerPoint documents. |
| "h_CreateMSWord"= | Field enabling the upload of Word documents. |
| "h_Import"= | Field enabling the upload of imported documents such as HTML. |
| "h_MultipleImport"= | Field enabling the upload of multiple documents, such as a series of HTML documents. |
| "h_NotifyIndicator"= | Field indicating if members should be notified of the creation of content or their inclusion in the Contacts1.nsf. |

Page Object

Page object 182 is a basic building block for content. The Domino equivalent is a data note, form and subform. Pages form the basic units of content, relying on the structure of QuickPlace to create, manage and render them in a Web browser. It differentiates structure and content cleanly. Notes structural elements such as Forms Views and so on provide structure, whereas Notes Documents provide pure data content. In the Domino environment the division between structure and content becomes blurred. This is because when the data in a document is being represented in a Web browser, it is possible to use the data to format itself using HTML. The data is able to start defining structure by creating HTML links, tables, references to images and so on. In the QuickPlace OM, the same is true. Pages can be created in a number of ways. Table 9 sets forth the fields used for defining page objects.

TABLE 9

FIELDS DEFINING PAGE OBJECTS

| | |
|---|---|
| h_NotInSearch | Having the value of "1" will exclude the field from being included in a full text search. This allows functional content in fields such as JavaScript or static text to evade returning a hit during searching. |
| h_Position | Indicates the fields position of appearance in a form. Typically numbers such as 100 are used. |
| h_FieldFormat | "h_FieldFormat" indicates formatting options, "h_All" "h_BannerOptional" "h_BannerRequired" |
| h_BannerRequired | Always display subject as a banner at top of page |
| h_BannerOptional | Allow user to choose banner or not |
| h_NoBanner | Do not display the subject on the page |
| h_FieldIsRequired | 1 = The field is required and the user will be prompted if they do not fill it out. |

Page Fields

Page Object in LotusScript and JavaScript: developers wanting to customize pages 182 will generally want to manipulate the page's field 180 values. Fields existing in a Page are generally rendered to the HTML document in the background as JavaScript variables. They are then visibly rendered via document.write( ) functions. If a field exists, it can be accessed in the browser via a variable with the same name as the field.

The PageBody Field holds the main content or "body" of the page.

Table 10 sets forth the fields 180 used to define page 182 documents in QuickPlaces.

TABLE 10

FIELDS USED TO DEFINE QUICKPLACE PAGES

| Field Name | Description |
|---|---|
| h_Form | The QuickPlace form used to create this page. This is not the Domino "Form" field which denotes which form Domino links the file to. The Domino "Form" field will contain "h_PageUI" for virtually all objects in a QuickPlace. |
| h_PageType | This field is set to null when the document is a visible document. Only when the object is in design mode do the other values appear:<br>"h_Response" the document is a response to a topic document. This value is only valid in response folders.<br>"h_Revision" this means that the document is being revised, and is not available for public access.<br>"h_Mail" means that the document is a mail document, being either sent or received by QuickPlace. |
| h_Originator | The creator of this page. This field contains a full hierarchical name, for example: "CN=David Wyss/OU=QuickPlaceName/OU=QP/O=ServerName". All users have the second OU part of the name set to QP. This is done so that when QuickPlace is used on an Overlay server (QuickPlace and Domino together) QuickPlace can avoid conflicts between Domino registered users and QuickPlace users. |
| h_NameIsBanner | Denotes if the page's name should be displayed as a banner. If it is to be displayed as a banner, this field contains the value "1". Setting this field is done when the user clicks on the "Show the title, author and date on page?" checkbox. |

The JavaScript "document.write" method is used when using the PageBody to write out HTML content in a QuickPlace page. This field can be printed onto the screen via a document.write(PageBody) method called in a QuickPlace document. The following is an example of using this technique.

In a Placebot, write the contents of the document into the PageBody field. If the PlaceBot has not run, or not run correctly, the PageBody field will be empty. If the document is displayed in a form where the PageBody JavaScript variable is not declared, an error will be reported. To avoid an error through an undefined variable, use the "typeof" operator. This test assigns a message string to the sPageBodyMessage variable and prints that instead of the PageBody. To customize this message, the text in quotes on the PageBodyMessage line is changed. Then the following is included in the HTML document:

```
<script language=JavaScript>
if ( typeof( PageBody ) == "undefined" ) {
var sPageBodyMessage = 'Run the Mapperizer PlaceBot
                       to see a site map here...';
document.write( sPageBodyMessage )
} else{
document.write( PageBody )
}
</script>
```

Page Object in HTML: some of the most commonly referenced JavaScript variables in Pages are set forth in Table 11.

TABLE 11

COMMONLY USED JAVASCRIPT VARIABLES IN PAGES

| Field Name | Data Type, Description |
| --- | --- |
| h_Name | String, readable name of the Page |
| PageBody | String, content of the page. |
| h_SystemName | String, the internal name of a page. For example, 'h_Welcome' |
| h_Originator | String, full Notes format name of the document creator For example: 'CN=Anna Rath/OU=Millennia/OU=QP/O=Server'; |
| h_IsPublished | String, number representing "1" for published or "0" for not published. |
| h_LastTimePutAway | String, representing the date and time the Page was last saved '09/03/2000 07:54:08 PM' |
| Form | String, Domino Form name used to create the Page. Most documents in a QuickPlace are created with the 'h_PageUI' Form. The value that differentiates fields is the h_Type field. |
| HTTP_COOKIE | String, all cookies available to that Page. |
| HTTP_HOST | String, name of the server. For example 'millennia.com' |
| HTTP_REFERER | Page used to send the user to this page. |
| HTTP_USER_AGENT | String, browser used to access the current Page. For example: 'Mozilla/4.0 (compatible; MSIE 5.0; Windows NT; DigExt) ' |
| REMOTE_USER | String, full name of the person reading the Page, for example: 'CN=Doug Mudge/OU=Millennia/OU=QP/O=Server'; |
| Server_Name | String, the server name, for example: 'dwyss.lotus.com' |
| h_DocSize | Integer, size of the page, for example: 4705 |
| h_ModifiedDate | String, date and time the page was last saved, for example: '09/03/2000 07:54:05 PM'; |

Using Notes name format in pages can be done with the following JavaScript Function:

```
function fnGetSimpleName(sTxt) {
iTxtStart = sTxt.indexOf('=') ;
iTxtStart++;
iTxtEnd = sTxt.indexOf('/') ;
if(iTxtEnd == -1) iTxtEnd = sTxt.length;
sTxt = sTxt.substr(iTxtStart,iTxtEnd - iTxtStart) ;
return sTxt;
} ;
return fnGetSimpleName ('CN=Doug Mudge/OU= Millennia/OU= QP/O=Server')
```

This JavaScript will return the string "Doug Mudge"

PlaceBot Object

A PlaceBot object 184 is a Java or LotusScript Domino Agent, used to create or manipulate QuickPlace objects automatically. Domino Equivalent: Domino Agent.

For Java and LotusScript programmers, the PlaceBot is the main way of implementing sophisticated functionality to a QuickPlace. Within the bounds of an HTML document, industry standard authoring tools such as HTML are used. To make links between Objects and manipulate QuickPlace Objects, PlaceBots are used.

Theme Object

A theme object 186 is a group of files which defines the look and feel of a QuickPlace. The Domino equivalent is a group of data notes.

Themes are a mechanism for determining the layout and appearance of a QuickPlace. They also help introduce functionality, and although not their primary function, some content. There are two types of themes 186 in QuickPlace. User defined or custom themes" and default Themes.

Subroom Theme Object

The subroom theme object 188 is a subset of themes 186 in a QuickPlace. The Domino equivalent is a data note. By default, subrooms 194 inherit the theme 186 being used by the (main) room 174. Only when the theme being used in the subroom 194 has been modified, does it act independently of the room 174.

Member Object

A member object 190 is a data note listing a user in the Contacts1.nsf. The Domino equivalent is a note in contacts1.nsf. Members 190 are records specifying user-access to a room 174. A member note contains information about a team member of a QuickPlace. In addition to this data, the member must be listed in the access control list (ACL) of main.nsf and in a group in names.nsf to pass authentication.

Table 12 sets forth the fields 180 used to define members 190.

TABLE 12

FIELDS USED TO DEFINE MEMBERS

| Field Name | Description |
| --- | --- |
| h_Password | This member's password. Encrypted with @Password |
| h_FirstName | This member's first name |
| h_LastName | This member's last name |
| h_PhoneNumber | This member's phone number |
| h_EmailAddress | This member's email address |

Table 13 sets forth the fields 180 used to define Groups.

TABLE 13

FIELDS USED TO DEFINE GROUPS

| Field Name | Description |
| --- | --- |
| h_Members | The list of members who belong to this group, listed in full heirachical format. |

Subroom ember Object

A subroom member object 192 is a subset of entries in the main room 174 of a QuickPlace. The Domino equivalent is a Data note in contactsl.nsf. Subroom member 192 has a similar structure to a room member 174, but specifies user-access to the SubRoom. These SubRoom members 192 are a subset of the (main) room 174 members list. This means that to grant access to new users, they must first be added as readers (or greater) in the main room 174.

SubRoom Object

A subroom object 194 is a container within a QuickPlace with separate security to main Room. The Domino equivalent is an NSF Database. Subrooms 194 are similar in structure to Rooms and are used to create discreet meeting places for subset of the Members in a Place.

The subroom object in PlaceBots: To locate a room, look in the main QuickPlace Server directory, then look into the Place Object (a directory bearing the name of the QuickPlace). The Subroom will be named "PageLibrary" followed by a 16 digit hexadecimal time stamp number, such as "0123456789ABCDEF" then the ".nsf" suffix. By way of example, the following script looks for a Subroom to the Millennia place:

Set dirPlace=New NotesDbDirectory(g_sServerName)
Set ndbPlace=dirPlace.GetFirstDatabase(DATABASE)
sNdbPlaceFilepath=ndbPlace.FilePath
If Instr(1, Lcase(sNdbPlaceFilepath),
|QuickPlace\millennia\pagelibrary|)
Then The Instr method has been used to look for this database, down to the PageLibrary part of the string, because it is difficult to know what the 16 digit number will be.

Page Object in HTML: To create URLs to reference Subrooms, the URL is built in the Main Room using either the "h_Area" view or the "h_TOC" view to create the path. This View contains the "h_LocDbName" field as the first sorted column.

Resources Object

A resources object(not shown) is database of shared resources, having as its Domino equivalent NSF Database. It serves as a centralized container for resources required in all QuickPlaces on a server. Images, layout files and fonts are stored in this database. For example resources such as the button that appears beside the simple search image "Go.gif" is stored in this database. The easiest way to find items in this database is by scrolling through the h_SystemNameView. A dummy form may be used to view such elements.

Common QuickPlace Object Fields

In Tables 14 through 18, fields and JavaScript variables in the h_PageUI form are set forth. These include general fields which can be customized for each layout, fields to define publishing status, fields for defining locations, fields for defining security, fields for defining workflow status, fields for defining calendars, respectively.

System objects have special meaning depending on the type of object. The following tables describe fields in various QuickPlace Object types.

TABLE 15

FIELDS USED TO DEFINE PUBLISHING

| Field Name | Description |
|---|---|
| h_IsPublished | 1 = This object is currently published |
| h_IsHidden | 1 = This object is not shown to the user |
| h_SetReadScene | The name ot the default scene (subform) to use when viewing this object |
| h_SetEditScene | The name of the default scene (subform) to use when editing this object |
| h_PublishedVersionUNID | If this object is being edited and the current object is the draft version, the UNID of the published version of this object. |
| h_DraftVersionUNID | If this object is being edited and the current object is the published version, the UNID of the draft version of this object. |
| h_LastTimePutAway | The last time that this object was changed: Published or Saved under construction. |

TABLE 16

FIELDS USED TO DEFINE FOLDERS LOCATION

| Field Name | Description |
|---|---|
| h_FolderUNID | The name or UNID of the Notes Folder where this page resides. |
| h_IsInToc | 1 = This object is shown in the Table of Contents (sidebar). |
| h_CurrentPosition | The position of this object with respect to other objects in the collection. |
| h_SetParentUNID | If this is a child or response object, the UNID of the parent object. |

TABLE 17

FIELDS USED TO DEFINE SECURITY

| Field Name | Description |
|---|---|
| h_Readers | If this object is protected from readership, the list of names, groups, and or roles that can read this object. |
| h_Authors | If this object is protected from authorship, the list of names, groups, and or roles that can author this object. |

TABLE 18

FIELDS USED TO DEFINE WORKFLOW

| Field Name | Description |
|---|---|
| h_WorkflowStage | Indicates the status of the document within the workflow. h_New = Created but not yet submitted for approval h_Submitted = Has been submitted and it is being reviewed h_Published = Has been approved h_Rejected = Has been rejected |
| h_SetNextStageUser | The name of the next person in the workflow cycle. |
| h_CurrentApprover | A number designating the current person in the workflow cycle. 0 means the Originator. The list of persons associated with the workflow cycle is stored in the form used to create this page. |

Customizing the Object Model

While much of a QuickPlace can be customized via a browser, there are some parts of QuickPlace which can only be customized using a Notes Client and or the Domino Designer.

Changes that can be made via a browser, using Web authoring tools such as an HTML editor relate more to the user interface. For example, editing a skin can be done using an HTML editor. Changes made to QuickPlace Objects are done through the Notes client and in Domino Designer. For example, inspecting and customizing the images appearing in default QuickPlace pages must be done via the Notes Client.

In order to implement PlaceBots (Bots) in a QuickPlace it is cumbersome to test the Bots only in QuickPlace, especially when uploading the PlaceBots each time over the Internet. The Notes Client and Domino Designer may be used as a local test environment, thus allowing changes on the Bots, as well as providing an integrated development environment, with help files and debugging mechanisms. When finished creating and testing the Bot in the Designer, it may be uploaded to the QuickPlace and testing finished there. Using the Notes Client and the Domino Designer also allows creation of new objects in a QuickPlace. Taking this a step further, it is possible to redefine the object model, by adding features to a standard QuickPlace. Core Domino technology is a proven platform, providing many powerful tools for a project. For developers who are not familiar with Domino, they can use a wide range of development skills such as HTML, XML, DHTML, JavaScript, Image manipulation, Java and C++. Domino developers can also leverage Domino development skills, but either way it is possible to create robust web-based applications, without having to re-invent the wheel.

QuickPlace Object Model and HTML: Building URLs

Building URLs in a QuickPlace is an important issue, due to the fact that QuickPlace is a browser based application. Understanding QuickPlace URLs is also a good way of understanding the object hierarchy in QuickPlace. The relationship between URLs and the QuickPlace Object model flows in both directions. Understanding the structure of URLs helps understanding the QuickPlace Object model. Conversely, once the QuickPlace object model is understood, how to use URLs to manipulate a QuickPlace becomes apparent.

URLs in QuickPlace use the same structure as in Domino. Domino URLs allow locating documents by using the key value of the first sorted column of a view, then generate a URL to link to a document using this key. Once the documents are located, they are not always opened in the browser. Sometimes they are read and their contents exposed and used by other objects.

An example of locating a file without opening it is when a QuickPlace skin accesses a JavaScript LSS file. The user never sees the LSS page, but its contents are used by the visible page to render objects and perform functions. To locate a document in Domino, the initial part of the URL is pointed to the host server, then the database containing the required document. The next part of the URL must point to a view with the first column specified as being sorted. This first, sorted column becomes the key column. Then a URL is used to open the document, as in the following example:

http://Host/Database/View/Key?DominoURLCommand

Where:

View: is the name of the view. To access a document regardless of the view, substitute a zero (0) for the view name and specify the document by its universal ID.

Key: is the string, or key, that appears in the first sorted or categorized column of the view. If the key has spaces in it, substitute these for plus signs when creating a URL.

This syntax is used to open, edit, or delete documents and to open attached files. Domino returns the first document in the view whose column key exactly matches the Key. There may be more than one matching document; Domino always returns the first match. The key must match completely for Domino to return the document. However, the match is not case-sensitive or accent-sensitive.

DominoURLCommand: Is the instruction to Domino of what to do with the file when found. For example, ?OpenDocument, ?EditDocument and ?DeleteDocument.

If this DominoURLCommand is omitted a default will be substituted. For example, in the previous URL if the OpenDocument argument is omitted in a URL command the document will still open because the command is automatically interpreted as OpenDocument.

The structure of URLs in a QuickPlace is the same as in any Domino database. QuickPlace objects are quite often referred to via relative URLs. For example, to reference a page that has been created, the following syntax is used:

../../h_View/PageName?OpenDocument

Where: "../.." section at the front of the URL creates a relative URL, is interpreted by the Domino server as referring to the parent objects of the current object (h_View and PageName).

Examples:

http://www.mercury.com/register.nsf/Registered+Users/Jay+Street?OpenDocument http://www.mercury.com/register.nsf/0/466c5172561e1c5c852566c2005f6bbb?OpenDocument Many QuickPlace objects in QuickPlace have internal names beginning with "h_". This is refers to the internal name of QuickPlace which is "Haiku". To reference images, JavaScript library files or files other than pages, the following syntax can be used . . .

../../h_Index/Document+Name/$File/Imagename.gif?OpenElement

Or . . .

../../h_Index/Document+Name/$File/ScriptLibName.js?Open Element

Many objects in QuickPlace can be located via the h_Index View. It contains links to many of the published objects in a QuickPlace. When referencing a JavaScript file the ?OpenElement argument is used. This is to tell Domino that the file being accessed is not a page to open, which is the default action.

Building URLs: Referencing Images

Figure 6:
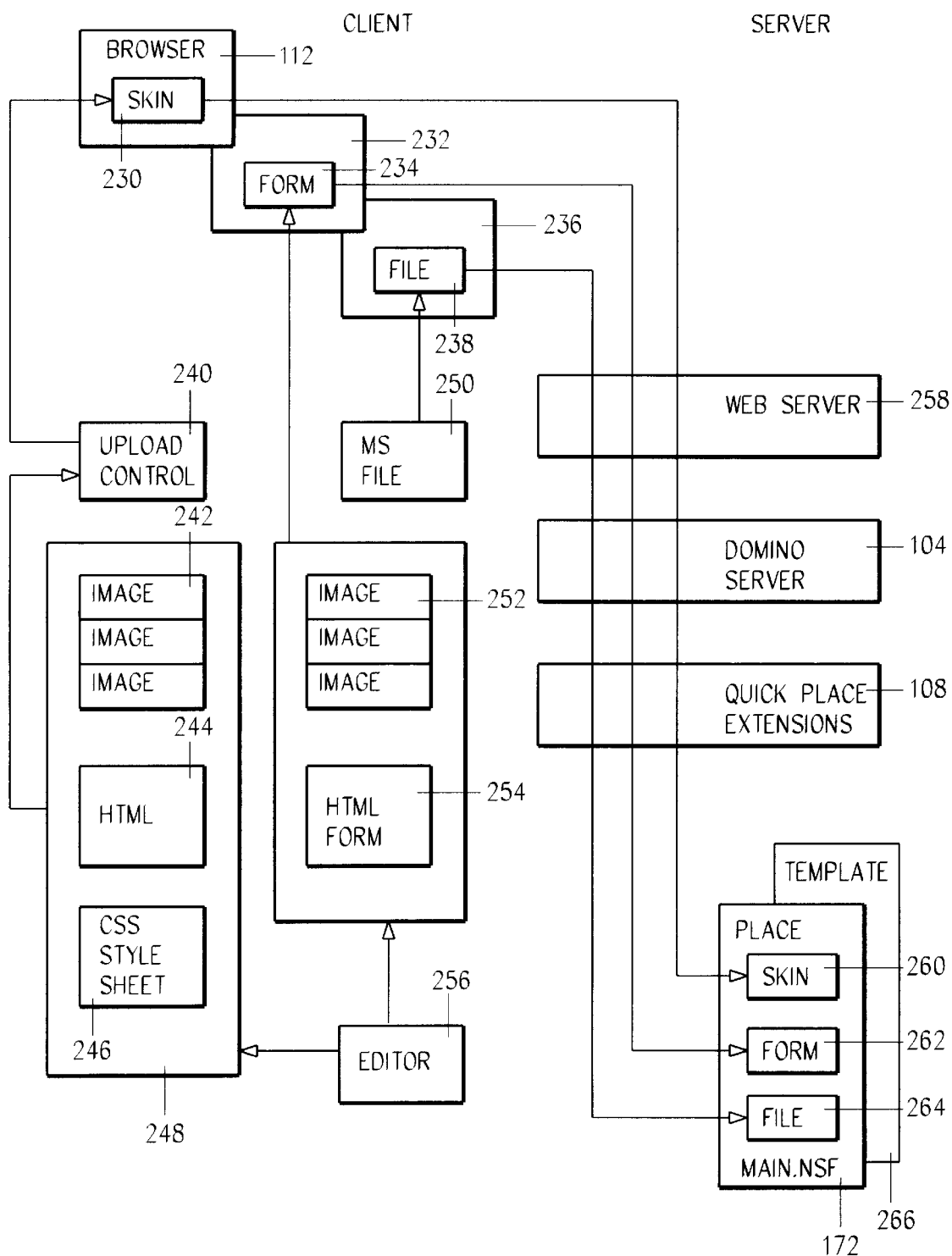
FIG. 6 is a flow chart representation of generation of collaboration space data objects.

The following section deals with the issue of using images in QuickPlace. Referring to FIG. 6, due to the fact that QuickPlace is a platform for creating Websites, images 242, 252 form a vital part of the QuickPlace object model. QuickPlace's structure provides many ways to include images in pages. For example when creating skin files 260, the images 242 are automatically uploaded into the QuickPlace 172 when the skin file 230 is uploaded.

Described hereafter are techniques involved for fully automated importing procedures within QuickPlace. An example of an automated importing would be when creating and uploading a Microsoft Word file 250. When this is done the images are imported without any interventions.

There are also instances where some developer intervention is required, such as when creating a Skin file 230, or writing an importable HTML file 254, or referencing files required to display the results of a PlaceBot and so on.

Creating skin files are fully described hereafter in connection with themes.

Three methods are used for importing images. These are:

Method 1: Provide a URL to an image and let QuickPlace upload the image. This method is used when creating skins and imported HTML documents that do not use JavaScript to reference images.

Method 2: Create a URL, have QuickPlace upload it, then reference it using HTML or JavaScript. This method is used when rendering image using JavaScript.

Method 3: Manually upload images into a document and reference them via URLs from a separate document. This method is used if the image is very large and it desired to have the user's browsers be able to cache the image; or if the image is referenced within a JavaScript function (QuickPlace does not import images when they appear within JavaScripts); or the image is referenced within a PlaceBot which creates new pages.

The solutions selected for a particular application may be a mixture of all three. For example:

Referencing Images: Method 1. Create a Skin file or HTML imported page and let QuickPlace import it. This works in skins and imported HTML, and is the easiest way of importing images into Skins and HTML Pages. When a valid link to an image within an HTML page or a Skin is created, QuickPlace will upload it automatically when the Skin or HTML file is uploaded. For this to work, a valid URL must be created. This may be done as follows:

In the skin file or importable HTML document, download all the images in a local directory. The simplest way to do this is to save them in the same folder as the skin or HTML page. For example, the URL for an HTML file may be:

<img src="transparent.gif" width=5 height=1 alt=" " border="0">

Referencing Images: Method 2. Prompt QuickPlace to import the file into the current document, then reference the file using JavaScript. This method is the most efficient method to use when referencing an image via a JavaScript function (in a Skin for example) or when updating a document via a PlaceBot.

To force QuickPlace to upload the image, a valid URL to the image at the top of the page must be created. By rendering it in a 1 pixel×1 pixel size, making it too small to see, the image is still uploaded, but the user will not notice the image. The images must also be named when they appear in their 1×1 pixel format. By using this name, the image is made available to JavaScripts below it on the page. This is done by adding the image to the source code near the top of the page. To force QuickPlace to upload the image, it is rendered in HTML format, then the uploaded image referenced in the JavaScript.

Overview: PlaceBots

In accordance with a preferred embodiment of the invention, PlaceBots are provided for sharing documents and holding discussions with team members, for adding program logic to a place itself to perform actions which can be triggered as the result of submitting a form or scheduled to run at a particular time. For example, every three hours a PlaceBot program may execute to browse customer complaints, parse for specific key words, and move documents to related specific folders. Or, a PlaceBot may be written to perform actions responsive to customer complaint.

A PlaceBot is implemented by an agent. For example, a browser user creates a reviewer, sends the invitation, adds logic—using Java code. Then, the Java code is attached to a QuickPlace by dragging and dropping the code into a QP form. The QP server receives and compiles the code into a notes agent. Thus, code is integrated into a QuickPlace using a browser. The QuickPlace server compiles and link edits the code so that every time a reviewer is created that code gets run.

Overview: Imported HTML Forms

In accordance with a further embodiment of the invention, a review form may be designed in HTML separate from QuickPlace. The resulting form is then dragged and dropped into QuickPlace, which creates a form for it. This is done by creating a field for each html tag. Thus, each HTML field is parsed to create a corresponding QuickPlace field.

For HTML files, the HTML file is parsed, the linked images found, and the URLs processed. The original file, linked files, and the resulting HTML are then saved on the page with the HTML displayed in read mode, and the orginal file in edit mode.

Overview: MicroSoft Office Based Forms

In accordance with a further embodiment of the invention, an existing Excel spreadsheet or Word document in a power point presentation, for example, is used as a template, dragged and dropped by the browser user into a QuickPlace, which then creates from it a QuickPlace form. Thereafter, users can create new MicroSoft documents using the QuickPlace form.

For Office documents, the MicroSoft office native mechanism is used to convert the page to HTML. The original file and the resulting HTML are then saved on the converted page, with the HTML displayed in read mode, and the original file in edit mode.

Overview: Forms and Task Fields

In accordance with a further embodiment of the invention, a web browser way of creating and designing forms is provided. A browser user may, using QuickPlace and interacting with the QuickPlace user interface, create a form as an object of the QuickPlace and select and create fields for that form.

Overview: In Place Editing

In accordance with a further embodiment of the invention, a browser user can create MicroSoft Office documents from within QuickPlace, such as a new Excel web sheet. QuickPlace will automatically launch Excel, and when Excel is closed, QuickPlace will bring in the Excel spread sheet.

Using HTML

Because the Page, ListFolder, and Slideshow layouts share so many common components, one HTML file that applies styles to these three layouts can be created. HTML for the Slideshow Folder is created, which contains the superset of components used in the three layouts. To control how the non-applicable components display for a layout—for example, the Jump component for the Page layout, and the AuthorAndModified and Revision components for the ListFolder—various results are achieved by setting the emptyFormat, prefixHTML, and postfixHTML parameters.

For example, to have the empty components occupy the same vertical space as they do when in use, set the parameter as follows:

emptyFormat=" "

By placing each component in a separate table row, the component's row "collapse" when it is empty, so that it occupies no space. Given that the prefixHTML and postfixHTML parameters are not output when the component is empty, these parameters can be used to provide the following table structure:

emptyFormat=" "
prefixHTML="<tr><td>"
postfixHTML="</td></tr>"

Style Sheet Selectors in QuickPlace

Figure 7:
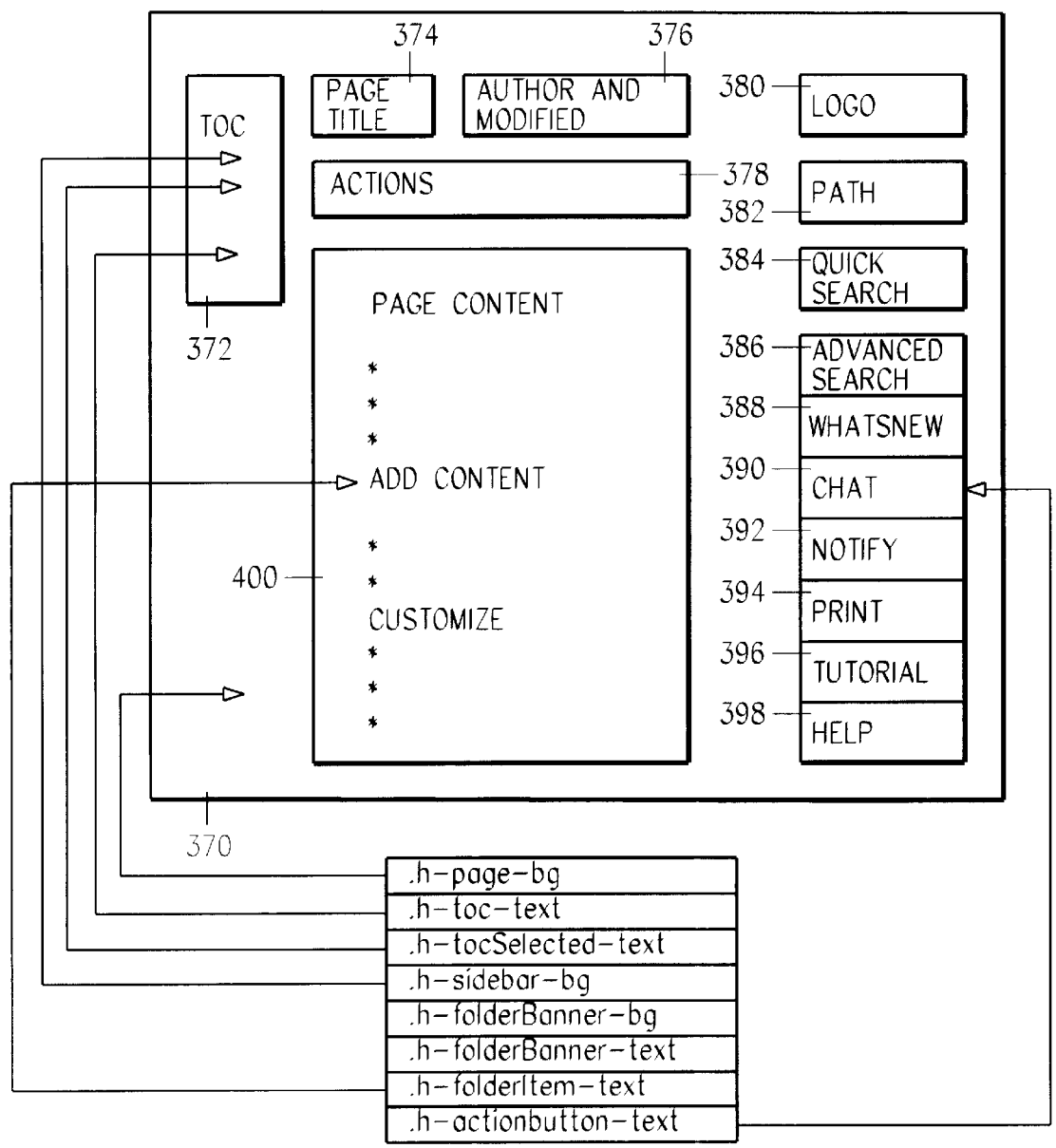
FIG. 7 illustrates a typical collaboration space user interface.

Referring to FIG. 7, a typical QuickPlace user interface 370 includes a sidebar (TOC) 372, page title 374, author and modified field 376, actions bar 378, logo 380, path 382, page content 400, and actions buttons, such as quick search 384, advanced search 386, whatsnew 388, chat 390, notify 392, print 394, tutorial 396 and help 398. Each of these is customized by using tags or selectors which deal with borders, background, text, and so forth, in accordance with a style sheet.

A standard default stylesheet is always output with any theme, so that one need only to specify the selectors that are to be changed. Undefined properties will fall back to those defined in the default stylesheet.

Tables 19 through 27 describe Style Sheet (CSS) Selectors.

TABLE 19

Tag Styles

| CSS Selector | Description and Notes |
|---|---|
| body, td | Default text style. Note: specify both tags to set the default text style. |
| a | Anchor style. Note: see also several other more specific anchor styles, below. |
| a:hover | Default style of anchors when mouse is over the anchor. Note: IE only. |
| form | Default style of forms. Note: The margin-bottom property is set to 0px by default to remove unwanted whitespace from the bottom of all forms. |

(Note: Other tags, such as h1, h2, etc., can also be styled as needed.)

TABLE 20

Page Background

| CSS Selector | Description and Notes |
|---|---|
| .h-page-bg | Page background. Note: class assigned to body tag of all pages. For IE only, the margin properties can be set to control the page margin. |

TABLE 21

Folders, What's New, Search Results, Tasks (list view)

| CSS Selector | Description and Notes |
|---|---|
| .h-folderBanner-bg | Background of folder banner. Note 1. |
| .h-folderBanner-text | Text in folder banner. Note 1. |
| a.h-folderBanner-text | Anchors in folder banner. Note 1. |
| .h-folderBannerSelected-text | Text of selected ("current") item in folder banner. Note 1. |
| a.h-folderBannerSelected-text | Selected anchor in folder banner. Note 1. |
| .h-folderItem-bg | Background of items listed in folder. Note 1. |
| .h-folderItem-text | Text of items listed in folder. Note 1. |
| a.h-folderItem-text | Anchor listed in folder. Note 1. |
| .h-foldercompact-text | Compact text of item listed in folder. Note 1. |
| .h-folderAbstract-text | Abstract text of item listed in folder. |
| .h-folderBar-bg | Background of bar to left of a thread. |
| .h-folder-dl { | Indentation of responses in response folder. Note: by default, the margin-bottom property is set to 0px to remove unwanted whitespace below indented items in response folders. |
| .h-folderInterspace-bg { } | Background color of vertical space between responses. |
| .h-folderInterspace-text { | Height of vertical space between responses. Note: use font-size to set the height. |
| .h-folderSpace-text { | Height of vertical space between threads. Note: use font-size to set the height. |

Note 1: This style is used for the banner that displays column titles, as well as other banners in What's New, Search Results, etc.

TABLE 22

Tasks (timeline view)

| CSS Selector | Description and Notes |
|---|---|
| .h-tasksBannerNow-textbg | Highlighted current date in Tasks banner. |
| .h-tasksItem-bg | Background of items listed in Tasks. |
| .h-tasksItemTimeline-bg | Highlighted period of a task. |
| .h-tasksItemMilestone-bg | Highlighted period of a milestone |

TABLE 23

Calendar

| CSS Selector | Description and Notes |
|---|---|
| .h-calendarLabel-text | Date label. |
| .h-calendarLabelSelected-text | Date label (today's date). |
| .h-calendarItemOther-bg | Background of day not in current month. |
| .h-calendarItemToday-bg | Background of today's date. |

TABLE 24

Text and fields in Page layout

| CSS Selector | Description and Notes |
|---|---|
| .h-field-text, .h-field-text td | Style of the text value of a field. Note: use this exact selector, as shown, to style field text distinctly from regular page content. |
| .h-pageSmall-text | "Smallprint" page text. |
| .h-fieldSmall-text | "Smallprint" text content of fields. |
| .h-fieldHeader-bgtext | Field header. |
| .h-fieldOrder-bgtext | Number to the left of the field header. |
| .h-page-text a:visited | Anchors inside the pageContent skin component which have been visited. Note: IE only. |

TABLE 25

Edit Layout

| CSS Selector | Description and Notes |
|---|---|
| .h-fieldHeaderEdit-bgtext | Field header |
| .h-fieldEdit-text, .h-fieldEdit-text td | Field description text. Note: use exact selector, as shown. |
| .h-fieldOrderEdit-bgtext, div .h-fieldOrderEdit-bgtext td | Number to the left of the field header. Note: use exact selector, as shown. All properties in this selector must be marked ! important to take effect. E.g., color: green! important. |
| .h-fieldSmallEdit-text | Small field text. Note: all properties in this selector must be marked ! important to take effect. |
| .h-fieldSpecialEdit-text | Special field text. Note: used in Task Info field. All properties in this selector must be marked! important to take effect. |

TABLE 26

QuickSearch

| CSS Selector | Description and Notes |
|---|---|
| .h-searchField-text | Style of the text field associated with the quickSearch skin component. |

TABLE 27

Classes defined by the default theme
The classes listed below are not built in to QuickPlace, but are defined by the default theme's style sheet. (Custom themes are not required to use these classes, and are free to define any other classes as appropriate.) However if modifying the default theme, these classes can be modified to get a particular effect.

| CSS Selector | Description and Notes |
|---|---|
| .h-logo-text | Logo text. |
| .h-heading-textbg | Heading about table of contents and tools boxes. |

TABLE 27-continued

Classes defined by the default theme
The classes listed below are not built in to QuickPlace, but are defined by the default theme's style sheet. (Custom themes are not required to use these classes, and are free to define any other classes as appropriate.) However if modifying the default theme, these classes can be modified to get a particular effect.

| CSS Selector | Description and Notes |
|---|---|
| .h-sidebar-bg | Background of table of contents and tool boxes. |
| .h-toc-text | Text of item listed in table of contents. |
| .h-tocSelected-text | Text of selected item listed in table of contents. |
| .h-nav-text | Navigation link. |
| .h-tool-text | Tool link. |
| .h-signIn-text | Sign In link. |
| .h-actionButtonBorder-bg | Border of action button. |
| .h-actionButton-bg | Background of action button. |
| .h-actionButton-text | Text of action button. |
| .h-actionSpace-text | Space between action buttons. |
| .h-pageTitle-textbg | Page title. |
| .h-pageAuthorMod-text | AuthorAndModified text. |
| .h-revision-text | Revision link (draft \| published). |
| .h-revisionSelected-text | Selected revision link |
| .h-accent-bg | Accent color. E.g., used in rule at bottom of page. |
| .h-headlineFolderTab-bg | Background of unselected tab in headline folder. |
| .h-headlineFolderTab-text | Text of unselected tab in headline folder. |
| .h-headlineFolderTabSelected-bg | Background of selected tab in headline folder. |
| .h-headlineFolderTabSelected-text | Text of selected tab in headline folder. |
| .h-edit-bg | Background of edit layout "docket". |
| .h-actionButtonEdit-text | Text of action button in edit layout. |
| .h-actionButtonBorderEdit-bg | Border of action button in edit layout. |
| .h-actionButtonEdit-bg | Background of action button in edit layout. |
| .h-shadow-bg | Shadow. Note: used in sidebar and in edit layout "docket" shape. |
| .h-shadowCorner-bg | "Missing" corner of shadow area. |

PlaceBots

A PlaceBot is a Domino agent, written either in Java or LotusScript, that automates a task. Using a PlaceBot (or "Bot"), one can access, process, and manage the data in a QuickPlace. For example, one might use a PlaceBot to send E-mail to members of a QuickPlace that notifies them when a document of interest is edited. One can create a PlaceBot that runs when a form is submitted or on a scheduled basis. A PlaceBot may also be run manually. A PlaceBots is created using LotusScript or Java to manipulate the Domino back-end object classes. For complete documentation on the Domino Object Model and how to work with objects using LotusScript or Java, see the Lotus Domino R5 Programming Guide.

It is possible to write, debug, and compile Java code for a PlaceBot in a Java development tool, such as Symantec Visual Cafe. One can then import the .java file, or compile and import a .class or .jar file. It is also possible to write Java or LotusScript code in any editor and import the resulting files into the QuickPlace. When Java PlaceBots are uploaded, they are automatically compiled, and a syntax check is done on them.

Triggering PlaceBots

QuickPlace has a page in the Customize area where settings to control how and when the PlaceBot runs are specified. These settings are similar to the Domino Agent settings, but not the same.

There are two ways of triggering PlaceBots. Scheduled PlaceBots, triggered by a timer event or Form PlaceBots which are triggered by the creation of documents, based on the form type.

Scheduled PlaceBots

Scheduled PlaceBots are processed by the agent manager, and have the Access rights of the QuickPlace Manager.

Form PlaceBots

Form PlaceBots are triggered by the creation of a document based on any of the user forms in a QuickPlace. For example, if a new HTML form is created, one can specify that the Bot is to run on documents created with that form. If PlaceBots are triggered by document creation, they have the same access rights as the person who created the document.

The Difference Between PlaceBots and Domino Agents

PlaceBots are in effect, Domino agents. However, a PlaceBot is installed into a QuickPlace via the QuickPlace upload control. An agent is installed using the Domino Designer. Also, a PlaceBot can be created in any text editor, then uploaded. Another advantage of PlaceBots over Agents is that they can be stored as small LSS, Java JAR or Class files on a hard disk, and installed quickly on any QuickPlace, even without administrative access to the server. Manager access to the QuickPlace is all that is required.

PlaceBot security

When PlaceBots are run on a scheduled basis, they inherit the access control of the server. When PlaceBots are run manually, they have the access rights of the person triggering them. In other words, one must have Manager access to create, edit, copy, delete, or run PlaceBots manually.

Write a PlaceBot

In the following example of how to write PlaceBots, a dummy QuickPlace is created using the Domino Designer, as follows:

1. Create a QuickPlace.
2. Create documents, folders, links, and so on that the Bot will be referencing.
3. Close down the QuickPlace server.
4. Create a copy of the NSF file(s) that were created by QuickPlace. In most cases this will be the "main.nsf".
5. Open the NSF file in Domino Designer and start writing a Domino Agent.
6. Test the PlaceBot in the NSF.
7. Export the Agent and save java agents as a .Java, .JAR, .Class or .ZIP file. If writing a LotusScript file save it in .LSS format. To export a Java file, press the Export button in the Designers pane. To export a LotusScript file, right click on the designers pane and select Export.
8. Make sure the QuickPlace server is started and return to the original QuickPlace.
9. Go into Customize->PlaceBots then create and test your PlaceBot.
10. For small changes it is easier to open the LSS file in a text editor, then copy the changes back into the original LotusScript Agent. For the more complex changes go back into the Domino Designer.

Java PlaceBots

Java PlaceBots accept file types .JAVA .CLASS and .JAR. It is possible to also upload multiple files. PlaceBots can be writen in a text editor, using QuickPlace as the test environment. It is possible also to use third party Java development tools, such as Visual Age for Java.

LotusScript PlaceBots

Creating PlaceBots using LotusScript is essentially the same as writing an agent for a Domino application. There are two alternatives for writing LotusScript (LSS) PlaceBots. It is possible to write LSS Bots in a text editor and test the Bots in the QuickPlace. This section uses some examples of LotusScript that show the process of creating a PlaceBot and exposes the object model.

An exemplary PlaceBot has the following list of functional features:

Graphical display of folder/page relationships

Alphabetical list of pages

Theme like customizing of the map page
 Easily modify the folder and page images
 Full control over fonts, sizes, colors and so on
 Ability to wrap the document in any HTML required Selective page mapping—Pages and Links but not Room links Map document could be switched off if decided by the Manager Map document could appear wherever the Manager decided The map document would be updated whenever a new Page document was added.

PlaceBot Description

Figure 9A:
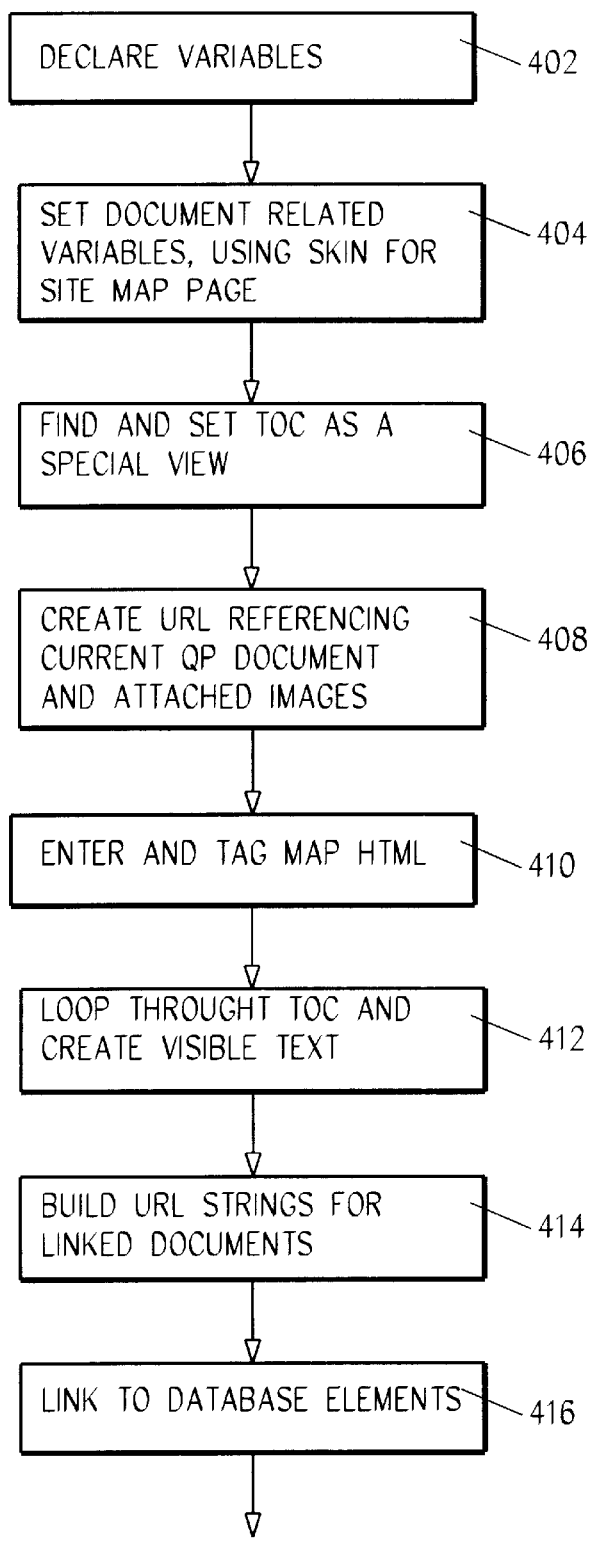
FIG. 9 is a flow chart representing the method steps for creating a PlaceBot.
Figure 9B:
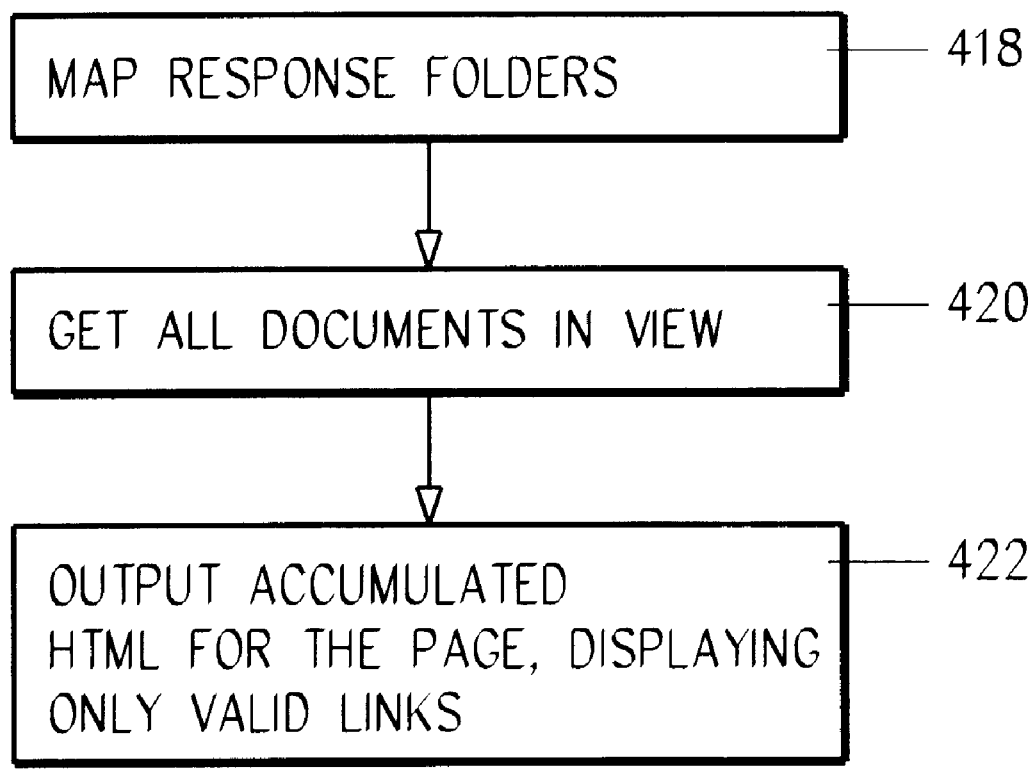

Referring to FIG. 9 in connection with Tables 28–46, an exemplary method for creating a PlaceBot will be described.

In step 402, variables relating to the session, the database and its major structures such as view and key documents are declared.

PlaceBot starts off by Dimming (declaring) the variables related to the session, the database and its major structures such as Views and key documents. The Dims are typically divided into two groups; dims for Notes related objects, then the writing Dims, which are used in content creation, mostly via strings.

In step 404, documents related variables are set, for example using a skin for the site map page.

This step, code for which is set forth in Table 28, sets the document related variables. These Sets are related to finding documents, working from the Database, down to the individual SiteMap document. If the SiteMap page is not found in the QuickPlace then the Bot quits. This is to allow a bit of flexibility in the order in which the Bot is installed. Errors are not generated done out of order, delete the site map page or name the site map page wrongly. This approach also allows use of a skin for the Site Map page. The skin file is the SiteMap.htm. This HTML wraps the map, can be modified, place by place, without having to change the Bot. In its current form, the SiteMap Bot and Page separate LotusScript and HTML scripting making the overall programming of the Bot simpler.

TABLE 28

SET DOCUMENT RELATED VARIABLES CODE sMapDocName = "SiteMap"
Set ndb = ses.CurrentDatabase
Set viewCurrent = ndb.getView( "h_Index" )
Set docReport = viewCurrent.GetDocumentByKey(

TABLE 28-continued

SET DOCUMENT RELATED VARIABLES CODE

```
sMapDocName )
If docReport Is Nothing Then
Call logAgent.LogAction("Mapperizer: Document" &
sMapDocName & "not found" )
Exit Sub
End If
```

In step 406, the table of contents (TOC) is found and set as a special view.

TABLE 29

SET TOC AS SPECIAL VIEW

```
Set viewTOC = ndb.getView("h_Toc")
```

In step 408, URLs referencing current QP documents and attached images are created.

The looping functions of Table 35 gets each element in the viewTOC then performs a number of calculations on that TOC element. Some TOC elements may be views, in which case that "sub view" is stored in the variable named viewcurrent. To start creating the URL strings for each entry, the following dims and sets are made. The sDbPath now is a string formatted for use within a URL, in other words its backslashes are replaced by forward slashes. Ascii character 47 is a forward slash, and character 92 is a backslash.

TABLE 30

CREATE URLS/ATTACHED IMAGES

```
Dim sFSlash As String
Dim sBSlash As String
Dim sDbLabel As String
Dim iSlashPos As Integer
sDbPath = ndb.FilePath & "/"
sFSlash$ = Chr(47)
sBSlash$ = Chr(92)
iSlashPos = Instr(1, sDbPath$, sBSlash$)
While iSlashPos <> 0
Mid$ (sDbPath$, iSlashPos, 1) = sFSlash$
iSlashPos = Instr(1, sDbPath$, sBSlash$)
Wend
```

To introduce images onto the current page, a URL is created that references the current QuickPlace document, then the images that are attached to it. These images are automatically uploaded when the SiteMap.htm file is uploaded. The URL uses a lookup in the h_Index in the current QuickPlace, and references the name of this page, set in the variable in sMapDocName. The h_Index is a view that allows one to look up all documents in the QuickPlace using their ID. For example, to get an image:

<img src="http://quickP.com/quickplace/MyPlace/Main.nsf/PageMap/$FILE/Page.gif?OpenElement">

To simplify this, the same path structure is kept but made relative:

<img src="../../PageMap/$FILE/Page.gif?OpenElement">

In the script of Table 31, the name of the PageMap document is replaced by a variable. This is to make it easier to change the name of the file. The names of the GIF images names are hard coded. If the developer wants to modify the SiteMap look, it is easier to just create a new image and save it with the same name.

TABLE 31

TAG MAP HTML

```
'writing sets
sFolderImg = |<img src=../../h_index/| & sMapDocName &
|/$FILE/Folder.gif?OpenELement
border=0
width=20 height=13>|
sPageImg = |<img src=../../h_index/| & sMapDocName &
|/$FILE/Page.gif?OpenELement
border=0
width=13 height=13>|
sPageSubImg = |<img src=../../h_index/| & sMapDocName &
|/$FILE/PageSub.gif?OpenELement
border=0
width=29 height=13>|
sIndentImg = |<img src=../../h_index/| & sMapDocName &
|/$FILE/Indent.gif?OpenELement
border=0
width=13 height=13>|
sHeadingStyleTag = "<span class=h-mapHeading-text>"
sStyleTag = "<span class=h-map-text>"
sFolderStyleTag = "<span class=h-mapFolder-text>"
sDetailStyleTag = "<span class=h-mapDetail-text>"
sEndStyleTag = "</span>"
sIndentConcat = ""
```

The next few lines set up some more HTML. The first of which is a header line. The HTML <HEAD> tag is written over when a skin is created, and so the sHTMLHead variable's contents are not used unless writing to the disk as an HTML File. This is included for debugging purposes only.

In step 410, map HTML is entered and tagged.

Referring to Table 32, the sHTML01 tag is added to the document before the map HTML. This is not at the start of the entire document, but at the start of the Map. To put code into the true start of an HTML document in a QuickPlace, manipulate the Notes objects directly, using the Domino Designer. To insert JavaScript or Style tags in a site map document, put them in the sHTML01 string variable. The sHTML02 tag is added at the end of the map HTML. This HTML is not at the absolute end of the HTML stream for the page, it appears at the end of the map section.

Pipe characters are used to define strings because they allows one to put in un-escaped quote characters, but more importantly the strings appear as they are typed, making it easier to debug.

TABLE 32

TAG START OF MAP

```
sHTMLHead = |<html><head><link rel=stylesheet
type="text/css"
href="Mapperizer.css"></head>| 'only for debug
sHTML01 = |<!-- start -->| 'put JavaScripts here or the
imported document
sHTML02 = |<!-- end -->| 'this will be concantenated at the
end
```

In step 412, a loop through the TOC is executed, and visible text created.

In Table 33, start looping through the Table of contents. The view "h_Toc" is very important to this Bot, as it is the main guide to locating relevant folders and documents. It is also possible to use the h_Index to find all documents, and look at their properties. To get all documents, the h_Index is a good view to use. If a document cannot be found in the TOC view, the Bot exits as errors will occur if the loop continues.

TABLE 33
START LOOP THROUGH TOC sMainText = sHTML01  
Set docInTOC = viewTOC.GetFirstDocument  
If docInTOC Is Nothing Then 'make sure the TOC is found  
Call logAgent.LogAction("Mapperizer: TOC Not Found" )  
Exit Sub  
End If Referring to Table 34, visible text is now beginning to be created, first the title of the page, including the Place name. The StyleTag is a CSS span instruction to help with formatting.

TABLE 34
STYLETAG sMainText = sMainText & sHeadingStyleTag &  
"All Documents in the"  
sMainText = sMainText & ndb.Title & "QuickPlace" &  
sEndStyleTag Referring to Table 35, a few of the database statistics are added to the main text string.

TABLE 35
DATABASE STATISTICS sMainText = sMainText & "<br>" & sDetailStyleTag & "Current Database Size:"  
& Cstr(ndb.Size/1024) & "k"  
sMainText = sMainText & sDetailStyleTag & "Created:" &  
Cstr (ndb.Created)  
sMainText = sMainText & "Last Modified:" & Cstr( ndb.LastModified ) &  
sEndStyleTag & "<br>"

Referring to Table 36, start cycling through the documents in the TOC. The TOC contains a list of links that refer to items the users of the QuickPlace have chosen to display there. For example in a QuickPlace there may be a Welcome document, a Discussion view, a link, a slides show and some other QuickPlace tools such as Customize. Each of these elements is represented in the TOC by a data note. The only thing that the objects here have in common is that they have the field h__IsInTOC containing a value of "1" (text), and that it is properly published (is not in draft mode and does not contain any $Conflict fields or documents that are in draft mode). Published items in QuickPlace are distinguished by the h__Type field. If this field contains a "0" it is a document, "1" is a view and so on. In the section below value of "0" is found in this field and the item dealt with as a document.

TABLE 36
TOC PROCESSING

While Not ( docInTOC Is Nothing )  
If docInTOC.h__Type(0) = "0" Then 'it is a doc  
Set docTemp = docInTOC Referring to Table 37, now that a document is found, the code can start building the text string for that elements listing. It would be a little strange if the site map page was visible in the map, so it is skipped in the looping process. The sMapDocName variable has the document's name assigned to it.

TABLE 37
ASSIGN DOCUMENT NAME

If docTemp.h__Name(0) <> sMapDocName Then

In step 414, URL strings are built for linked documents.

Referring to Table 38, another type of document that is handled a little differently is the Link type document. QuickPlace knows a document is a Link if the field h__URLPointer is not empty. So if the h__URLPointer field has content, the URL string is built using the content of that field.

TABLE 38
BUILD URL FROM LINK TYPE DOCUMENT

If docTemp.h__URLpointer(0) <> "" Then 'it is a link  
sMainText = sMainText & "<br>" & "<a href=" &  
docTemp.h__URLpointer(0) & ">"

Referring to Table 39, otherwise build the URL using the main view of any Main.nsf database, the h__Index view. The H__Index view is the most important view for creating unique resource locators (URLs). The following line uses the Universal Identifier of the page being referenced. This value can be found in the first, visible, sorted column in the h__Index view. Here the script continues building the text string for that element's listing.

TABLE 39
BUILD URL FROM MAIN VIEW

Else  
sMainText = sMainText & "<br>" & "<a href=../../h__Index/" & Cstr(docTemp.UniversalID)  
& "?OpenDocument>"  
End If  
sMainText = sMainText & sPageImg & sStyleTag & docTemp.h__Name(0) & sEndStyleTag  
sMainText = sMainText & sDetailStyleTag  
sMainText = sMainText & "(Last Changed:" & Cstr(docTemp.LastModified)  
sMainText = sMainText & "Size:"  
If docTemp.Size < 1024 Then  
sMainText = sMainText & "0"  
End If  
sMainText = sMainText & Cstr( docTemp.Size/1024 ) & "k"  
sMainText = sMainText & ")" & sEndStyleTag & "</a>"  
nLinkCount = nLinkCount + 1  
'end standard formatting  
End If In step 416, database elements are linked.

Referring to Table 40, the next Elseif operator executes if a view is found, here represented as a list of "notes". Each of these Notes creates a link to a database element; in this case a view. QuickPlace's definition of a View Note is that the h__Type field is 1. Finding the internal name of the view being referred to is done by finding the value of the h__SystemName field, and storing it in the sSysName variable. The sSysName now contains the internal name of the view. This variable helps to find the current folder or view.

TABLE 40

LINK TO VIEW

Elseif docInTOC.h_Type(0) = "1" Then 'it is a folder/view
sSysName = docInTOC.h_SystemName(0) 'get the internal name
of the view 'if it is a link to a QuickPlace tool page

---

In step 418, response folders are mapped.

Referring to Table 41, it is now known that a folder of a type to map has been found. The iNested variable is set to 1 if it is a response folder and some form of indentation is suitable.

TABLE 41

INDENT RESPONSE FOLDER

Else
iNested = 0
If docInTOC.h_FolderStyle(0) = "5" Then 'it is a response folder
iNested = 1
End If

---

Referring to Table 42, the view name is now put into the viewCurrent variable. The URL to the view used here is not the database/view, but rather database/h_Index/viewDesignNoteID.

This is another example of how the QuickPlace Object Model works with_Design Notes. Referencing the design note will redirect correctly to the view. This section of the script does exactly that, and writes some more text to the sMainText variable, which will later be printed out as the map page content.

TABLE 42

REDIRECT TO VIEW UPON REFERENCE TO DESIGN NOTE

Set viewCurrent = ndb.getView( sSysName )
sMainText = sMainText & "<br><a href=../../h_Index/" &
Cstr(docInTOC.UniversalID)
& "?OpenDocument>"
sMainText = sMainText & Chr(13) & Chr(9) & sFolderImg
sMainText = sMainText & sFolderStyleTag & docInTOC.h_Name(0)
& sEndStyleTag & "</a>"

---

In step 420, all documents in the view are gathered.

Referring to Table 43, inasmuch as the folder has been found, and written to the sMainText variable, it is now time to get all the documents in the view. To do this the docTemp variable is used to gather all documents in the view. The code in this section is similar to that for finding documents in the top level of the TOC. However, they have several subtle differences. The main one that the user sees is that they are indented to one extent or another. Normal documents are indented one space (13 pixels), but pages in response folders that are responses are indented a further 13 pixels.

TABLE 43

GATHER ALL DOCUMENTS IN VIEW

Set docTemp = viewCurrent.GetFirstDocument
While Not (docTemp Is Nothing)
If docTemp.h_Name(0) <> sMapDocName Then
sMainText = sMainText & "<br>"
If docTemp.IsResponse And iNested Then

TABLE 43-continued

GATHER ALL DOCUMENTS IN VIEW iIndentDistance = 13
sIndentConcat = "<img src=blank.gif width=" &
Cstr(iIndentDistance)
& "height=1 border=0>"
sPrevSetParentUnid = sThisSetParentUnid
Else
iIndentDistance = 0
sIndentConcat = ""
End If
sMainText = sMainText & sIndentConcat

---

Referring to Table 44, link documents are be indented further because they are contained within folders, not appearing in the TOC at the top level.

TABLE 44

LINK DOCUMENTS INDENTATION

If docTemp.h_URLpointer(0) <> "" Then 'it is a link
sMainText = sMainText & "<a href=" & docTemp.h_URLpointer(0)
& ">"
Else
sMainText = sMainText & "<a href=../../h_Index/" &
Cstr(docTemp.UniversalID)
& "?OpenDocument>"
End If
sMainText = sMainText & sPageSubImg & sStyleTag &
docTemp.h_Name(0) & sEndStyleTag
sMainText = sMainText & sDetailStyleTag
sMainText = sMainText & "(Last Changed:" &
Cstr(docTemp.LastModified)
sMainText = sMainText & "Size:"
If docTemp.Size < 1024 Then
sMainText = sMainText & "0"
End If
sMainText = sMainText & Cstr( docTemp.Size/1024 ) & "k"
sMainText = sMainText & ")" & sEndStyleTag & "</a>"
Update the counter for displaying in the log.
nLinkCount = nLinkCount + 1
Start the loop again.
End If
Set docTemp = viewCurrent.GetNextDocument( docTemp )
Wend
End If

---

In step 422, valid links are displayed for HTML accumulated for the page.

Referring to Table 45, with respect to the other document types, even though is not relevant in this situation, it provides an easy way to implement mapping of room links. It would be possible to extend on this and go into the database for the room referenced here, and show all documents in that room. However, that would breach security principals, to allow users to see all room links. If a user did not have access to a room, the link would prompt a user name and password box to appear, and they would be stopped. Users would be informed that a room existed, but they were not able to enter. According to the QuickPlace model, only valid links are displayed. Also, another line is writen to the log, and the text finished for the page.

TABLE 45

MAP ROOM LINKS

Else 'it must be some other sort of link, such as a room
(h_Type = "3")
End If

TABLE 45-continued

MAP ROOM LINKS

```
Set docInTOC = viewTOC.GetNextDocument( docInTOC )
Wend
Call logAgent.LogAction("Agent Mapped" & Cstr( nLinkCount )
& "documents" )
sMainText = sMainText & "<br>" & sHTML02 & "<br>"
```

Referring to Table 46, this is the final step; output of the accumulated HTML for the page. This code was developed in debug mode (iDebug=1) and the file written to an HTML file on the server. In a real environment, as these functions are disallowed in PlaceBots, security was reduced to allow this to work by setting the default access to Manager.

TABLE 46

OUTPUT ACCUMULATED HTML

```
If iDebug Then
'debug version writes to a file
fileNum% = Freefile()
Open "D:\trash\trash.htm" For Output As fileNum%
Print #fileNum%, sHTMLHead ; sMainText
Close fileNum%
Else
'release version writes to a QuickPlace Main.nsf db
docReport.PageBody = sMainText
Call docReport.Save( True, True )
End If
Then finish off with the exit and error handing methods.
Exit Sub
lblLogError:
Call logAgent.Logerror(Err, Error$)
Resume Next
End Sub
```

Overview of the SiteMap.htm Page

In this example, the SiteMap.htm page must be manually imported into the QuickPlace and is the target document for the PlaceBot. In other words, the Mapperizer PlaceBot goes looking for this file and refreshes it. It has two parts. The wrapping for the actual map is what is contained in the HTML file. In the middle of the page is an instruction to render the map, then at the end is some more HTML to finish off the page. The SiteMap PlaceBot and HTML file allow skin like customization. In other words its appearance can be dramatically altered to suit the Place. This is done by altering the HTML in the SiteMap.htm file, editing the images Folder.gif, Page.gif, PageSub.gif and Indent.gif which are referenced in the SiteMap.htm file.

To rename the SiteMap page a variable in the Mapperizer PlaceBot sMapDocName is edited. When creating a new site map page, that is renamed with exactly the same name.

SiteMap HTML Page Description

The SiteMap HTML page is imported into QuickPlace and named SiteMap. It is basically a wrapper for rendering the images on screen and presenting a single JavaScript document.write command. Everything else is either cosmetic presentation or error checking. Referring to Table 47, the essential lines in this page render the four images on the screen, forcing QuickPlace to upload them:

TABLE 47

FORCE UPLOAD

```
<img src="Folder.gif">
<img src="Page.gif">
<img src="PageSub.gif">
<img src="Indent.gif">
```

Referring to Table 48, the JavaScript command to print the text created by the Mapperizer PlaceBot onto the screen.

TABLE 48

PRINT TO SCREEN

```
<script language=JavaScript>document.write( PageBody
)</script>
```

Referring to Table 49, to make the map more presentable, the images are rendered on the screen in a table. Using a table allows creation of a little vertical space, and also alignomg the images to the right. This is done to make the pixel images a little less obvious to the reader. Due to the fact that the table is only one pixel high, it can be filled with a color to create a really pretty line.

TABLE 49

RENDER IMAGES ON SCREEN IN TABLE

```
<table width=100% border=0 width=10 cellpadding=0
cellspacing=0>
<tr>
<td height=1 align=right><img src="Folder.gif" width="1"
height="1"><img
src="Page.gif" width="1" height="1"><img src="PageSub.gif"
width="1" height="1"><img
src="Indent.gif" width="1" height="1"></td>
</tr>
</table>
```

Referring to Table 50, next comes the section which draws the body of the document onto the page. The first JavaScript Line here makes sure that the PageBody variable has been declared. Content in the PageBody field of a Quickplace document is automatically placed into the PageBody JavaScript variable. If the "typeof" test in the following text determines that the bot has not run, a message is printed onto the screen giving information on how to get started. This is especially important because it helps avoid a JavaScript error through an undefined variable. The variable PageBodyMessage is the text to change to change the message displayed on screen.

TABLE 50

DRAW DOCUMENT BODY

```
<script language=JavaScript>
if ( typeof( PageBody ) == "undefined" ) {
var PageBodyMessage = 'Run the Mapperizer PlaceBot to see a
site map .';
document.write( PageBodyMessage )
} else{
document.write( PageBody )
}
</script>
```

Referring to Table 51, the Log should now show the following text . . .

TABLE 51

LOG TEXT

Started running agent 'Mapperizer' on 09/05/2000 09:31:31 PM
09/05/2000 09:31:31 PM: Mapperizer: IBM Redbook Example
09/05/2000 09:31:31 PM: Mapperizer: Run agent: Mapperizer
09/05/2000 09:31:32 PM: Agent Mapped 18 documents
Ran LotusScript code
Done running agent 'Mapperizer' on 09/05/2000 09:31:32 PM Desktop Inegration Although Lotus QuickPlace is a web application that is displayed in a browser, much of the value that QuickPlace offers the user is its ability to easily allow content creation and content editing using tools and applications already familiar to the user. For example, in QuickPlace Release 1, users could write documents using Microsoft Word, the most popular and widely used word processor for the Windows platform, and then import these documents into QuickPlace. Therefore, Microsoft Word became a content-creation tool for QuickPlace.

In-Place Editing

Figure 13:
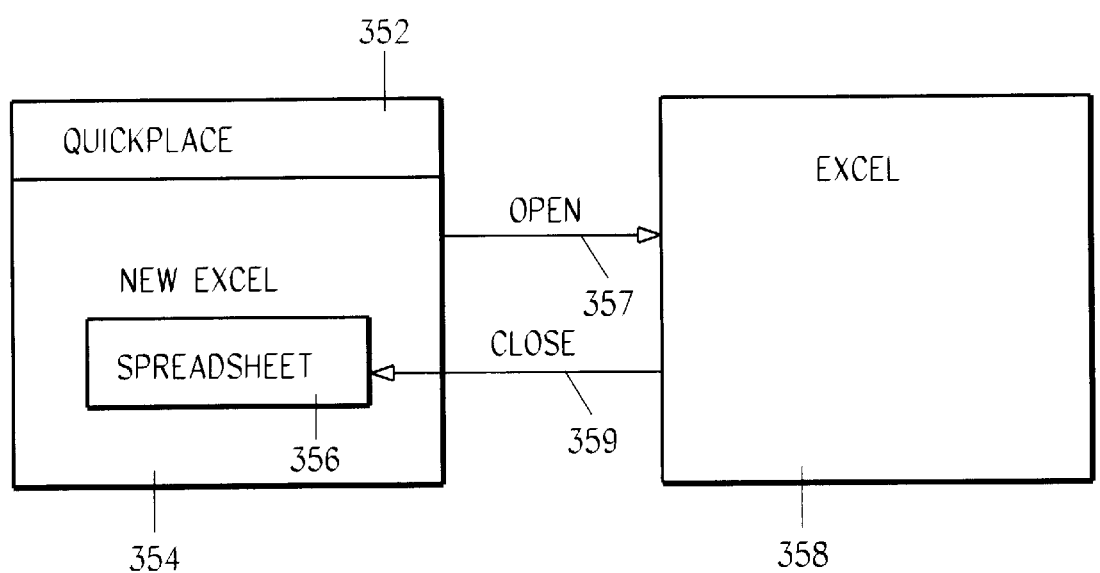
FIG. 13 is a flow chart illustrating in-place editing in accordance with the preferred embodiment of the invention.

Referring to FIG. 13, in accordance with a further embodiment of the invention, a browser user can create MicroSoft Office documents from within QuickPlace 352, such as a new Excel web sheet 354. As is represented by open line 357, QuickPlace will automatically launch Excel 358, and when Excel 358 is closed, as is represented close line 359, QuickPlace 352 will bring in the Excel spread sheet 356.

Referring to FIG. 6, in general, standard web files 242, 244, 248, 252, 254 and 250 are brought into the browser as files 230, 234 and 238 such as via upload control 240, sent to the web server 258, Domino server 104 and QuickPlace extensions 108 and converted into application enabled objects 260, 262, 264 in QuickPlace 172.

In accordance with a preferred embodiment of the invention, QuickPlace extends this concept further using better integration with the Windows desktop. In particular, the "Desktop Integration" feature area includes:
1. Round-trip editing of Microsoft Office and Lotus SmartSuite documents.
2. Support for importing additional file formats using the HTML export engine from Verity.

Round-Trip Editing of Microsoft Office and Lotus SmartSuite Documents

Users are able to create documents based on Microsoft Office and Lotus SmartSuite documents, and publish them into their QuickPlace. This is done by creating a document using Office or SmartSuite independent of QuickPlace and then dragging and dropping this file into QuickPlace—this process is referred to as "importing" Office and SmartSuite documents. Alternatively, the user will be able to create a page in QuickPlace and specify immediately that the page's content will consist of an Office or SmartSuite document. The user will then use the selected application to edit the page. This process is referred to as creating a "Microsoft Word page," for example.

In either case, users are able to edit QuickPlace pages using the same Office or SmartSuite application that created them. This, in effect, turns Office and SmartSuite into content creation tools for QuickPlace. At the same time, QuickPlace becomes a web publishing tool for Microsoft Office and Lotus SmartSuite users. Users will not have to learn a new content creation and editing user interface; they will simply use the tools that they have already become familiar with and which they have already used to create large amounts of content in the past.

Support for Importing Additional File Formats Using the HTML Export Engine From Verity Since users may want to import content or information that wasn't created with either Office or SmartSuite, in accordance with a preferred embodiment of the invention, various other file formats are supported making it much more likely that every user will be able to quickly publish data in collaboration space.

Further in accordance with this aspect of the invention, the import feature provides that the import code will be run on the server side. Thus, Internet Explorer users' Office and SmartSuite files are converted to HTML on the client machine using OLE automation. All Netscape users' files— and non-Office/SmartSuite files for IE users—are then uploaded to the server in native format, and converted to HTML using the "HTML Export" engine from Verity. Since this conversion will be performed on the server, no client code must be downloaded for Netscape users.

Round-trip Editing of Microsoft Office and Lotus SmartSuite Documents

In accordance with a preferred embodiment of the invention, collaboration space users will use OLE automation to support creating and editing of pages using Microsoft Office and Lotus SmartSuite applications. As described below, both Netscape and IE users will have the ability to import local files into QuickPlace using the HTML Export engine from Verity running on the server.

For IE/Windows users, the benefits of using OLE Automation are as follows:
1. Each application will be able to provide the best possible representation of its application data in HTML. For example, the best way to render a Microsoft Word file in HTML is to ask the Word application to convert it.
2. By using OLE automation, QuickPlace will be able to effectively choreograph the application in question as an integrated editing tool. When the user creates or edits a QuickPlace document based on Excel, for example, Excel will appear automatically, allowing the user to edit the QuickPlace document using Excel.

The primary disadvantage of using OLE automation for creating and editing document is that the target application must be installed on the user's client machine. To be able to edit a QuickPlace document using Word, the user must obviously have it installed locally. On the other hand, importing files using server-side technology will work regardless of what software is installed on the user's machine.

In accordance with a preferred embodiment of the invention, round-trip editing provides the following features. Each of these will be further described hereafter is with reference to the various scenarios specified.
1. Creation of QuickPlace pages based on an Office or SmartSuite document. (Scenario #1.)
2. Import existing Office and SmartSuite documents into QuickPlace. (Scenario #2.)
3. Edit existing QuickPlace pages that were originally created or imported from an Office or SmartSuite application. (Scenario #3.)

4. Be able to edit Office 2000 documents saved as a "Web Page" in their original form. (Scenario #4.)
5. Export HTML documents from QuickPlace back to the user's hard drive in their original form. (Scenario #5.)
6. A new type of QuickPlace form based on an existing Office or SmartSuite document. (Scenario #6.)
7. Allow non-empty file attachment fields to be used in forms. (Scenario #7.)

Scenario 1: Creating a New Page Based on Microsoft Word 2000

1. Referring to FIG. 10 and Figure, a user clicks the "New . . . " button in the QuickPlace action bar 378 (FIG. 7). The "New . . . " scene 408 appears with a list 412 of available page types. In addition to the old choices (Page, Imported Page, Calendar Page, etc.) each Office or SmartSuite application installed on the user's local machine will be listed with a radio button. The user will know right away which applications can be used for editing—and won't be mislead into trying to use Office and SmartSuite applications they don't have on their machine.

This list 412 is generated by a hidden ActiveX upload control 240, implemented by a DLL, which will be downloaded to client 102 only once. Once installed on the users machine, it will be able to determine quickly which Office and SmartSuite applications are installed on the machine by attempting to obtain a COM pointer to each application's OLE automation server object. This pointer will only be obtained successfully if the application is installed.

The control 240 has no UI. It will be created without a window (or with a zero-size window) and will simply return information to the JavaScript in the HTML scene.

Next, JavaScript in the scene will query the control for the list of applications, and generate the corresponding list 412 of radio button 414 choices. Performance should not be an issue; the result will appear to be HTML that is "aware" of properties of the local machine.

2. User selects "Microsoft Word 2000 Page" 416 and clicks "Next . . . " 418. A new scene 420 appears in QuickPlace containing the upload control—the control will display 422 a single Word.DOC file 424, with no name and will also appear grayed out. At the same time, Microsoft Word 2000 will be launched in the foreground, displaying a new, empty Word document 426.

Since the edit scene 420 contains the upload control 422, it is loaded immediately as the user enters the scene. The upload control will be provided with the application chosen by the user, and will immediately launch the application 426. It will also display a single file icon 424 representing the file being created.

Word 2000 will be displayed in a separate window 426, allowing the user to use Word in the same manner as always.

3. User types in a new Word 2000 document, and then closes the Word file 426, either using File->Exit, File->Close or File->Save As 428. QuickPlace detects that the original Word document is no longer being editing and brings the QuickPlace window 420 to the foreground. The Word file is converted into HTML and displayed in the upload control 422.

In accordance with the preferred embodiment of the invention, OLE automation is used to determine whether or not the user is still editing the new Word file 426. As the user is editing the document in Word, the QuickPlace upload control 240 will periodically query Word for the list of documents currently active. When the original document is no longer active, QuickPlace knows that the user has finished his/her edits and that it should import the file into QuickPlace 108. Any of these UI actions can finish the edit session on the original document:

File->Close: The user has closed the original file, but may continue to use Word to edit other .DOC files.

File->Save As: The user has chosen to save the original file with a new name on their local machine File->Exit: The user has quit Word entirely.

Regardless of how the user finishes editing the document, QuickPlace will detect that it is no longer active in Word. If the file's contents have changed (i.e. it is not empty) the file will be converted into HTML.

4. User publishes the page and the new .DOC file, along with its equivalent HTML file, is uploaded to the server.

After the .DOC file is converted to HTML, it is uploaded to the server. The HTML and DOC files are both attached to the same Notes document, and a Notes field is set indicating to the QuickPlace JavaScript UI which HTML was created.

Scenario 2: Import an Existing PowerPoint 97 File Into QuickPlace

1. User clicks "New . . . " and then selects "Imported Page." The import scene with the upload control is displayed—this time the control is initially empty.
2. User selects an existing PowerPoint 97 (.PPT) file from the local hard drive and drags/drops it into the upload control. A progress dialog box appears displaying "Converting from Microsoft .PPT format to HTML. Please is Wait . . . " Later, a PPT file icon is displayed in the upload control. OLE automation converts the file into HTML and imports it into QuickPlace.
3. User publishes the page. The .PPT and all of its associated files are uploaded to the server. The slides from the PowerPoint presentation are all displayed in the same QuickPlace page, along with "Previous," "Next" and "Zoom" buttons. Referring to the UI of FIG. 12, these slides are displayed in the same QuickPlace page.

Figure 12:
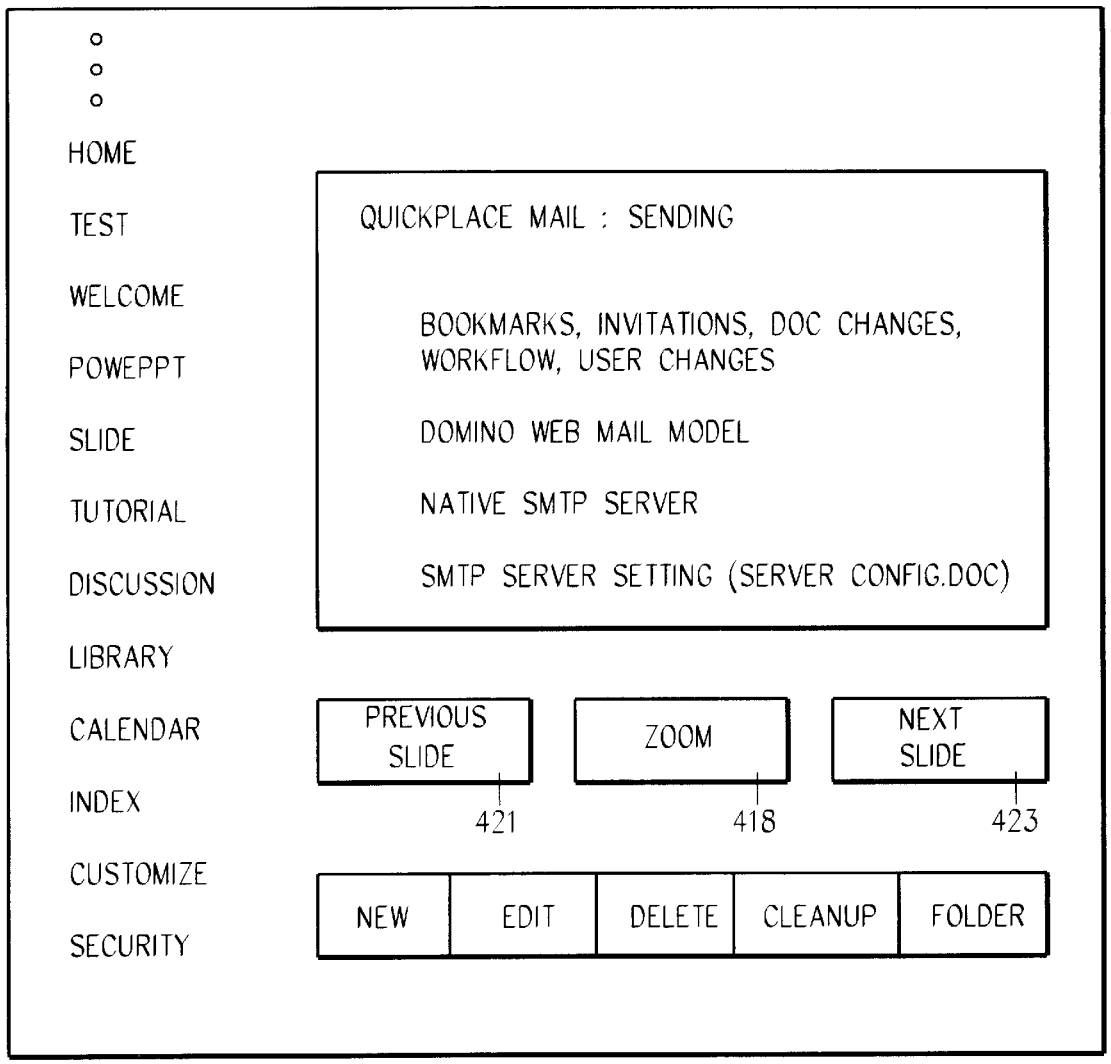
FIG. 12 is a schematic representation of a screen capture illustrating the user interface for in Place editing of Microsoft documents.

Referring to FIG. 12, clicking the "Zoom" button 418 causes a separate browser window to appear with a larger version of the current slide; it will also contain "Next" 423 and "Previous" 421 buttons. Displaying multiple PowerPoint slides, Excel worksheets, or other data in the same QuickPlace page is accomplished by uploading a series of HTML documents, one per slide/worksheet, to the same Notes document. In addition, each of the HTML documents is modified to link to the next and previous document. When the user clicks on "Next" at read time, a URL is issued to load the next slide in the page content frame as follows: "$FILE/slide5.htm?OpenElement"—referring to the next slide in the sequence. All images and other support files are attached to the same Notes document as well.

Scenario 3: Edit Existing Microsoft Excel 97 Page

1. User views Excel 97 page in QuickPlace and clicks "Edit . . . " The edit scene with the upload control is displayed and the Excel 97.XLS file is displayed as a file icon in the control. In addition, Excel 97 is automatically launched with the user's original .XLS file.

In accordance with a preferred embodiment of the invention, the associated Office or SmartSuite application is automatically launched and given the original file. This allows the user to edit the QuickPlace page directly without having to double click on the file icon. It gives the user the impression that she is directly editing the QuickPlace content using Excel 97, for example.

If Excel is not installed on the machine when this page is edited, for example if a different user edited the page or the original user used a different machine, an error message appears informing the user that Microsoft Excel is required to edit the page. However, the edit scene is still displayed with the XLS file icon—allowing the user to replace it with a different Excel file if such a file were available.
2. User finishes editing the Excel XLS file, saves and exits Excel. The XLS file is converted into HTML. Finally, the user publishes the page and the new version of the XLS file, along with the HTML equivalent, is uploaded to the server.

Implementing this feature is no different from the page creation scene, described above. The same code is used to detect when the user has stopped editing the Excel 97 document, and to convert the XLS file into HTML.

Scenario 4: Import and Edit an HTML File Originally Created by Microsoft Word 2000

One of the principal features of Microsoft Office 2000 is the ability to save native Office documents, .DOC or .XLS files for example, as HTML without losing any of the original formatting, layout or other information specific to that Office application. For example, users can save a Word 2000 document as HTML, and then later open that HTML file using Word and see the document in its original form, without losing any fidelity along the way.

QuickPlace today allows users to import HTML files that were originally created by Office 2000, (Word, Excel or PowerPoint) into QuickPlace like any other HTML file. However, in accordance with a preferred embodiment of the present invention, users may edit pages created by importing such HTML files, using the Office application that originally created them. This scenario describes such an edit operation:
1. User creates a document using Word 2000, and then uses the Word 2000 "File->Save As Web Page" command to save the file.

Now the user has an HTML file on the local hard disk that contains the text in HTML format, along with formatting information saved with XML tags. In addition, Word has also created a number of support files, such as images, an "XML file list" file, style sheets, and other files. All of this information is used by Word to re-open the file later and obtain all of the original formatting and style information.
2. User imports this new HTML into QuickPlace, using the same import UI.

In accordance with this embodiment of the invention, all of the support files that were created by Word 2000, along with the HTML file, will be detected and uploaded to QuickPlace. Previously, only the HTML and any images referenced by it were uploaded. Now, the HTML file is parsed to determine whether it was created by an Office 2000 application. If it was, all of the support files are located on the user's hard disk and uploaded to the server.
3. Later, user edits this imported QuickPlace page.

As soon as the user clicks "Edit," QuickPlace displays the edit scene with the HTML file's icon, and also automatically launch Word 2000 to edit the document. Even though the file was converted to HTML by Word, it will be displayed in its original form.

Once the HTML file was identified as a "Word 2000 HTML document" (step 2 above) the Notes document corresponding to this QuickPlace page is marked as containing a Word 2000 document, as if it were created using the New . . . , Microsoft Word 2000 Page UI described in Scenario #1. After the user clicks "Edit," the HTML along with all of the supporting are downloaded to the user's machine. These files are placed in the user's TEMP directory, but the support files are placed into a subdirectory corresponding to their original locations when the file was created. This facilitates Word 2000 reopening the file.

After the user makes some changes and closes in the file in Word 2000, the new version of the file along with all of the support files are again uploaded to the server.

Scenario 5: Export an HTML Document Back to the User's Hard Disk in its Original Form Previously, the user could import an HTML file into QuickPlace and all of the associated images would be uploaded to the server as well. In accordance with a preferred embodiment of the invention, the user may now download the HTML and the images back to the hard disk or to some other machine—in their original form.
1. User imports an HTML file into QuickPlace, which contains an image.

As before, the HTML and the referenced image, are uploaded to the server. In the background, the <img> tags in the HTML file are modified to refer to the copy of the image file attached to the Notes document on the server. In accordance with this embodiment of the invention, the original HTML file, i.e. an unmodified copy of the HTML file, is uploaded to the server as well.
2. User edits the imported page. The upload control is displayed with the HTML and the image file. The user then drags and drops the file onto the desktop.

In accordance with this embodiment of the invention, upload control 240 downloads the unmodified, original copy of the HTML to the user's machine, along with the image files that it refers to. Since all of these files are stored in the same directory on the user's machine, the <img> tags in the original HTML are modified again to reference the image file in the same directory. This is necessary since the image file may have originally been located in other directories on the user's machine.

Figure 14:
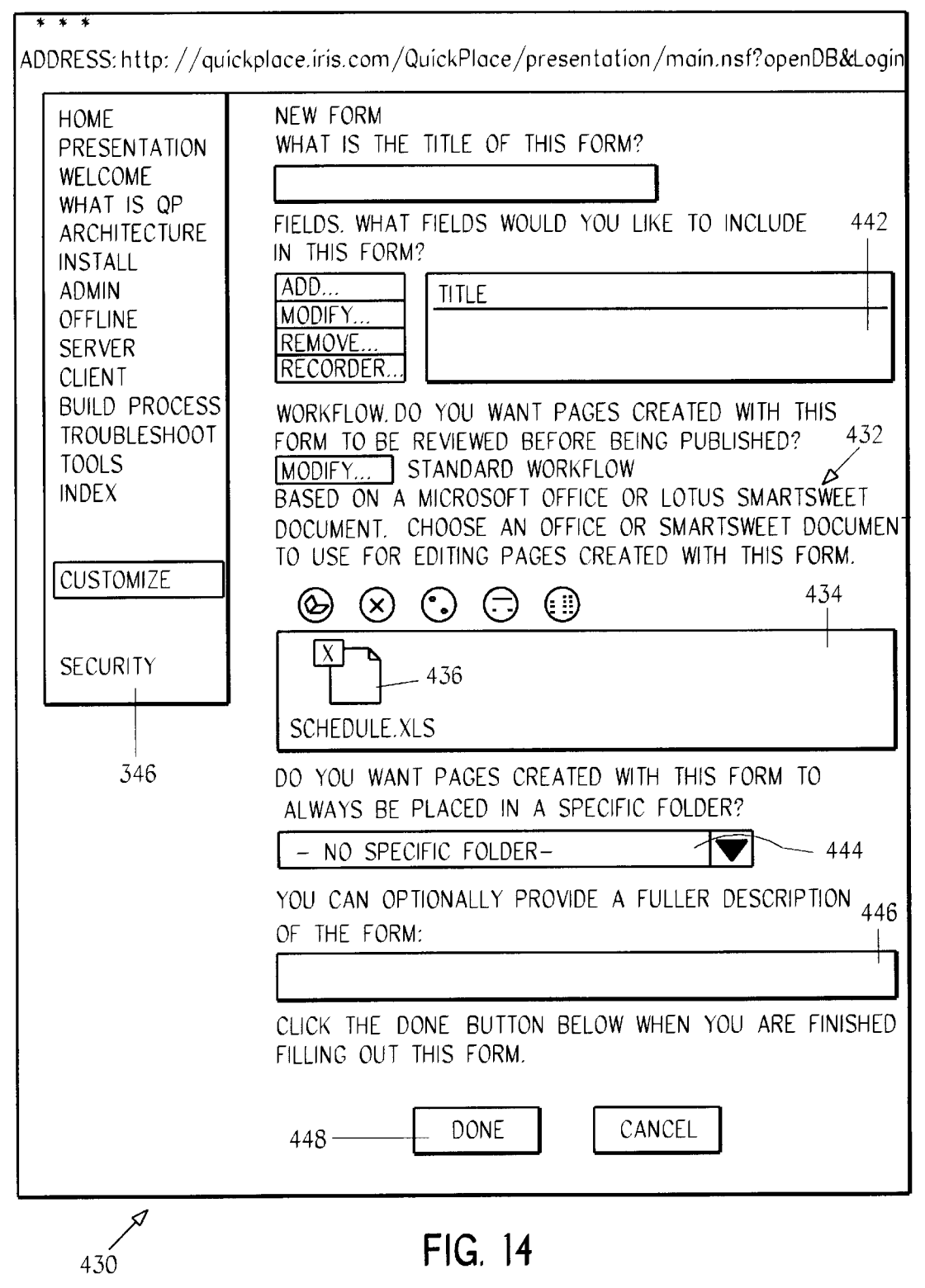

In accordance with this embodiment of the invention, users may create a new type of QuickPlace form based on a Microsoft Office or Lotus SmartSuite document. For example:
1. User decides to create a new form: Customize->Forms->New Form
2. Referring to FIG. 14, the "New Form" scene 430 appears. If Microsoft Office or Lotus SmartSuite is installed on the user's machine, an additional paragraph 432 is displayed "Based on a Microsoft Office or Lotus SmartSuite Document". This allows the user to create a form based on a Word, Excel, or another Office or SmartSuite document. When pages are created based on this form, the corresponding application will be opened with a particular file. A hidden ActiveX control returns whether any Office applications are installed, or whether any SmartSuite applications are installed. If none are, the upload control 434 and its introduction text 432 are displayed.
3. User selects an Excel 2000 file 436 and drops it into the upload 434 control that appears below the "Based on a Microsoft Office or Lotus SmartSuite Document" paragraph 432.

This file, represented by icon 436, is uploaded to the server—this will form the basis for this form. Every user who creates a page based on this form will see Microsoft Excel opened and loaded with this file.
4. The user adds some additional fields 440–446 and then saves the form by clicking "done" 448.
5. Later, the user creates a page based on this new form: "New . . . ", select the form, etc. As soon as the user starts to edit the new page, Microsoft Excel is launched with the file that was originally attached to the form. This allows every user to enter information into a spreadsheet, for example. It's essentially the same as creating a page based on an Excel spreadsheet, except that Excel is pre-loaded with a file selected by whichever user created the form. If a particular user doesn't have Excel installed on her machine, she'll receive an error message informing her that Excel is required to create a page using the form.

6. After the user closes the Excel file, it is converted to HTML and uploaded to the server. The user may then enter values into other fields on the form and publish the page. Once the page is published, it is considered to be based on the Excel document—whenever it is edited in the future, Excel is again automatically launched with the given file.

Scenario 7: Create and use a Form Containing a Non-empty File Attachment Field Previously, the "Attachments" field in QuickPlace could be added to QuickPlace forms to allow users to attach documents to pages created using a form. However, the attachment always appeared empty for each new page. In accordance with a preferred embodiment of the invention, the form creator may attach a file or set of files to this field which will appear pre-attached to each page created using the form. For example:

1. User creates a new form. Customize->Forms->New Form
2. User adds an "Attachments" field, by clicking the "Add" button, selecting "Attachments," and clicking "Next." The "Attachment Options" scene appears. Previously, the attachment options scene was empty. Referring to FIG. 15, in accordance with this embodiment of the invention, an upload control scene 450 is displayed. The user then may attach any set of files to the form, which will then be attached automatically to each page created based on that form.
3. User drops a Word document 452 into the upload control 434. Then the user saves the new field and the form—call it "Word Form." The Word document 452 will be uploaded and attached to the Notes document representing the QuickPlace form like any QuickPlace page.
4. Later, another user creates a page based on this new form: "New . . . " and "Word Form." An edit scene appears containing an upload control; the original Word document is displayed in the upload control.

Importing Additional File Formats Using an HTML Export Engine

Figure 16:
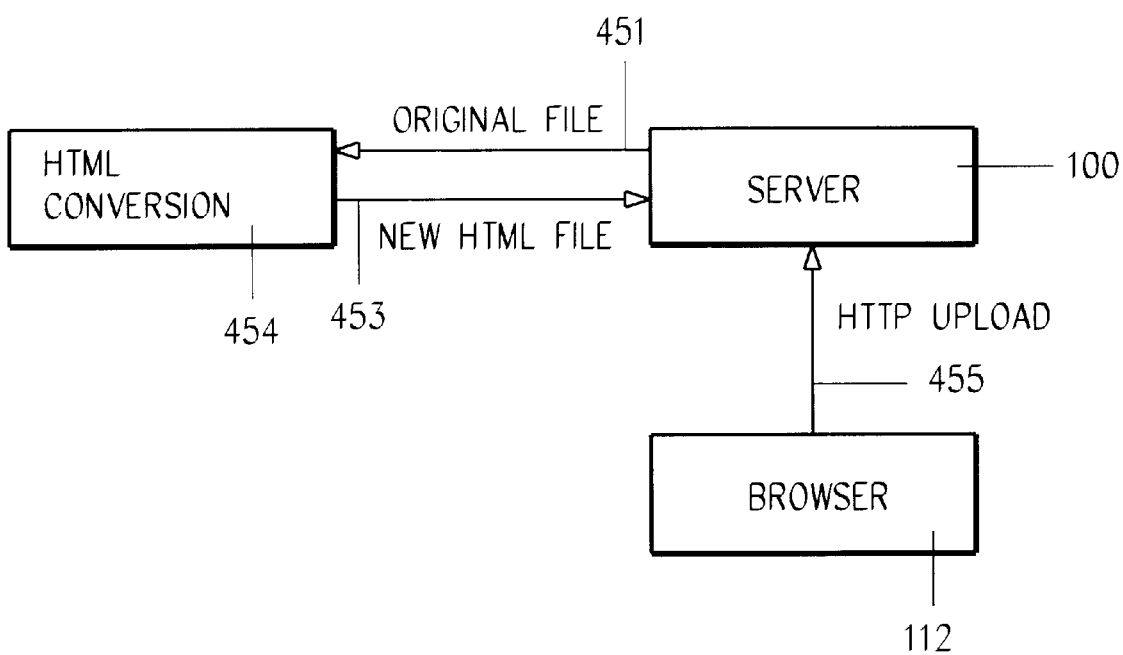
FIG. 16 is a system diagram illustrating importing interest content into collaboration space.

Referring to FIG. 16, in accordance with an exemplary embodiment of the invention, to allow browser 112 users to import interest content into a QuickPlace, HTML conversion module 454, such as an "HTML Export" engine from Verity, is used on the server. Whenever a browser 112, such as Netscape, user imports a file—or when an Internet Explorer user imports a file that is not recognized by the OLE automation code described above, i.e. a non-Office/SmartSuite file—as is represented by line 455, the file is uploaded unmodified to the server. As is represented by line 451, server 100 passes the file onto the Verify engine 454, which will attempt to convert it into HTML. If this is successful, as is represented by line 453, the HTML will then be attached to the QuickPlace page and displayed whenever a user reads this page.

Scenario #8: Netscape User imports Microsoft Word document Into QuickPlace

The sequence of events that will occur when a Netscape user attempts to import a Microsoft Word document into QuickPlace are as follows:

1. Netscape user creates an imported page in QuickPlace: New . . . , Imported Page.
2. The user selects a Microsoft Word document from the hard drive using the standard HTML "Browse" button and the standard File-Open dialog box.

Previously, every file imported by the user was assumed to be HTML. In accordance with this embodiment of the invention, the user will be able to select any file, as long as it is supported by the conversion engine 454. For example, for a Verity conversion engine, formats that are supported include:

Microsoft Word 97/2000
Microsoft Word 6/95
Microsoft Word 2
Microsoft Word Mac
Microsoft Excel
Microsoft PowerPoint 97/2000
Microsoft PowerPoint 95
Microsoft PowerPoint 4.0
Microsoft Write
Microsoft Rich Text Format
Lotus WordPro
Lotus 123 96/97
Lotus 123 V2–5
Lotus Freelance Graphics 2.x
Lotus Freelance Graphics 96/97
Lotus AmiPro
Corel Quattro Pro Spreadsheet
Corel WordPerfect 5.1
Corel WordPerfect 6.x to 8.x
Windows Bitmap
Icon Files
PNG (Portable Network Graphics)
TIFF 3. User clicks "Next"

At this point, Netscape will automatically upload the selected file to the server. If the user picked a file which is not supported by Verity, a JavaScript error would be displayed.

In addition to uploading the selected file, the "h_command" HTML field is set to a value such as "h_VerityImport"—this will cause the Verity Import command to be executed on the server. This code will then obtain the selected file from the browser's HTTP Post request, save it in the TEMP directory on the server machine, and then call the Verity HTML Export engine.

If the Verity code is able to successfully convert the selected file to HTML, the server attaches the resulting HTML file, and any support image files or other files, to the current Notes document. Finally, the document is published as usual.

If the Verity code 454 is unable to convert the selected file to HTML, a server exception will be thrown, and a helpful error message displayed in the user's Netscape browser 12.

To implement this embodiment of the invention, a new "Haiku Command" ("h_VerityImport") in NINOTES.DLL is implemented to call into Verity 454 when a file is received from the browser 112. This command calls into the Verity C API, passing the uploaded file 451 as a parameter. In addition, some of the HTML import code is copied into the server (NINOTES.DLL) to alter the HTML after it has been created by Verity—fixing up image tags, and adding JavaScript to the HTML to make it function properly inside of QuickPlace.

Scenario #9: Editing a QuickPlace File Attachment: for example "schedule.xls"

Referring to FIG. 17 through FIG. 24, in accordance with a preferred embodiment of the invention, editing a QuickPlace file attachment and saving the changes back to QuickPlace will occur as follows:

1. User reads a QuickPlace page which contains 3 file attachments 458, one of which is called "schedule.xls." 456. The file is displayed inside a grayed-out upload control 460. The grayed-out appearance of the upload control 460 reminds the user that this is a read-only copy of the file, and that if the user attempts to modify the file here it will not be possible to save the new version of the file back into QuickPlace.
2. The user edits the QuickPlace page and double clicks on schedule.xls 456, launching Excel 2000, the associated application. This time, in edit mode, the upload control 462 is not grayed out and the user realizes that the file may be edited.
3. The user makes some changes to the file and shuts down Excel 2000. QuickPlace detects that Excel 2000 is no longer running, determines that schedule.xls 456 has been modified and displays dialog box 464. If the user clicks "Yes" 466 the new version of schedule.xls is uploaded to the server and the old version is discarded. However, if the user clicks no 468, an additional file icon 470 appears in the upload control 462. The user must type in a new name for this file—or type "Escape" and cancel the upload operation. Finally, if the user doesn't select a new file name and simply presses "ENTER" an error is displayed.

File System Directory Architecture

Figure 8:
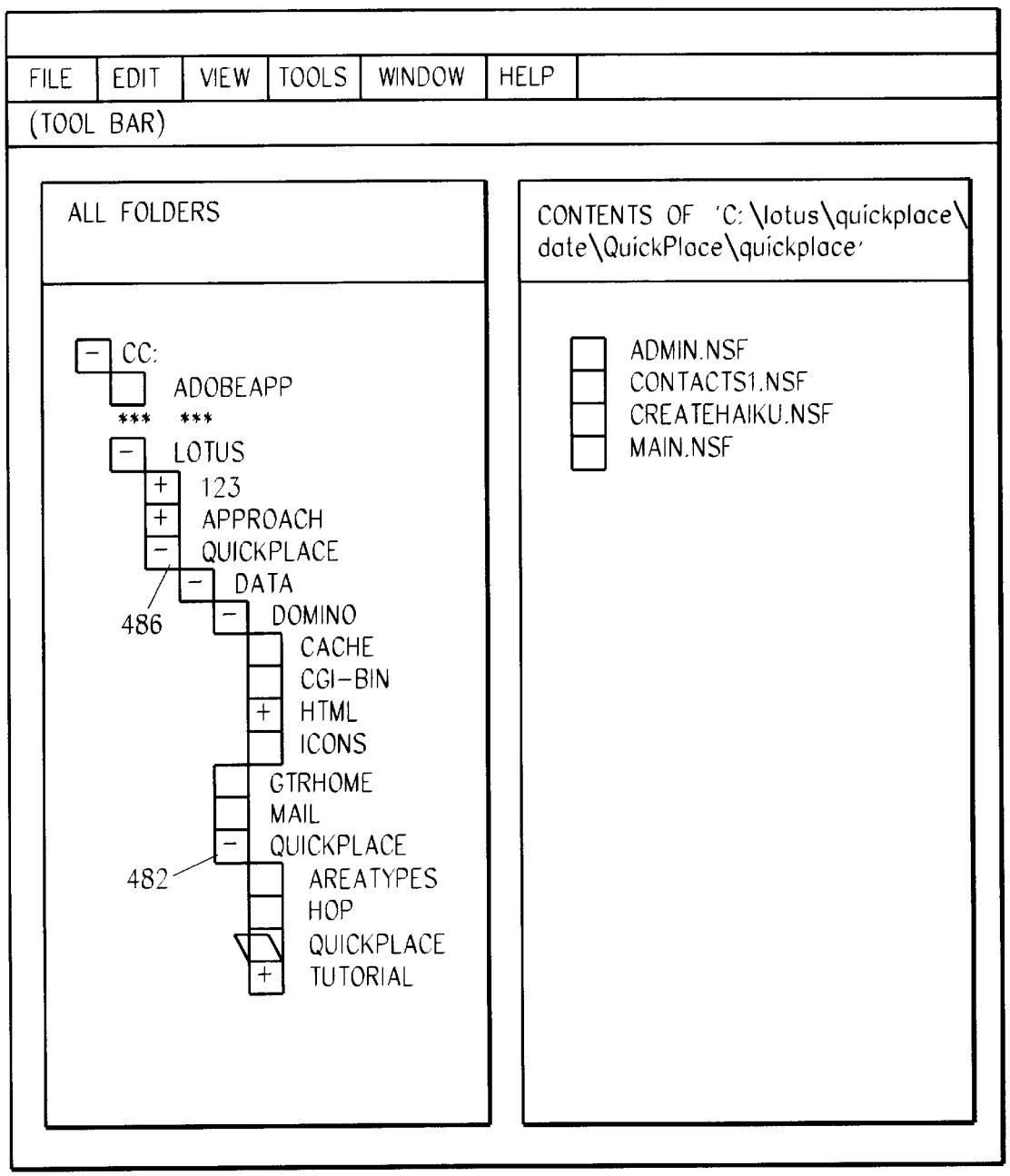
FIG. 8 is a schematic representation of a directory structure, along with the files in an exemplary collaboration space server.

In accordance with the preferred embodiment of the invention, every new QuickPlace created gets its own directory under the QuickPlace master directory. The name of that directory is same as the name of the QuickPlace. Each additional room in the QuickPlace is another file (.nsf) in the QuickPlace directory. During the QuickPlace server installation, the default QuickPlace (also called the "Welcome" QuickPlace) with the name of QuickPlace is automatically created. This is the entry point to the QuickPlace server including the server administration. FIG. 8 shows the directory structure, along with the files in "Welcome" QuickPlace, in a stand-alone QuickPlace server.

For example if Millennia is the a current QuickPlace, then the basic infrastructure of the Millennia QuickPlace resides under \lotus\domino\data\quickplace\millennia (on Domino server—given that \lotus\domino\data is the data directory) or \lotus\quickplace\data\quickplace\millennia (on stand-alone—given that \lotus\quickplace is the QuickPlace installation directory).

When QuickPlace server is installed, the "Welcome" region or the "Administrator's Place" is pre-configured to allow an entry point to the QuickPlace server. An administrator can then administer the newly installed QuickPlace server from this entry point. This so called administrative QuickPlace resides under the QuickPlace directory which in turn is under the data directory. For an example it is c:\lotus\domino\data\QuickPlace\QuickPlace when installed under Domino, and c:\lotus\QuickPlace\data\QuickPlace when in stand-alone mode. It contains the following files: Main.nsf, Contactsl.nsf, CreateHaiku.nsf, Admin.nsf. The templates for these Domino databases reside in the directory named AreaTypes. The "Welcome" page may be configured to suit the needs of an organization.

Tasks

In accordance with a preferred embodiment of the invention, custom field definitions allow a user to create forms in the QP environment without having to write HTML, leaving the generation of the HTML to QuickPlace. A field object may be created at the browser in Java script that contains the properties of the field and the methods which display and operate on that field, including validation. In general, an object is made up of properties and methods. Previously, the HTML was stored with the field definitions. A problem with this procedure is that when it is desired to change the field, it was necessary to upgrade the data in all of the field definition documents. With the present invention, users can now create their own field definitions. The html is generated on the fly, and this facilitates the creation of tasks.

When a new form is created, all fields that go with that form are obtained. A manager can create a form. A page is something that contains data. A form is use to create that data. When anyone creates a page, he is presented a list of possible forms. A manager can request creation of a new form. When a new form is requested, QP shows a form that shows information that is need to create the form. The user fills in that information, and can also click an add field button. QuickPlace responds with a list of the field types that can be created. The user selects and configures the desired field type for each field desired on the form. When the user done adding fields, he clicks "done". Thereafter, when a user clicks new, that new form is displayed as one of the options for user selection.

Previously, very difficult to create new types of fields. In accordance with the present embodiment of the invention, a task page is displayed at the browser together with an edit page and fields for all of the material needed to create a field.

Further in accordance with a preferred embodiment of the invention, a task control section is provided which can be added to any new form, thus enabling task definitions in collaboration space. Task is an option when adding a new field, and this can be customized to include a start date and whether it will have a priority or category, and default value for the priority.

QP client code implements the "on the fly" concept.

The code is stored on the server, and sent to the client for the creation of these fields, and the corresponding HTML executes on the client. A page on the server is sent to the client, that page contains the java script which will generate the HTML.

Figure 23:
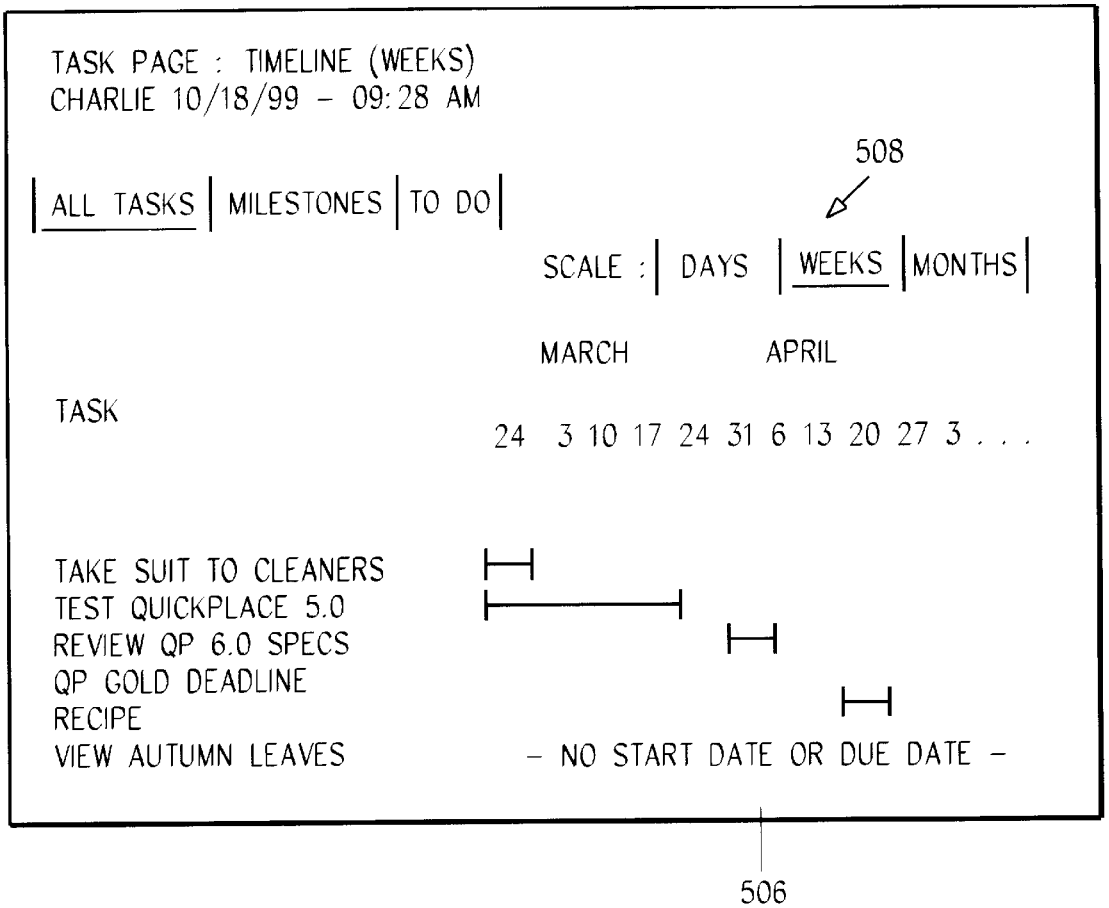
FIG. 23 is a schematic representation of a task page presented in time line mode.

Referring to FIG. 23, in accordance with a preferred embodiment of the invention, users in collaboration space can view a tasks page 506 as a timeline 508, with options for refining the timeline display for the variety of timescales (days, weeks, months, quarters, etc.) that may arise. Also, referring to FIG. 22, tasks page 506 may be presented in list mode, with the user provided buttons 508 for selecting a desired format, and other options 510. FIG. 24 represents a read scene state display for tasks.

Forms Definition in Collaboration Space

In accordance with a preferred embodiment of the invention, users are provided with a method for defining forms to create pages within collaboration space. These methods include options to upload a document and send a notification, add a meeting to the calendar, or add a task into the QuickPlace.

By clicking on New . . . , the user gets a list of forms included in QuickPlace that can be used to add a new document to it. The forms provided are sufficient for many uses, but do not give any task-specific ways of adding content to the QuickPlace. To do this, a user may create her own form and adapt it to her particular needs.

There are three ways to create forms: create a form using standard QuickPlace fields; import a form 250 created in Microsoft Office 228; and import a form 122 created in an HTML editor 124.

In accordance with this embodiment of the invention, when creating a form, it can be adapted to the workflow in the team.

Defining a Type of Workflow

To accomplish a company's goals, certain tasks must be executed, fulfilling a number of activities in a certain order, and doing this within a given time frame. This definition of goals and procedures the workflow of an organization. In accordance with a preferred embodiment of the invention, collaboration space can be adapted to reflect workflow.

Referring to FIG. 25, workflow page 512 provided by QuickPlace enables integration of a form into the organization's workflow. The following options are available from the form workflow page:

No special workflow 514: pages are simply created by an author and published by the member who created the page.

Simple Submit 515: pages are simply created by an author and submitted. This will add a submit button to the button bar at the top of the page.

Editor In Chief 516: pages are created by authors, but pages will only be published after being approved by a specific member—the Editor In Chief. Approval Cycle 517: each page is routed through a series of members in a specific order.

Multiple Editors 518: pages are created by an author and then, once published, can be further edited by any of the authors in the room.

No Special Workflow

The no special workflow option 514 allows members to publish their pages bases on this form without first getting approval from any other member of the QuickPlace either as a draft or in their final form.

Simple Submit

The simple submit option 515 is chosen when the pages created by this form don't have to undergo review, the users are not able to save pages created by this form as drafts and when it is needed to be able to rename the Publish button. When an author creates a page using this form, the following events happen, assuming that the Simple submit workflow was used to rename the Publish button to Post to Project Milestones button.

1. The author creates the page and clicks on Post to Project Milestones.
2. The page is published to the Project Milestones folder.

Editor in Chief

The editor in chief option 516 is selected when a single member is to review each page created with the form. When an author creates a page that has to be reviewed by an Editor in Chief, the following event occurs:

1. The author finished editing the page and notifies the Editor in Chief that the page is ready for review by clicking on the Submit button. Technically, the author has passed the right to edit the page to the Editor in Chief. Editor-In-Chief Pages are created by authors, but pages will only be published after being approved by a specific member—the Editor-In-Chief.

Upon submitting the page, the author can choose to send the Editor in Chief a note about the page by E-mail. The note only appears in the E-mail message, not on the page itself.

The author can also save the page under construction to continue editing at a later time before submitting it to the Editor in Chief.
2. The Editor in Chief receives an E-mail message containing the author's note (if one has been created) with a link to the new page.
3. The Editor in Chief reviews the pages and does one of the following:

Edits the page (if necessary) and by publishing approves it. The Editor in Chief can select to notify the author that the page has been published.

Rejects the page. The Editor in Chief can choose to attach a note to the rejection message. The author receives an E-mail message saying that either the page has been published or rejected. If the pages has been rejected, the author can revise the page and then resubmits it to the Editor in Chief for approval.

Approval Cycle

The approval cycle option 517 is selected when each page is to be routed through a series of members in a specific order. This workflow option 517 is chosen when the more that one member of the collaboration space is to review pages created with the form. This is similar to the Editor in Chief process 516, only that it includes more that one reviewer.

After choosing approval cycle, which members and in which order to review the document are specified. Restrictions may be set on who may read or edit the final page and the member determined who is responsible for editing the page when it is rejected. By way of example, if an approval cycle 517 is defined with two reviewers, and the folder Project Milestones set as the destination for final approved pages, the following events occur:

1. The author finishes editing the page and notifies the first reviewer that it can be reviewed by clicking the Submit button.

The author can choose to send a note on the page in an E-mail message to the first reviewer. This note only appears in the E-mail message, not the page itself.

The author can also choose to save the page under construction to continue editing it at a later time.
2. The first reviewer receives an E-mail notifying him that the page is ready for review. It contains the note from the author (if one was created) and a link to the page awaiting approval. The first reviewer reviews the page and takes one of the two following actions:

Reads and edits the page (if necessary) and submits it to the next reviewer.

Rejects the page. The reviewer can choose to create a note to accompany the rejection notice.
3. If the first reviewer rejects the page, the author receives an E-mail notifying him of the rejection. He then can change the page and resubmit it to the first reviewer, repeating the first two steps of this procedure.
4. If the first reviewer approves the page, the second reviewer receives an E-mail with a link to the page awaiting approval and a note from the first reviewer (if one was created). The reviewer takes one of the following actions:

Reviews, edits (if necessary) and approves the page. The page is then published in the Project Milestones folder.

Rejects the page. The author receives an E-mail message stating that the page has been rejected. The second reviewer can choose to create a note to accompany the notification.

5. The author receives the notification, corrects the page and resubmits it to the second reviewer, who in turn can then either reject it again or publish it.

Multiple Editors

The multiple editors option 518 is selected when pages are created by an author and then, once published, can be further edited by any other author in the room. This option is chosen when all authors in the QuickPlace are given edit rights to the page created by this form. This is useful if a document has to be viewed by all and all authors may add their thoughts to it. This option is useful for poll forms, as a user edits the page when she casts a vote in the poll. The member has to be an author to take part in the voting.

Creating a Form Using Standard QuickPlace Fields

Figure 21:
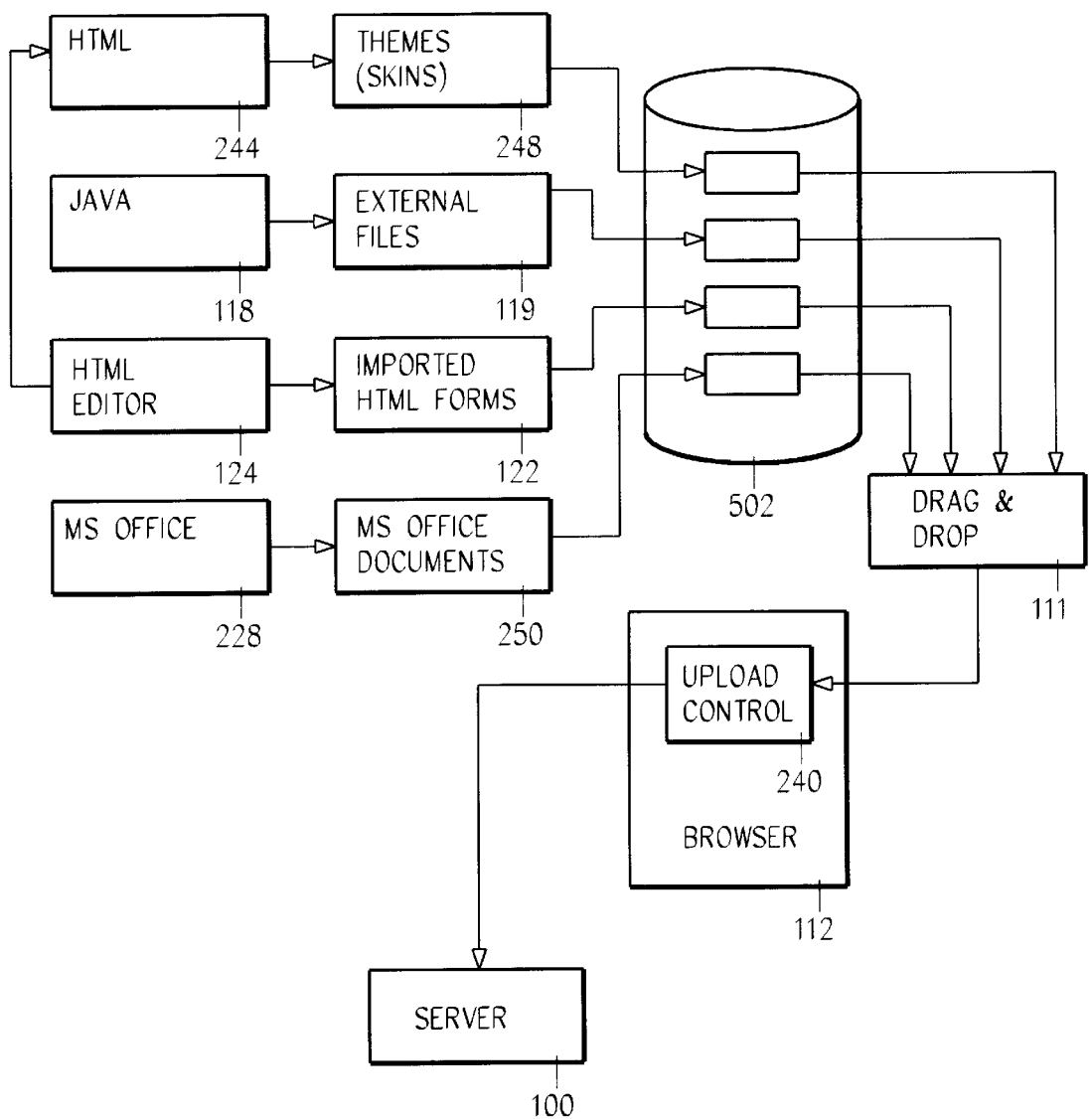
FIG. 21 is a flow chart illustrating the creation and importation into collaboration space of a form.
Figure 22:
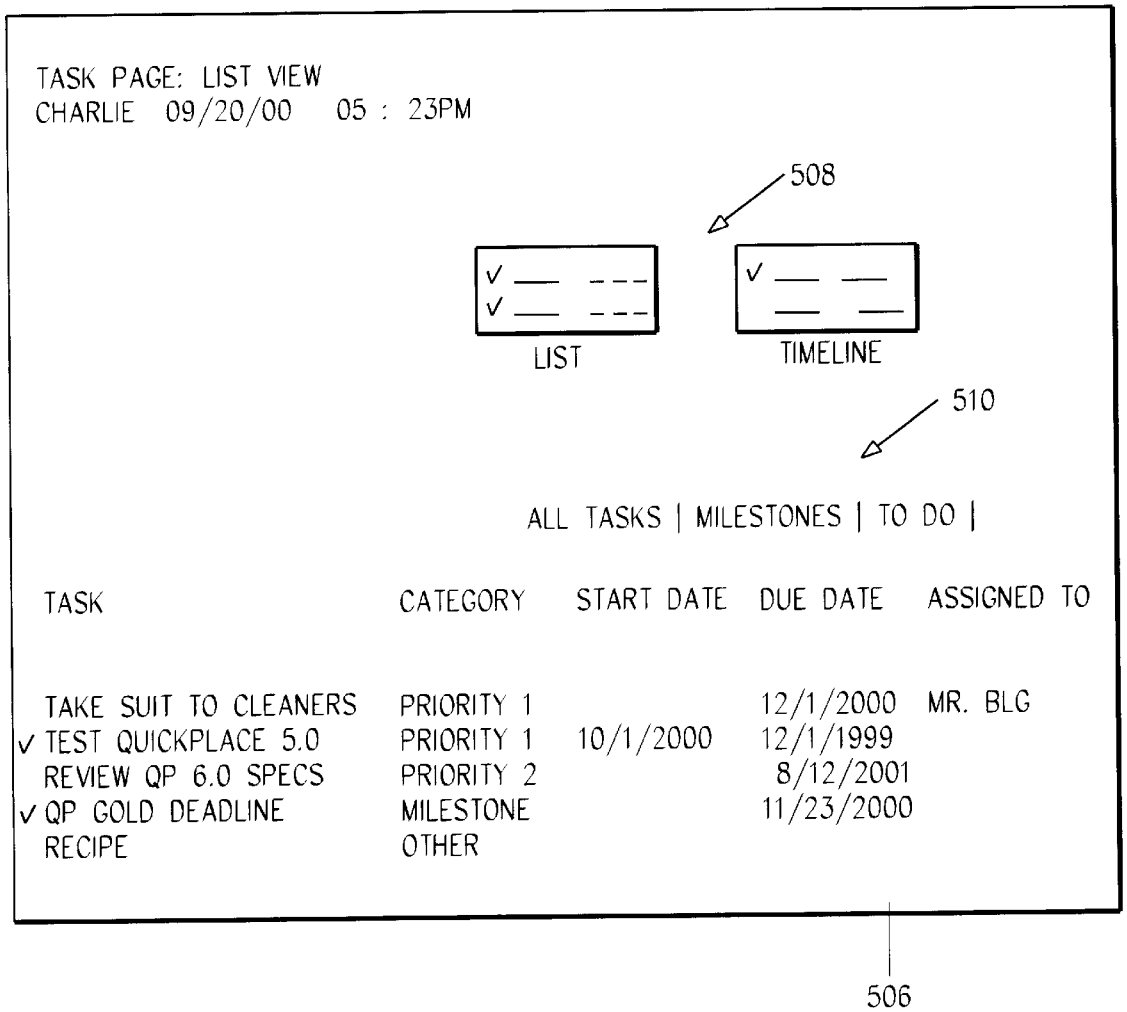
FIG. 22 is a schematic representation of a task page presented in list mode.

Creating a form within QuickPlace may be done in several ways. To generate a simple form with just a couple of fields in it, use the feature within QuickPlace. If designing a form that is more sophisticated, or it is needed to include JavaScript to do checks on fields, for example, the form is created outside of QuickPlace and imported, as illustrated in FIG. 21.

Figure 26:
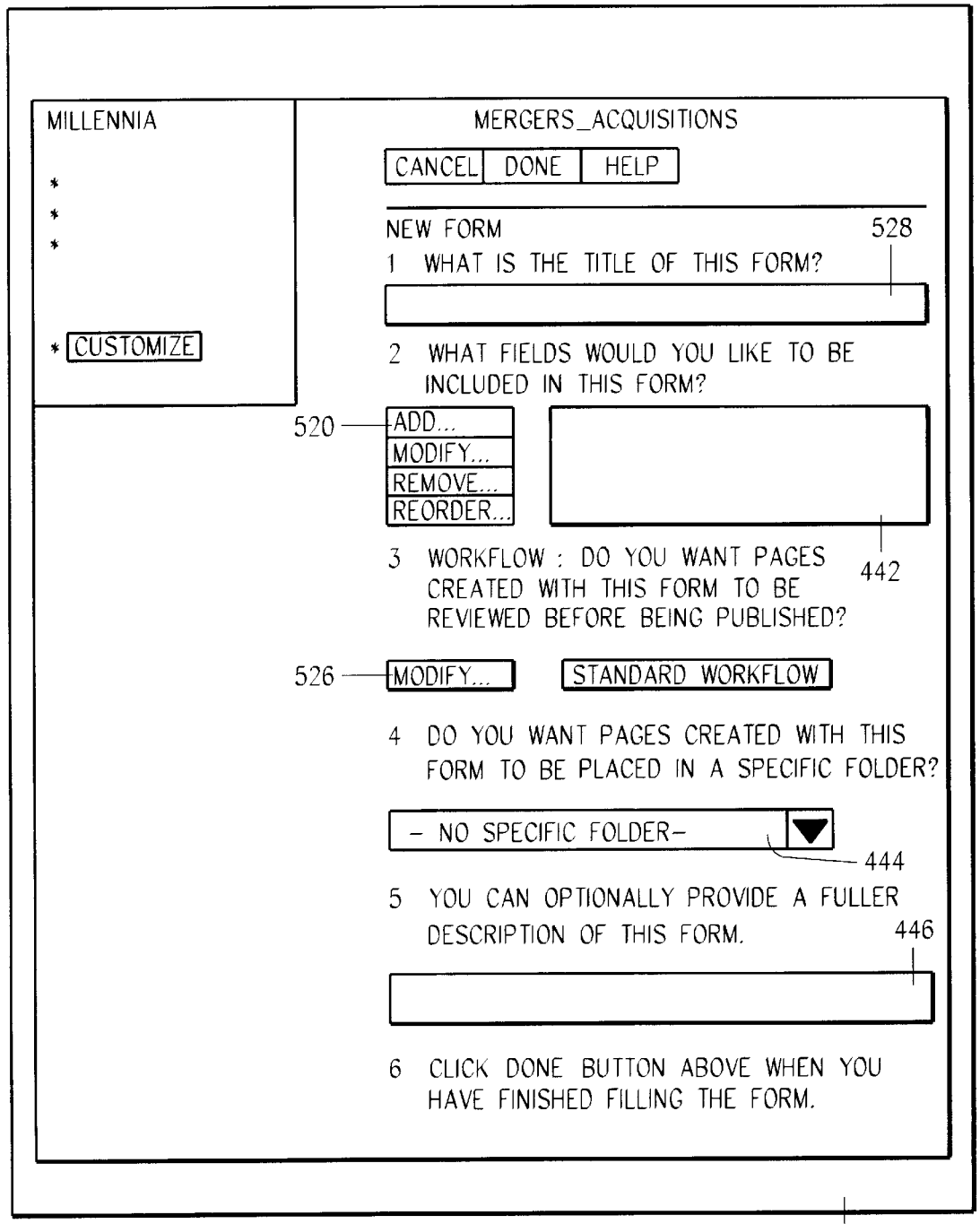
FIG. 26 is a schematic representation of a user interface for adding events to a calendar page and for publishing it in a specific folder in collaboration space.

By way of example, suppose users are to be able to add events to the calendar when the page is published, and also have the pages published in a specific folder. To do this, choose customize from the main menu, and click on new form. On the next screen, choose simple form and click on Next. FIG. 26 illustrates the Edit form page 522. Add fields to the form by clicking on Add 520, and select a field. To add the page created by this form to the calendar automatically, choose the field Event date and time. As shown in Table 52, QuickPlace responds providing a choice of standard fields which can be used to create the form. Furthermore, referring to Table 53, there are a number of fields that are non-editable, but provide additional information on the form.

TABLE 52

EDITABLE FIELDS FOR CREATE FIELD

| Field type | Function |
| --- | --- |
| Plain Text | Presents a one-line unformatted text field |
| Text Area | Presents a multi-line unformatted text field |
| Pop-up list | Presents a list of choices from which to choose |
| Time Pop-up | Presents a time pop-up |
| Name Pop-up | Presents a list of QuickPlace members |
| Attachments | Presents a field for adding file attachments |
| Rich Text | Presents a field where the author can enter formatted text and images |
| Calendar Date-Time | Presents a combination of date and time fields so that pages created with this form will automatically be added to this QuickPlace's Calendar |
| Task | Presents a combination of task related fields so that pages created with this form can be tracked as tasks |

TABLE 53

NON-EDITABLE FIELDS FOR CREATE FORM

| Field type | Function |
| --- | --- |
| Notification Indicator | Used to automatically send E-mail to individuals |
| Non-Editable Rich Text | Presents non-editable text and graphics on the form. Typically this is used to provide an attractive banner on top of the form |
| Page Author | Presents the non-editable name of the author who created the page with this form |
| Creation Date | Presents the non-editable date that the page was created |
| Last Modified Date | Presents the non-editable last modification date of the page |
| Page Size | Presents the non-editable size of the page |
| Serial Number | Presents a non-editable unique for each page created with the form (for example, Purchase Order Number) |

Selecting a field type brings up on the screen the instructions for adding to the field to the form being developed. If the pages created by this form are to be published in a specific folder, the folder is chosen from a drop-down list. As an option, a fuller description of what the form does can be added. This description appears next to the name of the form when the user clicks on New . . . .

Setting Tasks

Besides choosing a type of workflow for forms created in a QuickPlace, task settings may be chosen on the pages that are created using the form and adding them to the Tasks list in the QuickPlace. To do this, add the field Task from the Add Field page and click Next. The following page provides a way to name the task field, set a start date and the priority for the task, and set the initial choice for the priority. When finished adding fields to the form, clicking on Done saves the form.

Authors can create pages based on the form by clicking New . . . in the button bar and selecting the form from the page which appears next.

Upload a Form Created in MS Office

If the form requires some fields that are not part of the QuickPlace form creation applet, a form can be created either in MS Office 228 or in an HTML editor 124. To use MS office 228, create a new Word document, and add web form fields, such as by clicking on the appropriate field icon in a Microsoft Word web tools toolbar. Save the document as a Word file 250 when finished. QuickPlace will automatically convert the document to HTML when it is imported.

The web tools toolbar in Word offers eleven standard fields to use in a document: Checkbox control, Option or Radio button control, Drop Down box control, Listbox control, Textbox control, Text Area control, Submit control, Submit witH_Image control, Reset control, Hidden control, and Password control.

By selecting control and clicking on Properties, an HTML name and value can be assigned to the field.

ActiveX Controls

ActiveX controls, supported by Internet Explorer, may also be added from the control toolbox and clicking on Properties. The following ActiveX controls are available from the tool box: Check box, Spin button, Scroll bar, Label, Text box, Command button, Option or Radio button, List box, Combo box, Toggle button, Image. Additional ActiveX controls can be registered by clicking on More Controls and registering the ones needed. When finished editing the document, it is saved as a MS Word document 250 and upload it to the QuickPlace. To upload, click on Customize and select Form. On the next page, click on New form, and select Microsoft Office form, then click on Next. Referring to FIG. 27, this next page is shown. The MS Word document can by uploaded by dragging and dropping it into the bucket (upload control 240), or selected by clicking on Browse 524. A workflow option can be selected from list 526. To change the standard Publish button for the form, select Workflow 526 and choose Simple submit 515. This will add a submit button into the button bar at the top of form when it is filled in. Click on Next and provide a name 528 for the submit control on the next page. Click on Next. Select the folder the pages are to be published in from the drop-down list 444. Add a short description of the form, if desire, at field 446. Clicking on Done will publish the form to the QuickPlace.

Authors can publish pages by selecting New . . . from the button bar and selecting the form created from the list.

Upload a Manually Created HTML Form

If more control over how the form appears in the QuickPlace, or if JavaScript must be included, the form is created using an HTML editor 124.

The following two examples illustrate how this is to be done. When creating an HTML form manually in an HTML editor 124:

(1) Put all code, including any JavaScript, within the <body> tag of the document. All other parts of the document, that is, the <head> and <title> tags, will be replaced by custom QuickPlace tags once the form is uploaded.

(2) The form tags <form> and </form> are not needed within the manually created HTML form. QuickPlace will add custom code when the form is uploaded.

(3) QuickPlace system fields can be used in the form. In the following examples, the name of the page is set in a text field named h_Name, which is the system field for the page title.

Use QuickPlace Controls in the Form

QuickPlace provides two client-side components for users to quickly interact with the QuickPlace, the Rich text and the Upload control. Authors can format their text in the Rich text control, giving it a personal look and feel. They can upload documents to the QuickPlace by dragging and dropping 111 them into the Upload control 240. These controls only have their full functionality in Internet Explorer. Both are ActiveX controls in Internet Explorer. Calling a form with the Rich text control included starts a Java applet in Netscape Navigator. The Upload control displays a browse button in Netscape Navigator. The author then can select a file from his computer when he or she clicks on it.

Both browsers display the formatted Rich text in read mode and load the appropriate client-side component when changing into edit mode. Internet Explorer lets the user drag a document out of the Upload control box 240 to download or view the document, whereas Netscape Navigator displays a link the user can click on to download or view the file. The forms provided by QuickPlace use these controls, and they can be include new forms.

The QuickPlace Upload Control Example

The example form of Table 54 creates a page that includes the QuickPlace control to upload files to the QuickPlace. It also includes some fields for the user to fill in to provide information about the attached file. The <body> tag contains the complete form, and the <form> tags are omitted from the HTML page. Adding fields begins right after the <body> tag. Standard HTML fields can be used in the form, and this examples shows use of text fields, a text area and a drop-down field.

TABLE 54

PAGE UPLOAD CONTROL

```
<html>
<head>
<title>Upload control</title>
</head>
<body>
<table border=0>
<tr>
<td colspan=3><img src="ecblank.gif" width="300" height="1" border="0">
<tr>
    <td><b>Document Title</b></td>
    <td> </td>
    <td><b><input type="text" name="h_Name"></b></td>
</tr>
<tr>
    <td>Your first name</td>
    <td> </td>
    <td><input type="text" name="fname"></td>
</tr>
<tr>
    <td>Your last name</td>
    <td> </td>
    <td><input type="text" name="lname"></td>
</tr>
<tr>
    <td>Company</td>
    <td> </td>
    <td>
    <select name="selector">
    <option value="-- choose one --">----choose one ----</option>
    <option value="Millenia">Millenia</option>
    <option value="TheRock">TheRock</option>
    <option value="CapMan">CapMan</option>
    </select>
    </td>
</tr>
```

In the continuation of Table 54, the QuickPlace component for the Upload control is included. In Internet Explorer, this tag will include the ActiveX Upload control in the page, and a browse button in Netscape Navigator. In the published page, the button converts to a link to the page in Netscape Navigator, while the Internet Explorer displays the ActiveX Upload control.

TABLE 54

(CON'T.): PAGE UPLOAD CONTROL

```
<tr>
<td valign="top">Give a short description<br>of your file</td>
<td> </td>
<td><textarea name="description" rows=5 cols=50></textarea></td>
</tr>
<tr>
<td valign="top">place your file here</td>
<td> </td>
<td valign="top"><QuickPlaceCONTROL type="attachment" name="attachment"></td>
</tr>
</table>
</body>
</html>
```

The QuickPlace Upload control can be used in any manually created HTML form 122.

The QuickPlace Rich Text Control

The example form of Table 55 creates a page that includes the QuickPlace Rich text control to add Rich text and graphic text to the page. Rich text is formatted by adding the appropriate HTML tag around it. To display the graphic text, QuickPlace uses its built-in graphics server. The <body> tag contains the complete form, and the <form> tags are omitted from the HTML page. Fields are added right after the <body> tag. Standard HTML fields can be used for the form, this example uses text fields and a drop-down field.

TABLE 55

QuickPlace RICH TEXT CONTROL EXAMPLE

```
<html>
<head>
<title>Upload control</title>
</head>
<body>
<table>
<tr>
<td colspan="3"><IMG src="ecblank.gif" height="5"
width="200"
border="0"></td>
</tr>
<tr>
    <td><b>Document Title</b></td>
    <td> </td>
    <td><b><input type="text" name="h_Name"></b></td>
</tr>
<tr>
    <td>Your first name</td>
    <td> </td>
    <td><input type="text" name="fname"</td>
</tr>
<tr>
    <td>Your last name</td>
    <td> </td>
    <td><input type="text" name="1name"</td>
</tr>
<tr>
    <td>Company</td>
    <td> </td>
    <td>
    <select name="selector">
    <option value="-- choose one --">----choose one
----</option>
    <option value="Millenia">Millenia</option>
    <option value="TheRock">TheRock</option>
    <option value="CapMan">CapMan</option>
    </select>
    </td>
</tr>
```

In the continuation of Table 55, the QuickPlace component is included for the Rich text control. In Internet Explorer, this tag will include the ActiveX Upload control in the new page, and a Java applet in Netscape Navigator. Both browsers display the Rich text within the relevant HTML tag. To display the graphic text, QuickPlace uses Limerick in both browsers.

TABLE 55

(CON'T.): QuickPlace RICH TEXT CONTROL EXAMPLE

```
<tr>
    <td valign="top"> </td>
<tr>
    <td> </td>
    <td> </td>
    <td><QUICKPLACECONTROL type= "richtext"
    name="richtext"<>/td
</tr>
</table>
</body>
</html>
```

QuickPlace Specific JavaScript Functions

Two QuickPlace specific JavaScript functions to use with forms exist in QuickPlace. They are event handlers that can be called when the form is loaded from or a page created by the form is submitted to the QuickPlace.
QDK_HTML_FormOnLoadHandlerCallback (theForm)

This JavaScript function is called when the form loaded from the QuickPlace. It can, for example, set certain default field values. The example of Table 56 sets the expiration date for a page created with this form to two months.

TABLE 56

FORM ON LOAD HANDLER

```
function QDK_HTMLForm_OnLoadHandlerCallback( theForm)
{
if ( h_IsNewDoc == '1') {
var now = new Date();
now.setMonth( now.getMonth() + 2);
var expirationDate = now.toLocaleString();
expirationDate = expirationDate.substr( 0,
expirationDate.indexOf( '
'));
theForm.expires.value = expirationDate;
}
theForm.h_Name.focus();
}
QDK_HTML_FormOnSubmitHandlerCallback ( theForm)
```

The JavaScript function of Table 57 is called when the form is loaded from the QuickPlace. It can, for example, check if the user has entered data into fields that have to be filled. This example checks if a proper E-mail address has been entered by checking for the @ symbol and a dot in the string following it:

TABLE 57

HANDLER CALL BACK

```
function QDK_HTMLForm_OnSubmitHandlerCallback( theForm)
{
var isOk = false;
if ( theForm.email.value.indexOf( '@') > 0 &&
theForm.email.value.indexOf( '.') > 2) {
isOk = true;
}
else {
alert( 'Please enter a valid email address');
}
return isOk;
}
```

These functions are very handy to perform checks or changes while loading forms or publishing pages based on forms. They can be adapted to perform whatever check is needed for a forms.

Advantages Over the Prior Art

It is an advantage of the invention that there is provided a collaboration space application model for creating web applications that are aesthetically pleasing and present the user with a simple interface.

It is an advantage of the invention that there is provided a method and system for creating web applications that are instantly created, instantly archived, team and project oriented, easy to use, created, accessed and administered via the Web, reusable, and extensible.

It is an advantage of the invention that there is provided a method and system for building collaboration applications, by providing a repository for custom logic.

It is an advantage of the invention that there is provided a method and system whereby an agent may be coded in any legacy editor and the resulting file uploaded into collaboration space to compiled into a placebot for automating tasks with respect to collaboration space objects.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. Method for managing objects in collaboration space, comprising the steps of:
  creating placebot code by a user at a client browser including presenting to a user interface a form for describing said placebot code and selecting an agent trigger;
  determining if said user has proper authorization, and if so uploading said placebot code to a collaboration space server by dragging said code into an upload control area of said user interface on said client browser;
  at said collaboration space server, compiling said placebot code into a placebot agent.

2. The method of claim 1, further comprising the step of scheduling said placebot agent to run at specific times.

3. The method of claim 1, further comprising the steps of:
  associated said placebot agent with a form; and
  upon opening said form, executing said placebot agent.

4. The method of claim 1, further comprising the steps of:
  implementing said collaboration space according to an object model comprising collaboration space objects selectively including place, room, folder, page, member, form, field, placetype, roomtype, skin, and placebot objects;
  executing said placebot object to create or manipulate said collaboration space objects.

5. The method of claim 1, further comprising the steps of executing one or more said placebot agents selectively for:
  sharing documents;
  holding discussions with team members;
  performing actions triggered as result of submission of a form object; and
  performing actions scheduled to run a specified time.

6. The method of claim 1, further comprising the steps of:
  executing said placebot object according to schedule or upon request;
  when executing said placebot object according to schedule, controlling access to said placebot object and objects referenced by said placebot object by inheritance of access control from said collaboration space server; and
  when executing said placebot object upon request of a user, controlling access to said placebot object and objects referenced by said placebot object according to the access rights of said user.

7. Method for providing placebot code to a collaboration space, comprising the steps of:
  operating a browser to create said placebot code;
  presenting to a user interface a form for describing said placebot code and selecting an agent trigger;
  dragging said placebot code into an upload control area of said user interface on said browser;
  determining if said user has proper authorization, and if so uploading said placebot code and said agent trigger to a collaboration space server; and
  operating said server to compile said placebot code into a placebot agent.

8. The method of claim 7, further comprising the step of implementing said collaboration space according to an object model selectively including place, room, folder, page, member, form, field, placetype, roomtype, skin, and placebot objects.

9. The method of claim 8, further comprising the step of:
  maintaining for each said room, a list of all published objects in a place, including said room, page, placebot, field, skin and form objects; and
  executing a view on said list to reference said published objects.

10. The method of claim 9, further comprising the step of:
  using a placebot object associated with a form object to initiate processes outside of a page object.

11. The method of claim 8, said placebot code being uploaded to said server by dragging and dropping said placebot code into a form.

12. The method of claim 7, further comprising the steps of:
  creating said placebot code in a legacy form; and
  including in said legacy form a text field with indicia recognizable by said server as identifying said placebot code as a document to be rendered in said browser as a collaboration space form.

13. The method of claim 12, further comprising the steps of:
  creating said placebot code as hypertext markup language code;
  executing said hypertext markup language code selectively to define forms, execute backend logic, and define look and feel of said user interface to said collaboration space.

14. The method of claim 13, further comprising the steps of:
  defining collaboration space members authorized to edit documents when creating a placebot object; and
  responsive to execution of said placebot object, modifying access control to documents.

15. The method of claim 12, further comprising the steps of:
  to import an image into said place, referencing said image within a placebot object for creating new pages.

16. The method of claim 7, further comprising the steps of:
  executing procedures within said placebot agent to access collaboration space objects including said collaboration space server and room objects in said collaboration space.

17. The method of claim 16, said placebot agent accessing said server according to the steps of:

executing a get database server command; and receiving a database having a path designation;

determining that said path designation starts with indicia identifying said collaboration space server.

18. The method of claim 17, said placebot agent accessing a room object within said collaboration space according to the step of:

searching in a main collaboration space server directory for said room object in a path designation starting with said indicia identifying said collaboration space server.

19. A system for managing collaboration space objects, comprising:

a text editor for creating custom logic;

a user interface including an upload control area for receiving said custom logic and a trigger selector for specifying that said custom logic is to be executed by a server responsive to submission of a form or at scheduled times;

at least one placebot serving as a primary repository for said custom logic and selectively assuming access rights of a user submitting said form;

said placebot providing links between and manipulating said objects in accordance with said access rights; and responsive to said trigger selector, said placebot selectively executing said custom logic responsive to one of opening of the form with the access rights of said user submitting said form and at scheduled times with access rights being established by said server.

20. The system of claim 19, said collaboration space comprising an object model selectively including place, room, folder, page, member, form, field, placetype, roomtype, skin, and placebot objects.

21. The system of claim 20, further comprising:

a storage device for storing said placebot;

a code transfer facility responsive to request by a place manager irrespective of administrative access to a collaboration space server for installing said placebot to said collaboration space server.

22. A program storage device readable by a machine, tangibly embodying a program of instructions executable by a machine to perform method steps for managing objects in collaboration space, said method steps comprising:

creating placebot code by user at a client brower including presenting to a user interface a form for describing said placebot code and selecting an agent trigger;

determining if said user has proper authorization, and if so uploading said placebot code to a collaboration space server by dragging said code into an upload control area of said user interface on said client brower; at said collaboration space server, compiling said placebot code into a placebot agent.

23. A program storage device readable by a machine, tangibly embodying a program of instructions executable by a machine to perform method steps for providing placebot code to a collaboration space, said method steps comprising:

operating a browser to create said placebot code;

presenting to a user interface a form for describing said placebot code and selecting an agent trigger;

dragging said placebot code into an upload control area of said user interface on said browser;

determining if said user has proper authorization and if so uploading said placebot code and said agent trigger to a collaboration space server; and operating said server to compile said placebot code into a placebot agent.

* * * * *